(12) United States Patent
Yoshida

(10) Patent No.: US 11,500,237 B2
(45) Date of Patent: Nov. 15, 2022

(54) ARRAY SUBSTRATE AND DISPLAY DEVICE

(71) Applicant: SHARP KABUSHIKI KAISHA, Sakai (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/512,222

(22) Filed: Oct. 27, 2021

(65) Prior Publication Data

US 2022/0146874 A1 May 12, 2022

Related U.S. Application Data

(60) Provisional application No. 63/111,319, filed on Nov. 9, 2020.

(51) Int. Cl.
| | |
|---|---|
| *G02F 1/1333* | (2006.01) |
| *G02F 1/1362* | (2006.01) |
| *G06F 3/041* | (2006.01) |
| *G02F 1/1343* | (2006.01) |
| *G06F 3/044* | (2006.01) |

(52) U.S. Cl.
CPC .... *G02F 1/13338* (2013.01); *G02F 1/134318* (2021.01); *G02F 1/134363* (2013.01); *G02F 1/136286* (2013.01); *G06F 3/044* (2013.01); *G06F 3/0412* (2013.01); *G02F 1/133345* (2013.01); *G06F 3/0443* (2019.05)

(58) Field of Classification Search
CPC .......... G02F 1/13338; G02F 1/134318; G02F 1/134363; G02F 1/136286; G02F 1/133; G02F 1/1362; G02F 1/1368; G06F 3/0412; G06F 3/044; G06F 3/0443; G06F 3/0446
See application file for complete search history.

(56) References Cited

U.S. PATENT DOCUMENTS

| | | | | |
|---|---|---|---|---|
| 6,462,792 | B1 * | 10/2002 | Ban | G02F 1/136286 349/40 |
| 2010/0315377 | A1 * | 12/2010 | Chang | G06F 3/042 345/175 |
| 2011/0090194 | A1 * | 4/2011 | Chang | G06F 3/0412 257/53 |
| 2011/0102359 | A1 * | 5/2011 | Chiba | G06F 3/0412 345/173 |

(Continued)

FOREIGN PATENT DOCUMENTS

JP H11305681 A 11/1999

*Primary Examiner* — Darlene M Ritchie
(74) *Attorney, Agent, or Firm* — ScienBiziP, P.C.

(57) ABSTRACT

An array substrate includes: a signal supply unit configured to supply a signal; a plurality of position detection electrodes; a plurality of position detection wiring line; a plurality of scanning wiring lines; a plurality of pixel regions; a scanning connection wiring line having one end side connected to the signal supply unit and another end side connected to the scanning wiring lines, the scanning connection wiring line being arranged passing through some of the pixel regions included in the plurality of pixel regions; and an auxiliary position detection wiring line having at least one end side and another end side each connected to the position detection wiring lines, the auxiliary position detection wiring line being disposed in the pixel regions, of the plurality of pixel regions, not provided with the scanning wiring lines.

15 Claims, 24 Drawing Sheets

(56) References Cited

U.S. PATENT DOCUMENTS

| | | | |
|---|---|---|---|
| 2015/0355516 A1* | 12/2015 | Imai | G02F 1/13439 |
| | | | 349/123 |
| 2016/0141312 A1* | 5/2016 | Nakatani | G02F 1/136213 |
| | | | 257/43 |
| 2019/0235331 A1* | 8/2019 | Li | G02F 1/1368 |
| 2020/0033994 A1* | 1/2020 | Shin | G06F 3/0412 |
| 2020/0278585 A1* | 9/2020 | Kajita | G06F 3/0446 |
| 2021/0365141 A1* | 11/2021 | Ohue | G06F 3/0443 |

* cited by examiner

ARRAY SUBSTRATE AND DISPLAY DEVICE

CROSS-REFERENCE TO RELATED APPLICATION

The present application claims priority from Provisional Application No. 63/111,319, the content to which is hereby incorporated by reference into this application.

BACKGROUND OF THE INVENTION

1. Field of the Invention

The techniques disclosed herein relate to array substrates and display devices.

2. Description of the Related Art

PTL 1 (JP H11-305681) described below describes an example of a known active matrix liquid crystal display device. This active matrix liquid crystal display device described in PTL 1 has only a lower side portion of a lower side substrate protruding from an upper side substrate, and has an output side connection terminal provided in a semiconductor chip mounting region on this protruding portion. Specifically, on the lower side substrate, a lower side scanning signal line and an upper side data signal line are provided orthogonal to each other, with an insulating film interposed therebetween. An auxiliary scanning signal line is provided on the upper surface of the insulating film between each of the data signal lines. The auxiliary scanning signal line has an upper end portion connected to a corresponding scanning signal line via a contact hole formed in the insulating film. The auxiliary scanning signal line and the data signal line have lower end portions connected to the output side connection terminal.

SUMMARY OF THE INVENTION

In the lower side substrate of the active matrix liquid crystal display device described in PTL 1 described above, the auxiliary scanning signal line is provided being parallel to the data signal line and formed simultaneously with the data signal line, and is arranged to pass through a pixel region which is a region provided with a pixel electrode. Since the wiring route of this auxiliary scanning signal line is set in accordance with the scanning signal line that is the connection target, there will be a plurality of the pixel regions, including a pixel region provided with the auxiliary scanning signal line and a pixel region not provided with the auxiliary scanning signal line. As a result, there is a problem in that the display quality is compromised by a difference in the aperture ratio between these pixel regions due to the presence or absence of an auxiliary scanning signal line. Meanwhile, to provide the active matrix liquid crystal display device with a touch panel function, the lower side substrate may be provided with a touch electrode and a touch wiring line connected to the touch electrode. In this case, since an increase in the size of the screen leads to a longer wiring line length for the touch wiring line, there may be a problem such as a signal waveform being rounded or a higher risk of disconnection due to the wiring resistance.

The techniques described in the present application have been completed in view of the circumstances described above, with an object thereof being to achieve reduction of the resistance of a position detection wiring line and the like while improving the display quality.

(1) An array substrate according to techniques described in the present application includes: a signal supply unit configured to supply a signal; a plurality of position detection electrodes configured to generate electrostatic capacitance with a position input member used for inputting a position and detect an input position by the position input member; a plurality of position detection wiring lines having one end side connected to the signal supply unit and another end side connected to the position detection electrodes; a plurality of scanning wiring lines extending to cross the position detection wiring lines, with an insulating film interposed in between; a plurality of pixel regions in which a pixel as a unit of display is positioned, the pixel regions being regions surrounded by a plurality of the position detection wiring lines and a plurality of the scanning wiring lines; a scanning connection wiring line having one end side connected to the signal supply unit and another end side connected to the scanning wiring lines, the scanning connection wiring line being arranged passing through some of the pixel regions included in the plurality of pixel regions; and an auxiliary position detection wiring line having at least one end side and another end side each connected to the position detection wiring lines, the auxiliary position detection wiring line being disposed in the pixel regions, of the plurality of pixel regions, not provided with the scanning wiring lines.

(2) In addition to the above-described (1), the array substrate may further include a plurality of image wiring lines that extend to cross the scanning wiring lines, with an insulating film interposed in between, and are arranged overlapping with at least a portion of each of the plurality of position detection wiring lines, with an insulating film interposed in between, and the scanning wiring lines may include a main scanning connection wiring line component formed by a same conductive film as the image wiring lines, and the main scanning connection wiring line component may extend from the signal supply unit to a connection target among the scanning wiring lines, while crossing non-connection targets among the scanning wiring lines before reaching the connection target.

(3) In addition to the above-described (2), in the array substrate, the auxiliary position detection wiring line may include a first auxiliary position detection wiring line component formed by the same conductive film as the image wiring lines, the main scanning connection wiring line component may include an image wiring line parallel portion extending parallel to the image wiring lines at a position spaced apart from the image wiring lines in the pixel regions, whereas the first auxiliary position detection wiring line component may include an auxiliary position detection wiring line side image wiring line parallel portion extending parallel to the image wiring lines at a position spaced apart from the image wiring lines in the pixel regions by a same amount as the image wiring line parallel portion.

(4) In addition to the above-described (3), in the array substrate, the auxiliary position detection wiring line may include a second auxiliary position detection wiring line component that is formed by a same conductive film as the scanning wiring lines and is arranged overlapping with at least a portion of the first auxiliary position detection wiring line component, and the second auxiliary position detection wiring line component may have at least one end side and another end side each connected to the first auxiliary position detection wiring line component through a contact hole opened and formed in an insulating film provided in between.

(5) In addition to the above-described (3) or (4), in the array substrate, the auxiliary position detection wiring line may include a third auxiliary position detection wiring line component that is formed by a same conductive film as the position detection wiring lines and is arranged overlapping with at least a portion of the first auxiliary position detection wiring line component, and the third auxiliary position detection wiring line component may have at least one end side and another end side each connected to the first auxiliary position detection wiring line component through a contact hole opened and formed in an insulating film provided in between.

(6) In addition to any one of the above-described (3) to (5), the array substrate may further include a plurality of pixel electrodes positioned in the plurality of pixel regions and constituting the pixels, the pixel electrodes provided in the pixel regions provided with the scanning connection wiring line may have an end portion in an extending direction of the scanning wiring line positioned between the image wiring lines and the image wiring line parallel portion, whereas the pixel electrodes provided in the pixel regions provided with the auxiliary position detection wiring line may have an end portion in the extending direction of the scanning wiring line positioned between the image wiring lines and the auxiliary position detection wiring line side image wiring line parallel portion.

(7) In addition to the above-described (6), in the array substrate, the signal supply unit may supply a position detection signal and a common potential signal to the position detection wiring lines in a time division manner, and the position detection electrodes may be arranged to overlap, from a lower layer side, with the pixel electrodes, with an insulating film interposed in between, and to overlap, from an upper layer side, with the image wiring line parallel portion and the auxiliary position detection wiring line side image wiring line parallel portion, with an insulating film interposed in between.

(8) In addition to any one of the above-described (2) to (7), in the array substrate, the scanning connection wiring line may include a sub scanning connection wiring line component that is formed by a same conductive film as the scanning wiring lines and is arranged overlapping with the main scanning connection wiring line component in the pixel regions, and the sub scanning connection wiring line component may have at least one end side and another end side each connected to the main scanning connection wiring line component through a contact hole opened and formed in an insulating film provided in between.

(9) In addition to any one of the above-described (2) to (8), in the array substrate, the main scanning connection wiring line component may include a plurality of image wiring line parallel portions extending parallel to the image wiring lines at a position spaced apart from the image wiring lines in the pixel regions, the plurality of image wiring line parallel portions may include a first image wiring line parallel portion offset toward one of two of the image wiring lines sandwiching the pixel regions and a second image wiring line parallel portion offset toward the other one of the two image wiring lines sandwiching the pixel regions, and one of two of the pixel regions adjacent to each other with the scanning wiring line provided in between may be provided with the first image wiring line parallel portion and the other one of the two pixel regions may be provided with the second image wiring line parallel portion.

(10) In addition to the above-described (9), in the array substrate, the auxiliary position detection wiring line may include a first auxiliary position detection wiring line component formed by the same conductive film as the image wiring lines, the first auxiliary position detection wiring line component may include an auxiliary position detection wiring line side image wiring line parallel portion extending parallel to the image wiring lines at a position spaced apart from the image wiring lines in the pixel regions, the auxiliary position detection wiring line may include a first auxiliary position detection wiring line at a position where the auxiliary position detection wiring line side image wiring line parallel portion is spaced apart from one of the two image wiring lines sandwiching the pixel regions by a same amount as the first image wiring line parallel portion and a second auxiliary position detection wiring line at a position where the auxiliary position detection wiring line side image wiring line parallel portion is spaced apart from the other one of the two image wiring lines sandwiching the pixel regions by a same amount as the second image wiring line parallel portion, and the pixel regions with a same arrangement, in an extending direction of the position detection wiring lines, as the pixel regions provided with the first image wiring line parallel portion may be provided with the first auxiliary position detection wiring line, whereas the pixel regions with a same arrangement, in the extending direction of the position detection wiring lines, as the pixel regions provided with the second image wiring line parallel portion may be provided with the second auxiliary position detection wiring line.

(11) In addition to the above-described (10), in the array substrate, the main scanning connection wiring line component may include a scanning wiring line parallel portion that extends parallel to the scanning wiring lines at a position spaced apart from the scanning wiring lines in the pixel regions and is connected to the image wiring line parallel portion, and the first auxiliary position detection wiring line component may include an auxiliary position detection wiring line side scanning wiring line parallel portion that extends parallel to the scanning wiring lines at a position spaced apart from the scanning wiring lines by a same amount as the scanning wiring line parallel portion in the pixel regions.

(12) In addition to any one of the above-described (2) to (11), in the array substrate, the main scanning connection wiring line component may include a plurality of scanning wiring line parallel portions extending parallel to the scanning wiring lines at a position spaced apart from the scanning wiring lines in the pixel regions, the plurality of scanning wiring line parallel portions may include a first scanning wiring line parallel portion offset toward one of two of the image wiring lines sandwiching the pixel regions and a second scanning wiring line parallel portion offset toward the other one of the two image wiring lines sandwiching the pixel regions, and one of two of the pixel regions adjacent to each other with the scanning wiring line provided in between may be provided with the first scanning wiring line parallel portion and the other one of the two pixel regions may be provided with the second scanning wiring line parallel portion.

(13) In addition to any one of the above-described (1) to (12), in the array substrate, the plurality of pixel regions arranged along an extending direction of the position detection wiring lines may include one provided with the scanning connection wiring line and one provided with the auxiliary position detection wiring line, and a length of the scanning connection wiring line from the signal supply unit to the scanning wiring line that is a connection target may decrease as a length of the position detection wiring lines from the signal supply unit to the position detection electrode that is a connection target increases.

(14) In addition to any one of the above-described (1) to (13), in the array substrate, a plurality of the pixel regions that are adjacent to the position detection wiring line connected to the position detection electrode farthest from the signal supply unit, among the plurality of position detection electrodes, and are aligned along an extending direction of the position detection wiring line may each be provided with the auxiliary position detection wiring line.

(15) A display device according to techniques described in the present application includes: the array substrate according to any one of the above-described (1) to (14); and a counter substrate arranged to face the array substrate.

With the techniques described in the present application, reduction of the resistance of the position detection wiring line and the like can be achieved while improving the display quality.

DETAILED DESCRIPTION OF THE INVENTION

First Embodiment

A first embodiment will be described with reference to FIGS. 1 to 17. In the present embodiment, an example of a liquid crystal panel (a display device, a position input device) 10 having an image display function and a touch panel function (position input function, position detection function) will be described. Note that an X axis, a Y axis, and a Z axis are illustrated in a part of each drawing, and each axial direction is illustrated to be the direction illustrated in each drawing. Moreover, the upper side and the lower side in FIGS. 4, 6, 16, and 17 are respectively defined as a front side and a rear side.

Figure 1:
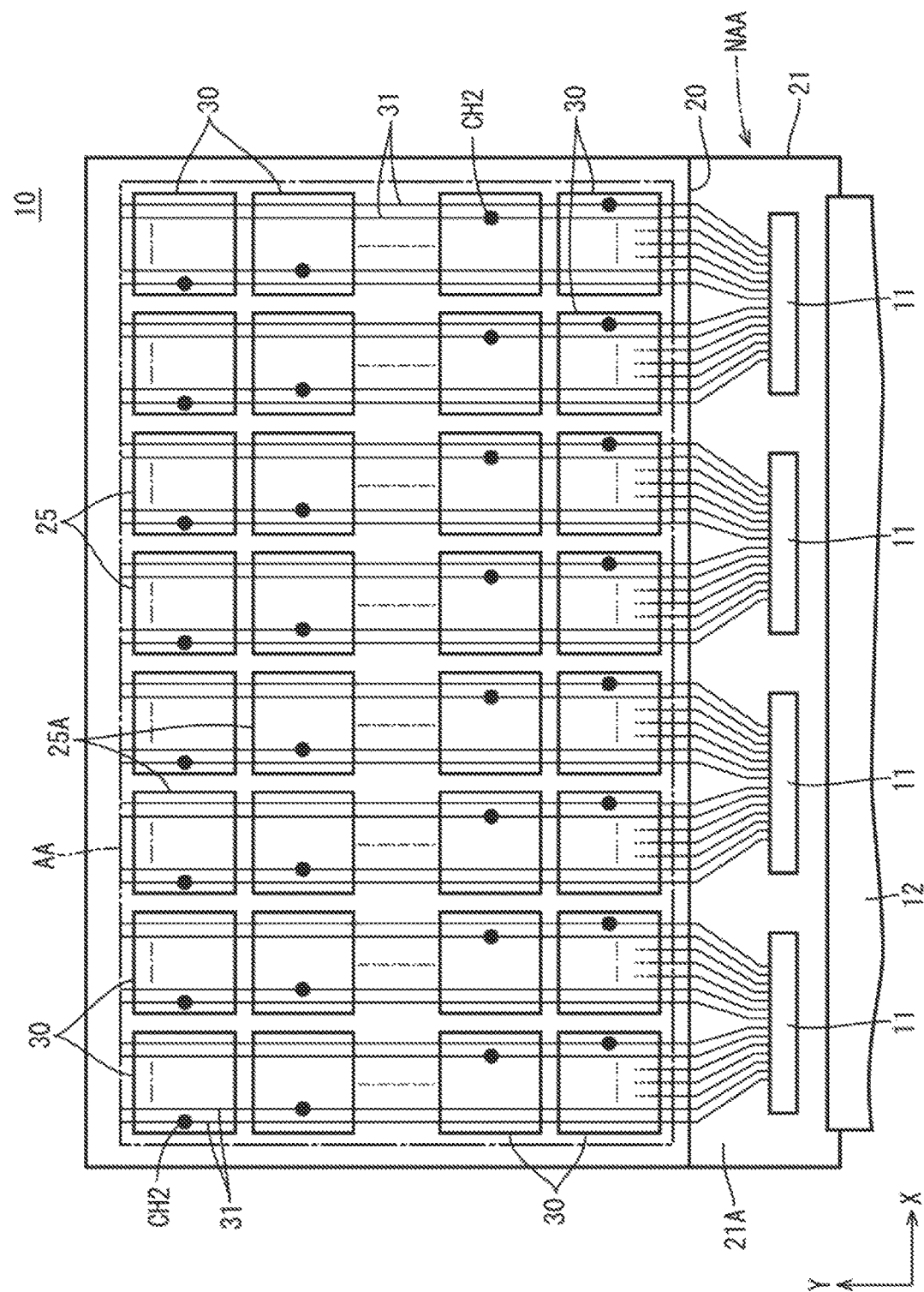
FIG. 1 is a plan view illustrating touch electrodes, touch wiring lines and the like of a liquid crystal panel according to a first embodiment.

FIG. 1 is a schematic plan view of the liquid crystal panel 10. As illustrated in FIG. 1, the liquid crystal panel 10 has a horizontally elongated substantially rectangular shape as a whole in plan view. A short side direction of the liquid crystal panel 10, a long side direction, and a plate thickness direction coincide with a Y-axis direction, an X-axis direction, and a Z-axis direction, respectively. The liquid crystal panel 10 can display an image by using illumination light emitted from a backlight device (illumination device) provided on the rear side thereof. In the present embodiment, the liquid crystal panel 10 has, for example, a screen size of about 90 inches (specifically, 89.5 inches), and a resolution of "7680×4320" which is equivalent to the 8K resolution. The backlight device includes a light source (for example, a light emitting diode (LED) or the like) disposed on a rear side (back face side) of the liquid crystal panel 10 and configured to emit light having a white color (white light), an optical member configured to impart an optical effect on the light from the light source, thereby converting the light into planar light, and the like for example.

In the liquid crystal panel 10, as illustrated in FIG. 1, a center portion of a screen is established as a display region (range surrounded by a dot-dash line in FIG. 1) AA in which images are displayed. In contrast, a frame-shaped (frame-formed) outer peripheral portion surrounding the display region AA of the screen of the liquid crystal panel 10 is a non-display region NAA in which images are not displayed.

The liquid crystal panel 10 is formed by bonding a pair of substrates 20 and 21 together. A front side (front face side) of the pair of substrates 20 and 21 is the color film (CF) substrate (counter substrate) 20, and a rear side (back face side) is the array substrate (active matrix substrate, element substrate) 21. The CF substrate 20 and the array substrate 21 are each formed by layering various films on an inner surface side of the glass substrate. Note that polarizers are bonded to outer face sides of both the substrates 20 and 21, respectively.

The CF substrate 20, as illustrated in FIG. 1, has a short side dimension that is shorter than a short side dimension of the array substrate 21, and is bonded to the array substrate 21 with one end portion in a short side direction (Y-axis direction) aligned with the array substrate 21. Accordingly, the other end portion in the short side direction of the array substrate 21 is a CF substrate non-overlapping portion 21A protruding laterally relative to the CF substrate 20 and not overlapping the CF substrate 20. In the CF substrate non-overlapping portion 21A, the driver (signal supply unit) 11, for supplying various signals for the display function and the touch panel function described below, and a flexible substrate 12 are mounted.

The driver 11 is constituted by a large-scale integration (LSI) chip including a drive circuit in an interior thereof, is chip-on-glass (COG) mounted to the array substrate 21, and processes various signals transmitted by the flexible substrate 12. In the present embodiment, in the non-display region NAA of the liquid crystal panel 10, four of the drivers 11 are disposed aligned with intervals therebetween in the X-axis direction. The driver 11 according to the present embodiment has at least a function of supplying an image signal to a source wiring line (image wiring line) 27, to be described later, and a function of supplying a touch signal to a touch wiring line (position detection wiring line) 31, to be described later, as well as a function of supplying a scanning signal to a gate wiring line (scanning wiring line) 26, to be described later. Thus, three of the side portions of the frame shaped non-display region NAA surrounding the display region AA, excluding the one provided with the drivers 11, are not provided with a gate monolithic circuit or the like for supplying the scanning signal to the gate wiring line 26. Thus, the frame width is set to be extremely small for these three side portions.

The flexible substrate 12 has a configuration in which a wiring line pattern including a plurality of wiring lines are formed on a substrate made of a synthetic resin material (for example, a polyimide resin or the like) having insulating properties and flexibility. The flexible substrate 12 is connected to the non-display region NAA of the liquid crystal panel 10 at one end side, and connected to a control substrate (signal supply source) at the other end side, as illustrated in FIG. 1. Various signals supplied from the control substrate are transmitted to the liquid crystal panel 10 via the flexible substrate 12 and outputted to the display region AA after being processed by the drivers 11 in the non-display region NAA.

The liquid crystal panel 10 according to the present embodiment has a display function for displaying an image and a touch panel function for detecting a position (input position) input by a user based on the displayed image. For the touch panel function, a touch panel pattern configured to exhibit the touch panel function is integrated into the liquid crystal panel 10 (forming an in-cell touch panel). The touch panel pattern is used to form a so-called projected capacitive type touch panel, and the detection type thereof is a self-capacitance type. As illustrated in FIG. 1, the touch panel pattern is constituted by a plurality of touch electrodes (position detection electrodes) 30 disposed side-by-side in a matrix shape in the plate surface of the liquid crystal panel 10. The touch electrodes 30 are disposed in the display region AA of the liquid crystal panel 10. Accordingly, the display region AA of the liquid crystal panel 10 is substantially identical to a touch region (position input region) in which the input position can be detected. The non-display region NAA is substantially identical to a non-touch region (non-position input region) in which the input position cannot be detected. Then, when the user brings a position input member that is a conductor such as a finger of the user or a touch pen operated by the user close to the surface (display surface) of the liquid crystal panel 10 for making a position input, based on the image of the display region AA of the liquid crystal panel 10 viewed by the user, electrostatic capacitance is generated between the position input member and the touch electrode 30. Accordingly, the electrostatic capacitance detected with the touch electrode 30 being close to the position input member changes as the position input member approaches thereto, to be different from that detected with a touch electrode 30 being far from the position input member. Based on such a difference, the input position can be detected.

As illustrated in FIG. 1, the plurality of touch electrodes 30 are disposed side-by-side at intervals in each of the X-axis direction and the Y-axis direction in a matrix shape in the display region AA. The touch electrode 30 has a substantially rectangular shape in plan view, with one side having a dimension of several millimeters. Specifically, in the present embodiment, the touch electrode 30 has a square shape with a dimension of one side being, for example, approximately 5 mm. Thus, the touch region (display region AA) of the liquid crystal panel 10 with the screen size of 89.5 inches has 397 touch electrodes in the long side direction (X-axis direction) and 223 touch electrodes in the short side (Y-axis direction), and thus includes a total of 88531 touch electrodes. Accordingly, the size of the touch electrode 30 is much larger than that of a pixel PX described later in plan view. Thus, each touch electrode 30 is provided in a range over a plurality of (10 for example) pixels PX in each of the X-axis direction and the Y-axis direction. The specific numerical values such as the dimension of one side of the touch electrode 30 and the number of touch electrodes 30 provided in the touch region can be changed as appropriate from those described above. Note that the number of touch electrodes 30 illustrated in FIG. 1 does not match the number of electrodes provided (88531) as described above, since FIG. 1 merely illustrates a schematic array of touch electrodes 30.

As illustrated in FIG. 1, a plurality of touch wiring lines (position detection wiring lines) 31 provided in the liquid crystal panel 10 are selectively connected to the plurality of touch electrodes 30. The touch wiring line 31 extends substantially along the Y-axis direction so as to cross the display region AA, and has one end side connected to the driver 11 in the non-display region NAA, and has the other end side connected to a certain touch electrode 30 of the plurality of touch electrodes 30 aligned in the Y-axis direction in the display region AA. Note that in FIG. 1, a large black dot represents the connected portion of the touch wiring line 31 to the touch electrode 30. Furthermore, the touch wiring line 31 is connected to a detection circuit. The detection circuit may be provided in the driver 11, or may be provided outside of the liquid crystal panel 10 and connected via the flexible substrate 12. A detailed configuration of the touch wiring line 31 will be described later.

Figure 2:
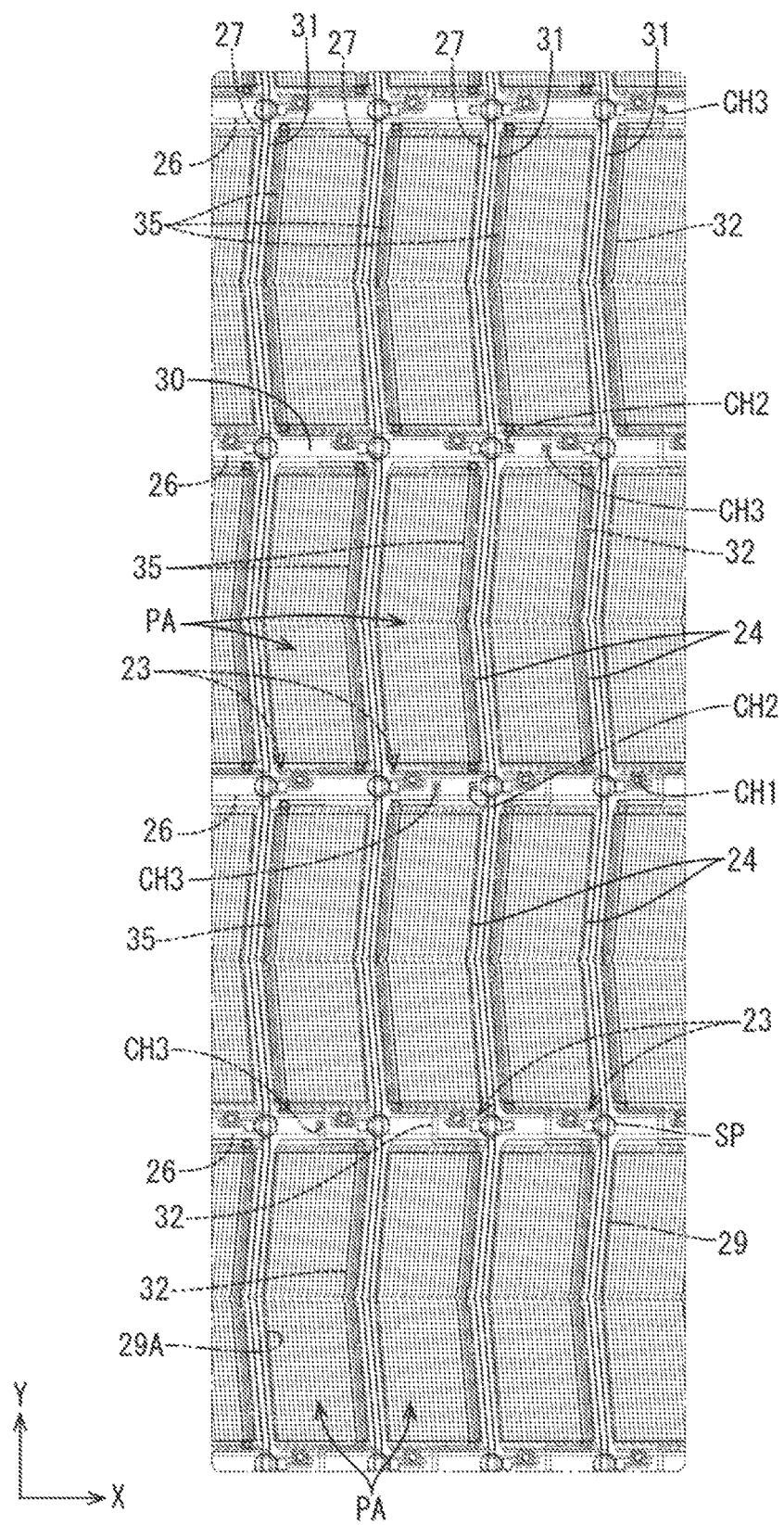
FIG. 2 is a plan view of a display region of an array substrate 21 constituting the liquid crystal panel.
Figure 3:
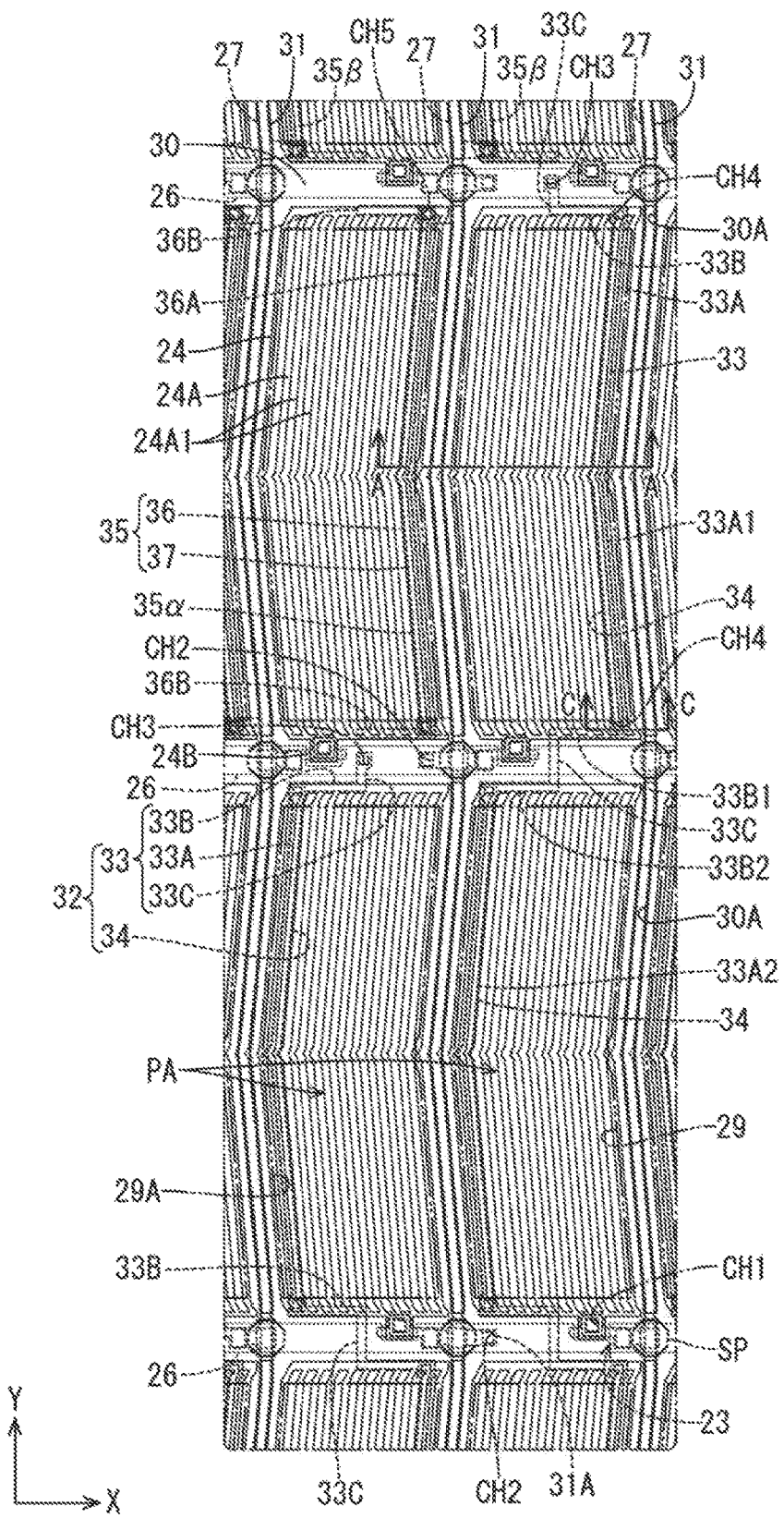
FIG. 3 is a partially enlarged plan view of the array substrate in FIG. 2.

FIG. 2 is a plan view of the display region AA of the array substrate 21 constituting the liquid crystal panel 10. FIG. 3 is an enlarged plan view of a part of FIG. 2. As illustrated in FIGS. 2 and 3, a thin film transistor (TFT; switching element) 23 and a pixel electrode 24 are provided on an inner surface side of the display region AA of the array substrate 21 constituting the liquid crystal panel 10. A plurality of the TFTs 23 and the pixel electrodes 24 are provided in a matrix shape with intervals therebetween in the X-axis direction (row direction) and the Y-axis direction (column direction). Among these, the pixel electrodes 24 constitute the pixel PX, which is a unit of display. A plurality of gate wiring lines (scanning wiring lines) 26 and a plurality of source wiring lines (image wiring lines, data wiring lines) 27 substantially orthogonal to (intersecting) each other are provided around the TFTs 23 and the pixel electrodes 24. The gate wiring line 26 substantially linearly extends along the X-axis direction while having the line width changing at an intermediate part, whereas the source wiring line 27 extends substantially along the Y-axis direction while being repeatedly bent to be in a zigzag form. The gate wiring line 26 is connected to a gate electrode 23A provided to the plurality of TFTs 23 aligned in the X-axis direction, and a plurality of the gate wiring lines 26 are disposed side-by-side at intervals in the Y-axis direction. The source wiring line 27 is connected to a source electrode 23B provided to the plurality of TFTs 23 disposed side-by-side along the Y-axis direction, and a plurality of the source wiring lines 27 are disposed side-by-side at intervals in the X-axis direction. The TFT 23 is driven based on various signals respectively supplied to the gate wiring line 26 and the source wiring line 27, and with the driving of the TFT 23, the supply of electrical potential to the pixel electrode 24, connected to the drain electrode 23C of the TFT 23, is controlled. Note that a plurality of the TFTs 23 are arranged in a zigzag shape, with those connected to the pixel electrodes 24 on the left side and those connected to the pixel electrodes 24 on the right side, illustrated in FIGS. 2 and 3 with respect to the source wiring line 27 that is the connection target, being arranged repeatedly and alternately in the Y-axis direction.

As illustrated in FIG. 3, a substantially rectangular region with vertical elongation surrounded by a plurality of the gate wiring lines 26 and the source wiring lines 27 is a pixel region PA in which the pixel PX (pixel electrode 24) is located. The shape of the pixel region PA is defined by the gate wiring line 26 and the source wiring line 27, and thus the long side thereof is bent partway along the source wiring line 27. The range in which the pixel electrode 24 is formed is slightly smaller than that for the pixel region PA. The pixel electrode 24 includes a pixel electrode main body 24A having a vertically elongated substantially rectangular shape in plan view that is similar to that of the pixel region PA, and has the long side bent partway along the source wiring line 27, similar to the pixel region PA. Specifically, the pixel electrode main body 24A is slightly inclined relative to the Y-axis direction at both side edges in the longitudinal direction thereof, and bent once at a substantially central position, thereby forming a shallow V-shape in which the apex angle is an obtuse angle Each pixel electrode main body 24A has a plurality of (10 in FIG. 3 and the like) slits 24A1 formed extending along the long side direction (Y-axis direction) of the pixel electrode main body 24A. The slits 24A1 are formed in a bent shape along the longitudinal side edge of the pixel electrode main body 24A. Note that the specific installation quantity, shape, formation range and the like of the slits 24A1 can be changed as appropriate to other than those illustrated.

In the present embodiment, the resolution of the liquid crystal panel 10 is "7680×4320" which is equivalent to 8K resolution, three-color color filters 28 are configured so that those of different colors are arranged repeatedly along the extending direction the gate wiring lines 26 (X-axis direction) as described later, and thus the number of installations of the source wiring lines 27 is "7680×3=23040" and the number of installations of the gate wiring lines 26 is "4320". Note that a light blocking portion (inter-pixel light blocking portion, black matrix) 29 illustrated by a two-dot chain line in FIG. 2 is formed on the CF substrate 20 side. As illustrated in FIGS. 2 and 3, the light blocking portion 29 has a planar shape that is substantially a lattice pattern, partitioning the areas between the adjacent pixel electrodes 24, and includes a pixel opening 29A at a position overlapping a large portion of the pixel electrode 24 in plan view. This pixel opening 29A allows the transmitted light of the pixel electrode 24 to be emitted outside the liquid crystal panel 10. The light blocking portion 29 is disposed overlapping at least the gate wiring line 26, and the source wiring line 27 (also including a touch wiring line 31) on the array substrate 21 side, in plan view. The arrangement of the TFT 23 and the pixel electrode 24 and the like will be described later. In the CF substrate 20, a spacer SP for maintaining the interval between the pair of substrates 20 and 21 is provided in the vicinity of an intersection portion between the gate wiring lines 26 and the source wiring lines 27.

Figure 4:
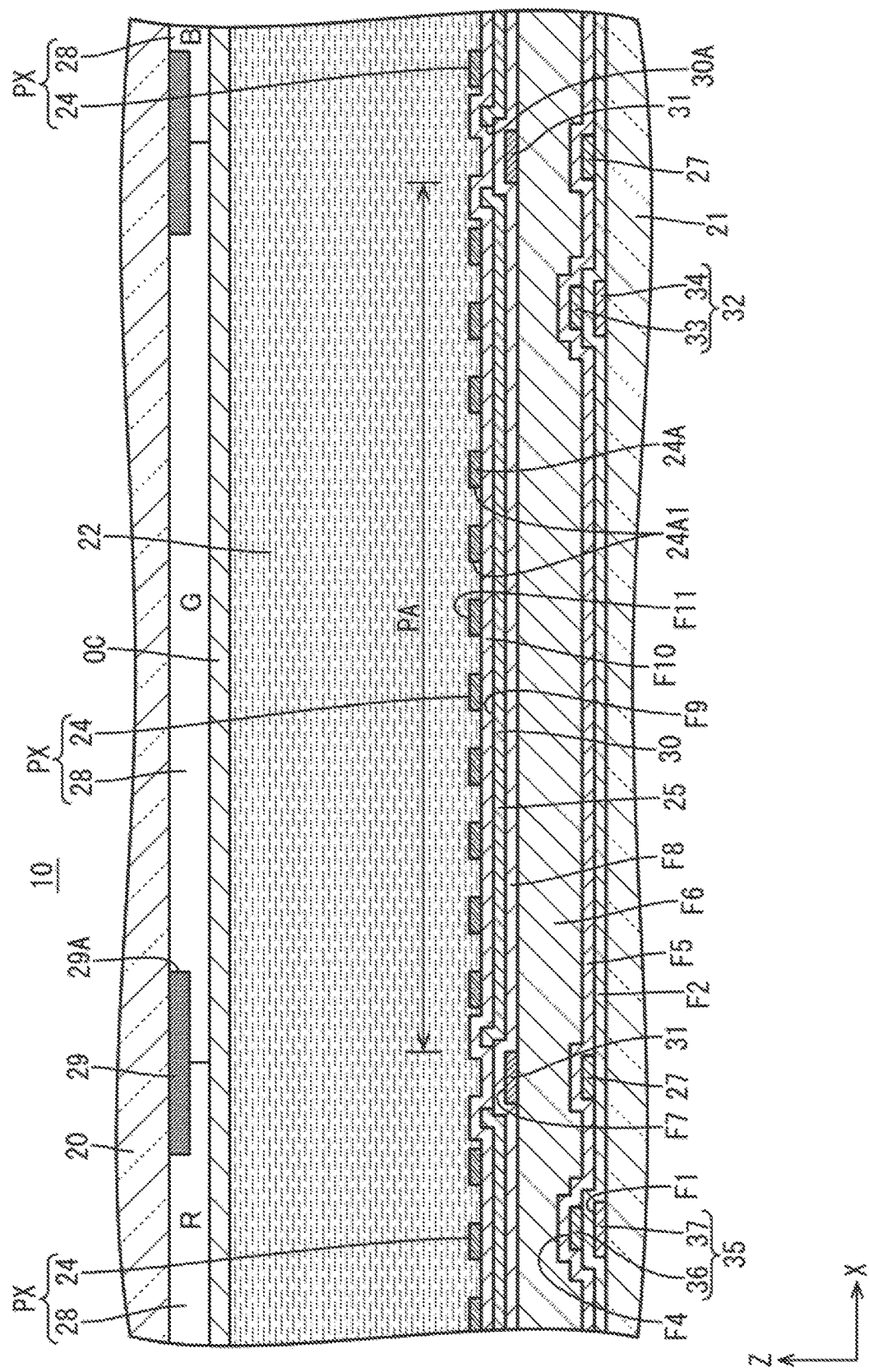
FIG. 4 is a cross-sectional view of the liquid crystal panel taken along line A-A of FIG. 3.

FIG. 4 is a cross-sectional view of the liquid crystal panel 10 near a center portion of the pixel PX (cross-sectional view taken along line A-A of FIG. 3). As illustrated in FIG. 4, the liquid crystal panel 10 includes a liquid crystal layer (medium layer) 22 that is disposed between the pair of substrates 20 and 21 and containing liquid crystal molecules, which are substances having optical characteristics that change in accordance with application of an electrical field. The three-color color filters 28 exhibiting blue (B), green (G), and red (R) are provided to the display region AA on an inner surface side of the CF substrate 20 constituting the liquid crystal panel 10. A large number of the color filters 28 providing the different colors are repeatedly arranged along the extending direction (X-axis direction) of the gate wiring lines 26, and extend along the extending direction (substantially Y-axis direction) of the source wiring lines 27 to be arranged in a stripe shape as a whole. These color filters 28 are arranged to overlap with the pixel electrodes 24 on the array substrate 21 side in plan view. The color filters 28 adjacent to each other in the X-axis direction and providing different colors are arranged to have the boundary (color boundary) therebetween overlapping with the source wiring line 27 (including the touch wiring line 31) and the light blocking portion 29. In this liquid crystal panel 10, the R, G, and B color filters 28 aligned in the X-axis direction and three pixel electrodes 24 facing each of the color filters 28 respectively constitute the three-color pixel PX. Then, in this liquid crystal panel 10 are configured display pixels capable of color display with predetermined gradation by the R, G, and B three-color pixels PX adjacent to each other in the X-axis direction. An arrangement pitch of the pixels PX in the X-axis direction is, for example, about 86 μm, and an arrangement pitch of the pixels PX in the Y-axis direction is about 258 μm, for example, and thus is about three times as long as that in the X-axis direction. The light blocking portion 29 is disposed to provide partitioning between the color filters 28 adjacent to each other. An overcoating film OC for flattening is disposed in a solid manner across substantially the entire region of the CF substrate 20 is provided on the upper layer side (liquid crystal layer 22 side)

of the color filters 28. The spacer SP described above is formed on the inner surface side of the overcoating film OC. Note that alignment films for aligning the liquid crystal molecules included in the liquid crystal layer 22 are respectively formed on innermost faces of both of the substrates 20 and 21 that are in contact with the liquid crystal layer 22.

Next, a common electrode 25 will be described with reference to FIGS. 3 and 4. On the inner surface side of the display region AA of the array substrate 21, as illustrated in FIGS. 3 and 4, the common electrode 25 is formed on the lower layer side of the pixel electrodes 24 in a manner that overlaps all of the pixel electrodes 24. The common electrode 25 is supplied with a common potential signal (reference potential signal) of a common potential (reference potential), except for a period (sensing period) during which a touch signal (position detection signal) is supplied to detect the input position by the position input member, and extends substantially across the entire display region AA. When a potential difference is generated as the pixel electrodes 24 are charged between the pixel electrodes 24 and the common electrodes 25 overlapping each other, a fringe electrical field (oblique electrical field) including a component along a plate surface of the array substrate 21 as well as a component in a direction normal to the plate surface of the array substrate 21 is generated between opening edges of slits 24A1 in the pixel electrodes 24 and the common electrode 25. Accordingly, by using this fringe electrical field, it is possible to control the alignment state of the liquid crystal molecules included in the liquid crystal layer 22. In other words, the liquid crystal panel 10 according to the present embodiment has an operation mode of a Fringe Field Switching (FFS) mode.

As illustrated in FIG. 1, the common electrode 25 constitutes the touch electrode 30 described above. The common electrode 25 has a partitioning opening portion (partitioning slit) 25A partitioning between the adjacent touch electrodes 30. The partition opening 25A includes a section extending substantially in the X-axis direction across the entire lateral length of the common electrode 25 and a section extending substantially in the Y-axis direction across the entire vertical length of the common electrode 25, and has a substantially lattice shape as a whole in plan view. The common electrode 25 includes a plurality of touch electrodes 30 that are partitioned by the partitioning opening portion 25A to form a substantially grid shape in plan view, and are each electrically independent from the other. A common potential signal related to the image display function and a touch signal (position detection signal) related to the touch panel function are supplied to the touch wiring line 31 connected to the touch electrode 30 from the driver 11 in a time division manner. The timing at which the common potential signal is supplied from the driver 11 to the touch wiring line 31 is a display period, and the timing at which the touch signal is supplied from the driver 11 to the touch wiring line 31 is the sensing period (position detection period). This common potential signal is transmitted to all of the touch wiring lines 31 at the same timing (display period). As a result, all of the touch electrodes 30 are at the reference potential based on the common potential signal and thus function as the common electrode 25.

Figure 5:
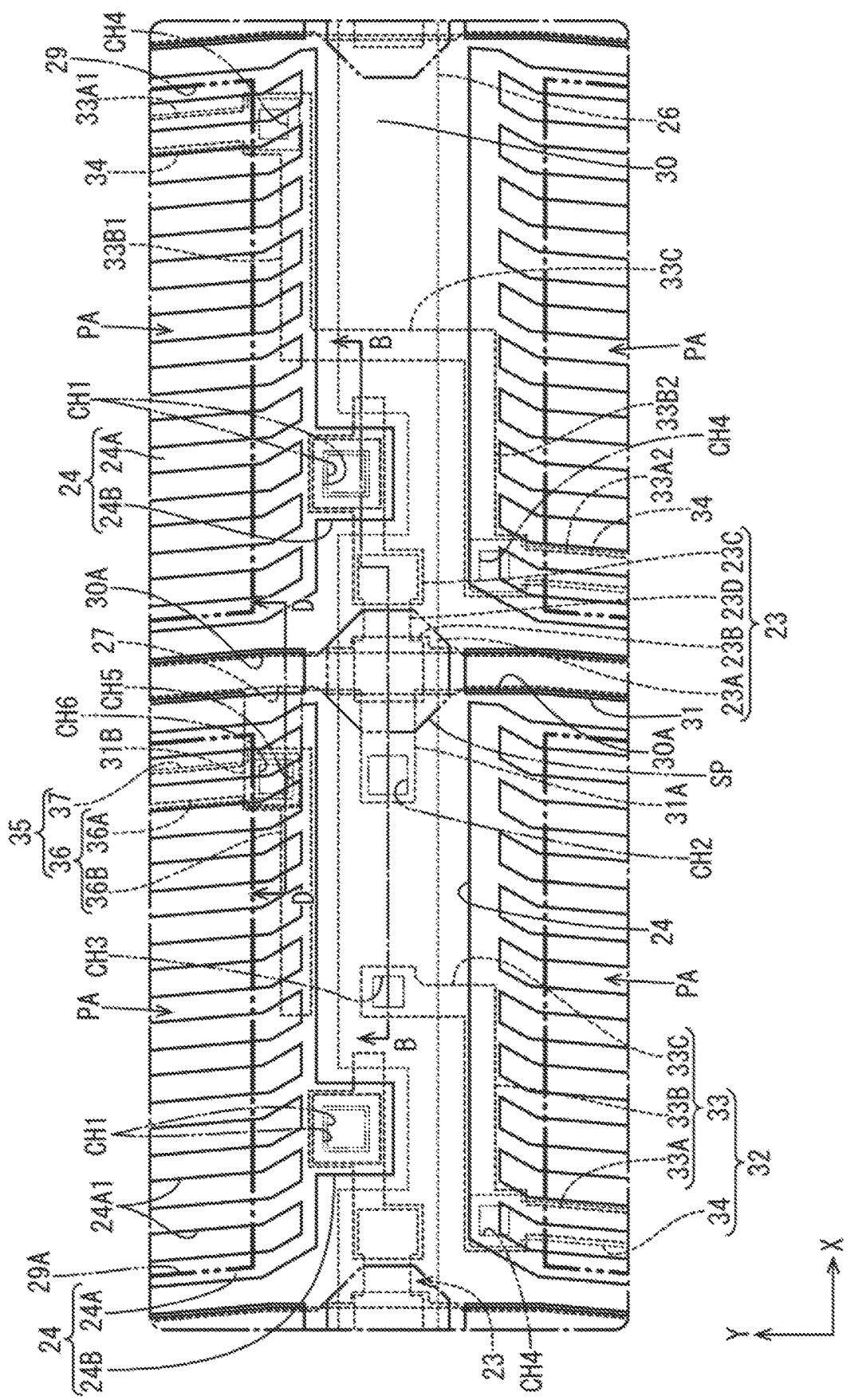
FIG. 5 is a partially enlarged (around TFT) plan view of the array substrate in FIG. 3.

The configuration of the TFT 23 and the pixel electrode 24 will be described in detail with reference to FIG. 5. FIG. 5 is an enlarged plan view of a portion, in the array substrate 21, around a certain TFT 23. As illustrated in FIG. 5, the TFT 23 has a horizontally elongated shape extending along the X-axis direction as a whole, and is disposed adjacent to and on the lower side in FIG. 5 of the pixel electrode 24 that is the connection target in the Y-axis direction. The TFT 23 includes the gate electrode 23A formed by a part of the gate wiring line 26 (near a portion of intersection with the source wiring line 27). The gate electrode 23A has a horizontally elongated shape extending along the X-axis direction, and drives TFT 23 based on the scanning signal supplied to the gate wiring line 26, whereby the current between the source electrode 23B and the drain electrode 23C is controlled. The TFT 23 includes the source electrode 23B formed by a part of the source wiring line 27 (near a portion of intersection with the gate wiring line 26). The source electrode 23B is disposed on one end side of the TFT 23 in the X-axis direction, almost entirely overlaps with the gate electrode 23A, and is connected to a channel portion 23D. The TFT 23 has the drain electrode 23C disposed at a position spaced apart from the source electrode 23B, that is, on the other end side of the TFT 23 in the X-axis direction. The drain electrode 23C extends substantially along the X-axis direction, has one end side overlapping the gate electrode 23A while facing the source electrode 23B and being connected to the channel portion 23D, and has the other end side connected to the pixel electrode 24.

As illustrated in FIG. 5, the TFT 23 includes the channel portion (semiconductor portion) 23D that overlaps with the gate electrode 23A with a gate insulating film F2 described later provided in between, and is connected to the source electrode 23B and the drain electrode 23C. The channel portion 23D overlaps with the gate electrode 23A, extends along the X-axis direction, has one end side connected to the source electrode 23B, and has the other end side connected to the drain electrode 23C. When the TFT 23 is turned ON based on the scanning signal supplied to the gate electrode 23A, the image signal (data signal) supplied to the source wiring line 27 is supplied from the source electrode 23B to the drain electrode 23C via the channel portion 23D including a semiconductor film F3. As a result, the pixel electrode 24 is charged to the potential based on the image signal.

As illustrated in FIG. 5, the pixel electrode 24 includes a contact portion 24B protruding toward the TFT 23 along the Y-axis direction from the pixel electrode main body 24A. The contact portion 24B is disposed overlapping with the other end side of the drain electrode 23C, and their overlapping parts are connected to each other through a pixel contact hole CH1. Note that a range of the gate wiring line 26 overlapping with both the contact portion 24B and the drain electrode 23C is notched. This notch is provided to reduce the capacitance between the gate wiring line 26 and the pixel electrode 24. The other end of the drain electrode 23C overlaps with the gate wiring line 26. This arrangement is for preventing the capacitance between the gate wiring line 26 and the drain electrode 23C (that is, the pixel electrode 24) from varying even when the drain electrode 23C is displaced with respect to the gate wiring line 26 during the manufacturing of the array substrate 21.

Figure 6:
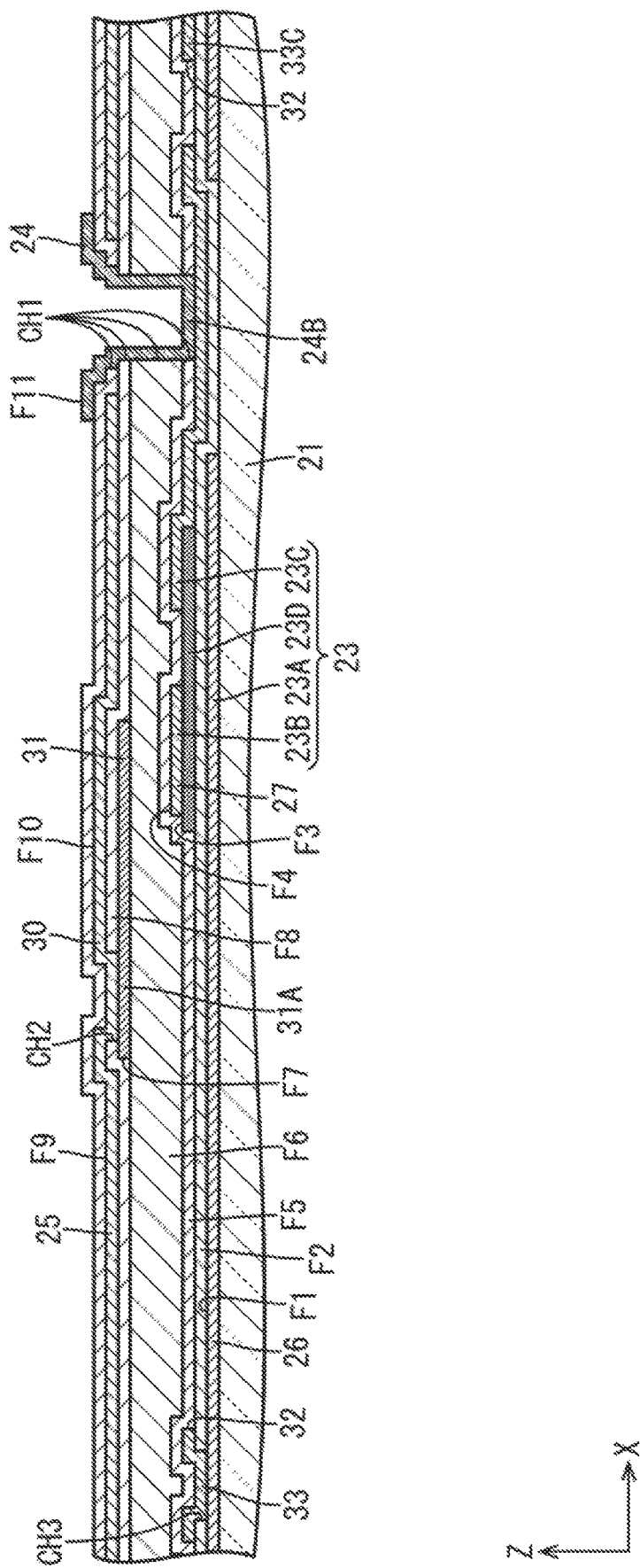
FIG. 6 is a cross-sectional view of the array substrate taken along line B-B of FIG. 5.

The various films layered and formed on the inner surface side of the array substrate 21 will now be described with reference to FIG. 6. FIG. 6 is a cross-sectional view of the liquid crystal panel 10 near the TFT 23 (cross-sectional view taken along line B-B of FIG. 5). As illustrated in FIG. 6, in the array substrate 21, a first metal film F1, the gate insulating film F2, the semiconductor film F3, a second metal film F4, a first interlayer insulating film F5, a flattening film F6, a third metal film F7, a second interlayer insulating film F8, a first transparent electrode film F9, a third interlayer insulating film F10, and a second transparent electrode film F11 are layered in this order from the lower layer side (glass substrate side). The first metal film F1, the second metal film F4, and the third metal film F7 are each a single layer film made of one type of metal material selected from copper, titanium, aluminum, molybdenum, tungsten, and the like, or a layered film or alloy made of a different types of metal materials, and thus have conductivity and light-blocking properties. The first metal film F1 constitutes the gate wiring line 26, the gate electrode 23A of the TFT 23, and the like. The second metal film F4 constitutes the source wiring line 27, the source electrode 23B, the drain electrode 23C of the TFT 23, and the like. The third metal film F7 constitutes the touch wiring line 31 and the like. The semiconductor film F3 is formed of a thin film using, for example, an oxide semiconductor, amorphous silicon, or the like as the material thereof, and constitutes the channel portion 23D of the TFT 23 and the like. The first transparent electrode film F9 and the second transparent electrode film F11 are made of a transparent electrode material (for example, indium tin oxide (ITO), indium zinc oxide (IZO), and the like). The first transparent electrode film F9 constitutes the common electrode 25 (touch electrode 30) and the like. The second transparent electrode film F11 constitutes the pixel electrode 24 and the like.

The gate insulating film F2, the first interlayer insulating film F5, the second interlayer insulating film F8, and the third interlayer insulating film F10 are each made of an inorganic material such as silicon nitride ($SiN_x$) or silicon oxide ($SiO_2$). The flattening film F6 is made of an organic material such as polymethyl methacrylate (PMMA; acrylic resin), for example, and has a film thickness greater than those of the other insulating film F2, F5, F8, and F10 made of inorganic material, as illustrated in FIG. 6. This flattening film F6 flattens the surface of the array substrate 21. The gate insulating film F2 maintains the insulated state between the first metal film F1 on the lower layer side and the semiconductor film F3 and the second metal film F4 on the upper layer side. The first interlayer insulating film F5 and the flattening film F6 maintain the insulated state between the semiconductor film F3 and the second metal film F4 on the lower layer side and the third metal film F7 on the upper layer side. Positions in the first interlayer insulating film F5, the flattening film F6, the second interlayer insulating film F8, and the third interlayer insulating film F10, overlapping with both of the drain electrode 23C formed by the second metal film F4 and the contact portion 24B of the pixel electrode 24 formed by the first transparent electrode film F9, are perforated, whereby the pixel contact hole CH1 for establishing connection between these 23C and 24B is formed. The second interlayer insulating film F8 maintains the insulated state between the third metal film F7 on the lower layer side and the first transparent electrode film F9 on the upper layer side. The third interlayer insulating film F10 maintains the insulated state between the first transparent electrode film F9 on the lower layer side and the second transparent electrode film F11 on the upper layer side in an insulated state.

Figure 7:
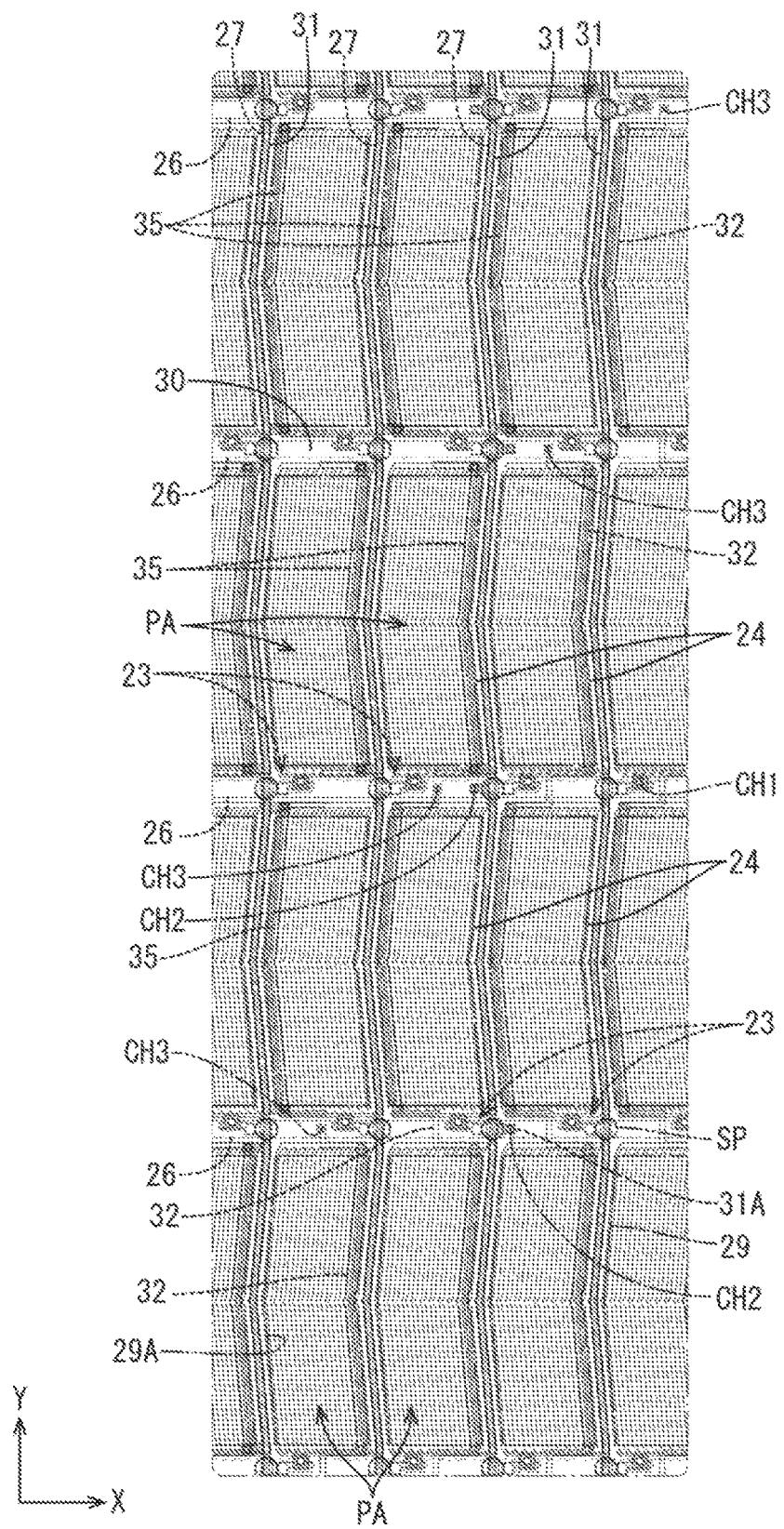
FIG. 7 is a plan view illustrating a pattern of a third metal film of the array substrate within a range that is the same as that illustrated in FIG. 2.
Figure 8:
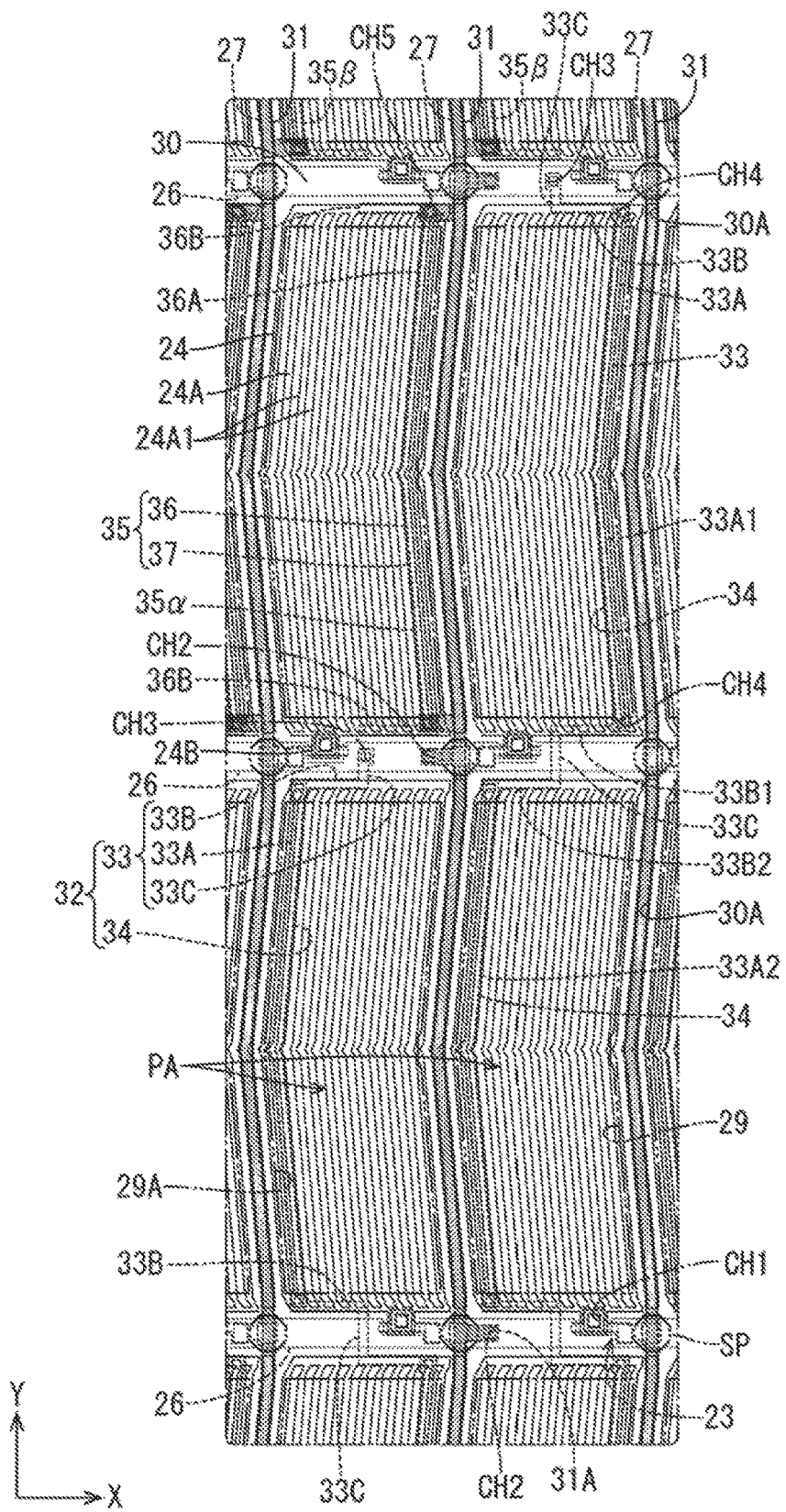
FIG. 8 is a plan view illustrating a pattern of the third metal film of the array substrate within a range that is the same as that illustrated in FIG. 3.
Figure 9:
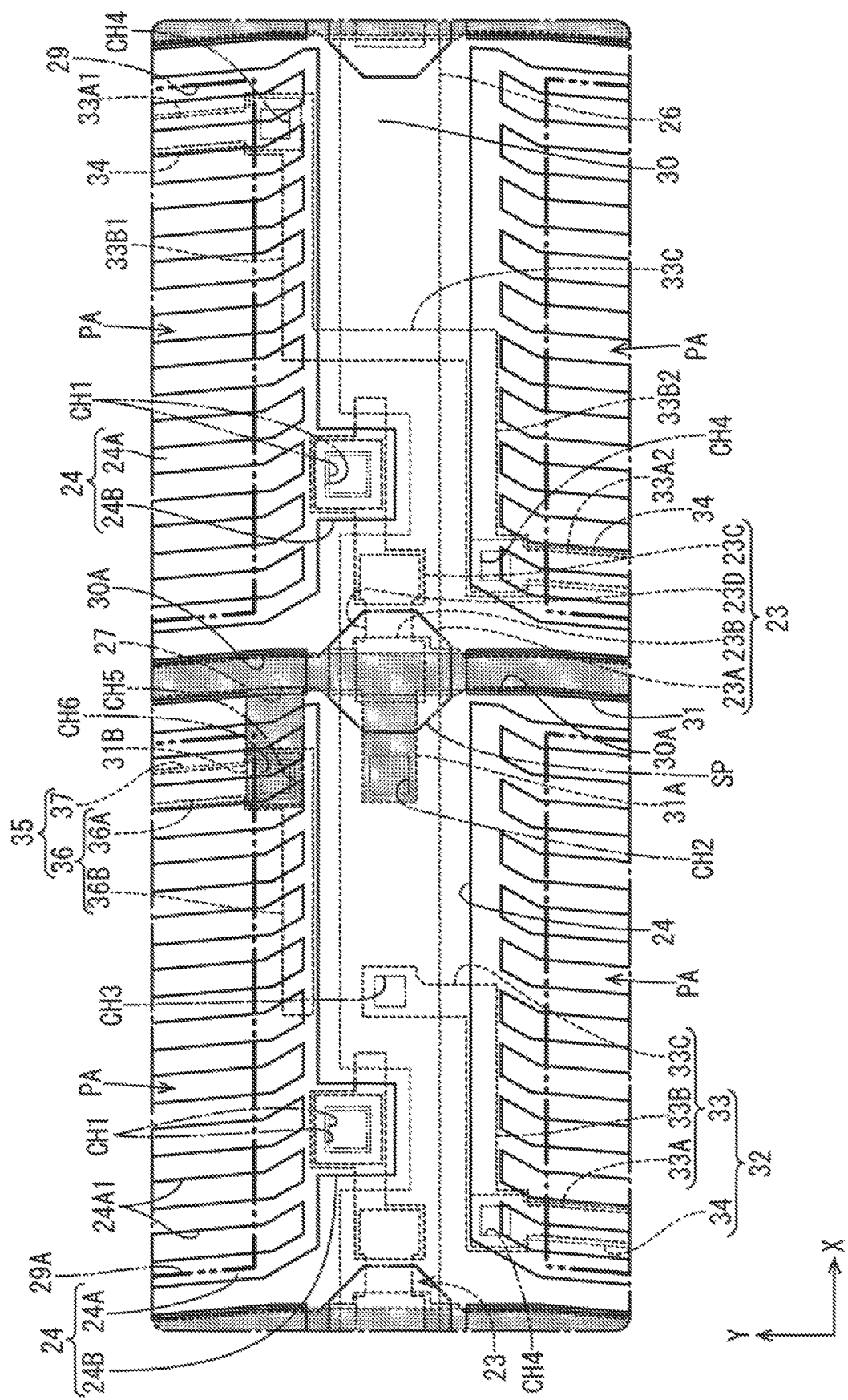
FIG. 9 is a plan view illustrating a pattern of the third metal film of the array substrate within a range that is the same as that illustrated in FIG. 5.

A detailed configuration of the touch wiring line 31 will be described by mainly referring to FIG. 4 and FIGS. 6 to 9. FIGS. 7 to 9 are plan views illustrating a pattern of the third metal film F7 (such as the touch wiring line 31) provided on the array substrate 21, in different scales. In FIGS. 7 to 9, the range in which the third metal film F7 is formed is hatched. As illustrated in FIGS. 4, 7, and 8, the touch wiring line 31 has substantially the same shape as the source wiring line 27 in plan view and is arranged so as to overlap with a large portion of the source wiring line 27. In other words, similar to the source wiring line 27, the touch wiring line 31 extends substantially in the Y-axis direction while being repeatedly bent into a zigzag shape. The number of touch wiring lines 31 installed is equal to the number of source wiring lines 27 installed. The touch wiring line 31 is formed by the third metal film F7. Accordingly, the first interlayer insulating film F5 and the flattening film F6 are interposed between the touch wiring line 31 and the source wiring line 27 made by the second metal film F4, whereby the insulated state between the wiring lines 27 and 31 is maintained. With this configuration, compared to a case where the wiring lines are arranged without overlapping, a large area of the pixel region PA is ensured, which is suitable for improving the aperture ratio.

As illustrated in FIG. 9, the touch wiring line 31 is provided with a touch electrode contact portion 31A connected to the touch electrode 30. The touch electrode contact portion 31A is provided in a portion of the touch wiring line 31, extending across the display region AA in the Y-axis direction, overlapping with the touch electrode 30 as the connection target. The touch electrode contact portion 31A is formed branching and extending along the X-axis direction from the touch wiring line 31 extending substantially in the Y-axis direction. The touch electrode contact portion 31A is connected to the portion of the touch wiring line 31 intersecting with the gate wiring line 26, and thus is regarded to be overlapping with the gate wiring line 26. The extending direction of the touch electrode contact portion 31A from the touch wiring line 31 is opposite to the direction toward the side where TFT 23 is disposed with respect to the source wiring line 27. As illustrated in FIG. 6, the second interlayer insulating film F8 interposed between the touch electrode contact portion 31A formed by the third metal film F7 and the touch electrode 30 formed by the first transparent electrode film F9 is perforated, so that a touch electrode contact hole CH2 for connecting these is formed. Note that, as illustrated in FIGS. 7 and 8, a plurality of the touch electrode contact portions 31A and a plurality of the touch electrode contact holes CH2 are provided, whereby the touch electrode 30 and the touch wiring line 31 are connected to each other at a plurality of portions.

As illustrated in FIGS. 4, 8, and 9, the touch electrode 30 is provided with a touch wiring line overlapping opening portion (position detection wiring line overlapping opening portion) 30A arranged so as to overlap with a part of the touch wiring line 31. The touch wiring line overlapping opening portion 30A extends in parallel to the extending direction of the touch wiring line 31, and has a vertically elongated shape in plan view that is bent partway along the touch wiring line 31. The touch wiring line overlapping opening portion 30A is provided in a portion of the touch wiring line 31 crossing the pixel region PA (a portion other than the portion crossing the gate wiring line 26) in the Y-axis direction. Additionally, a width dimension (dimension in the X-axis direction) of the touch wiring line overlapping opening portion 30A is larger than a width dimension of the touch wiring line 31. With the touch wiring line overlapping opening portion 30A thus disposed to overlap with at least a portion of each touch wiring line 31, the parasitic capacitance that may be generated between the touch wiring line 31 and the touch electrode 30 that is not connected to the touch wiring line 31 is reduced. Accordingly, the excellent detection sensitivity can be achieved for position detection.

The liquid crystal panel 10 according to the present embodiment has the driver 11 with the function of supplying the scanning signal to the gate wiring line 26 as described above (see FIG. 1). To provide this function, the array substrate 21 is provided with a gate connection wiring line 32 for connecting the driver 11 and the gate wiring line 26. The gate connection wiring line 32 has one end side connected to the driver 11 in the non-display region NAA, and has the other end side connected to a certain gate wiring line 26 of the plurality of gate wiring lines 26 arranged along the Y-axis direction in the display region AA. The gate connection wiring line 32 is disposed in the display region AA and in a side portion of the non-display region NAA where the driver 11 is disposed, and is not disposed in the remaining three side portions in the non-display region NAA. With the gate connection wiring lines 32, the scanning signals output from the driver 11 is sequentially supplied to the plurality of gate wiring lines 26 arranged along the Y-axis direction, whereby the pixels PX positioned in the plurality of respective pixel regions PA arranged along the Y-axis direction are sequentially scanned, and thus switching of their display state, and the like are implemented. Note that the number of the gate connection wiring lines 32 installed is the same as the number of the gate wiring lines 26 arranged.

Figure 10:
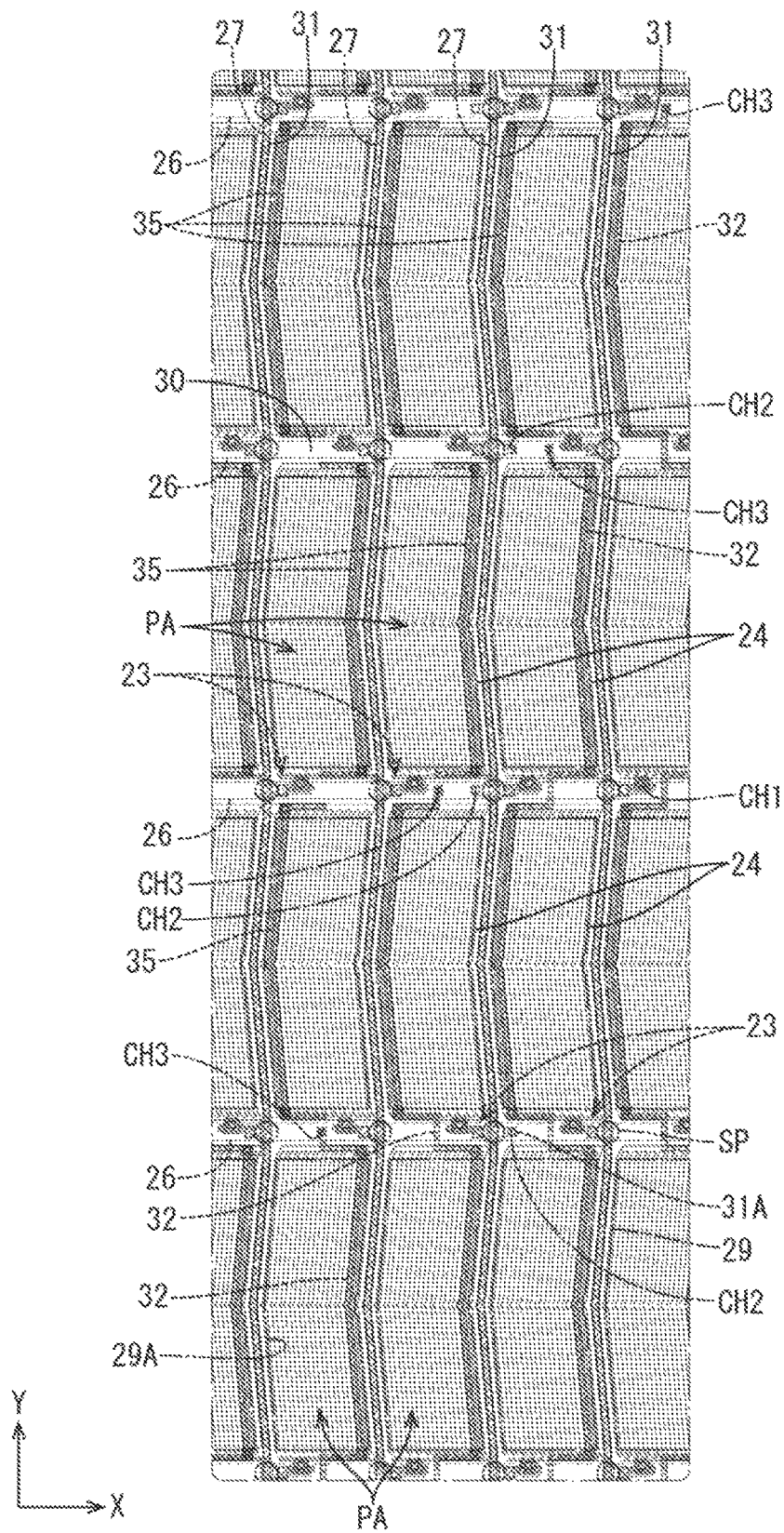
FIG. 10 is a plan view illustrating a pattern of a second metal film of the array substrate within a range that is the same as that illustrated in FIG. 2.
Figure 11:
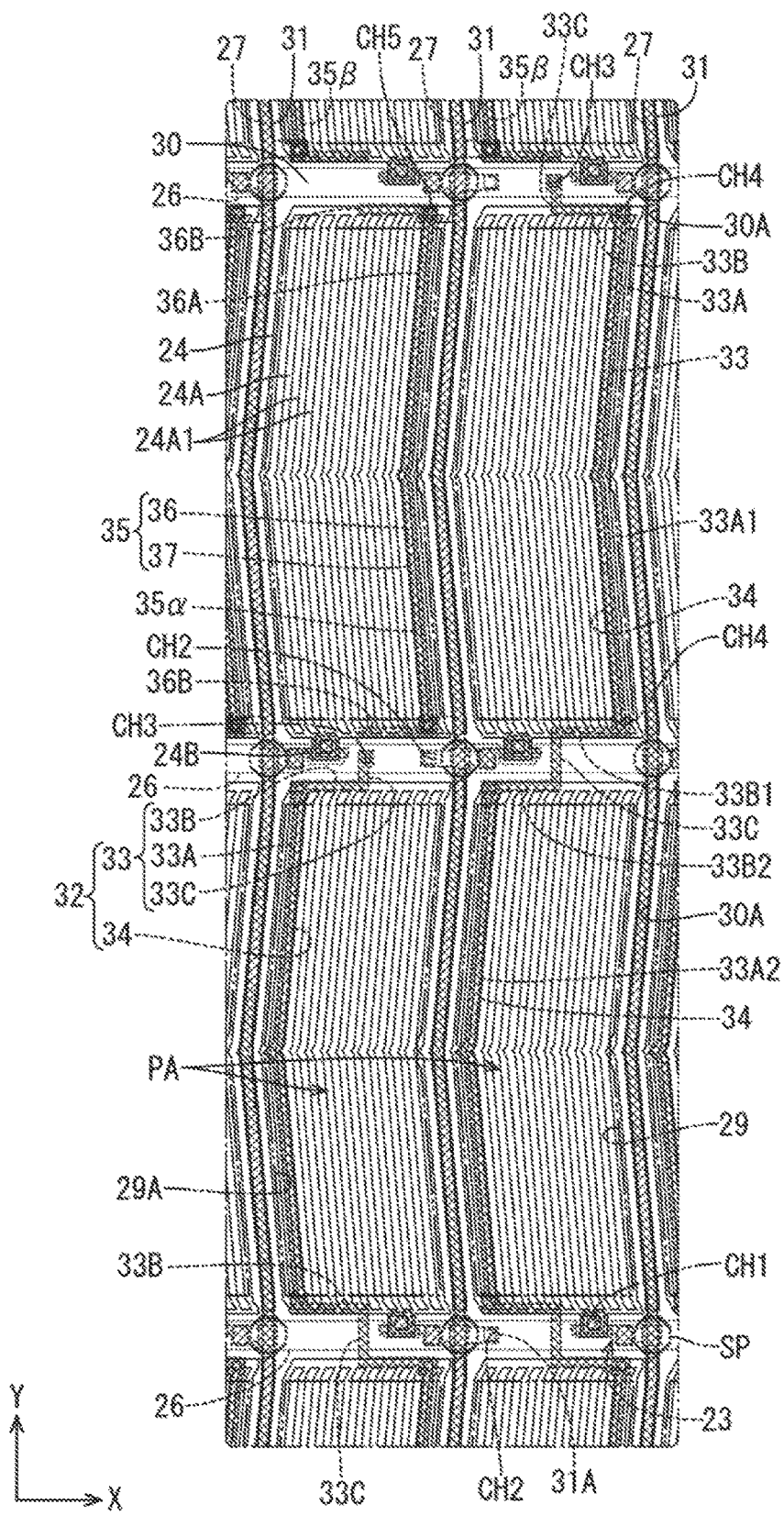
FIG. 11 is a plan view illustrating a pattern of the second metal film of the array substrate within a range that is the same as that in FIG. 3.
Figure 12:
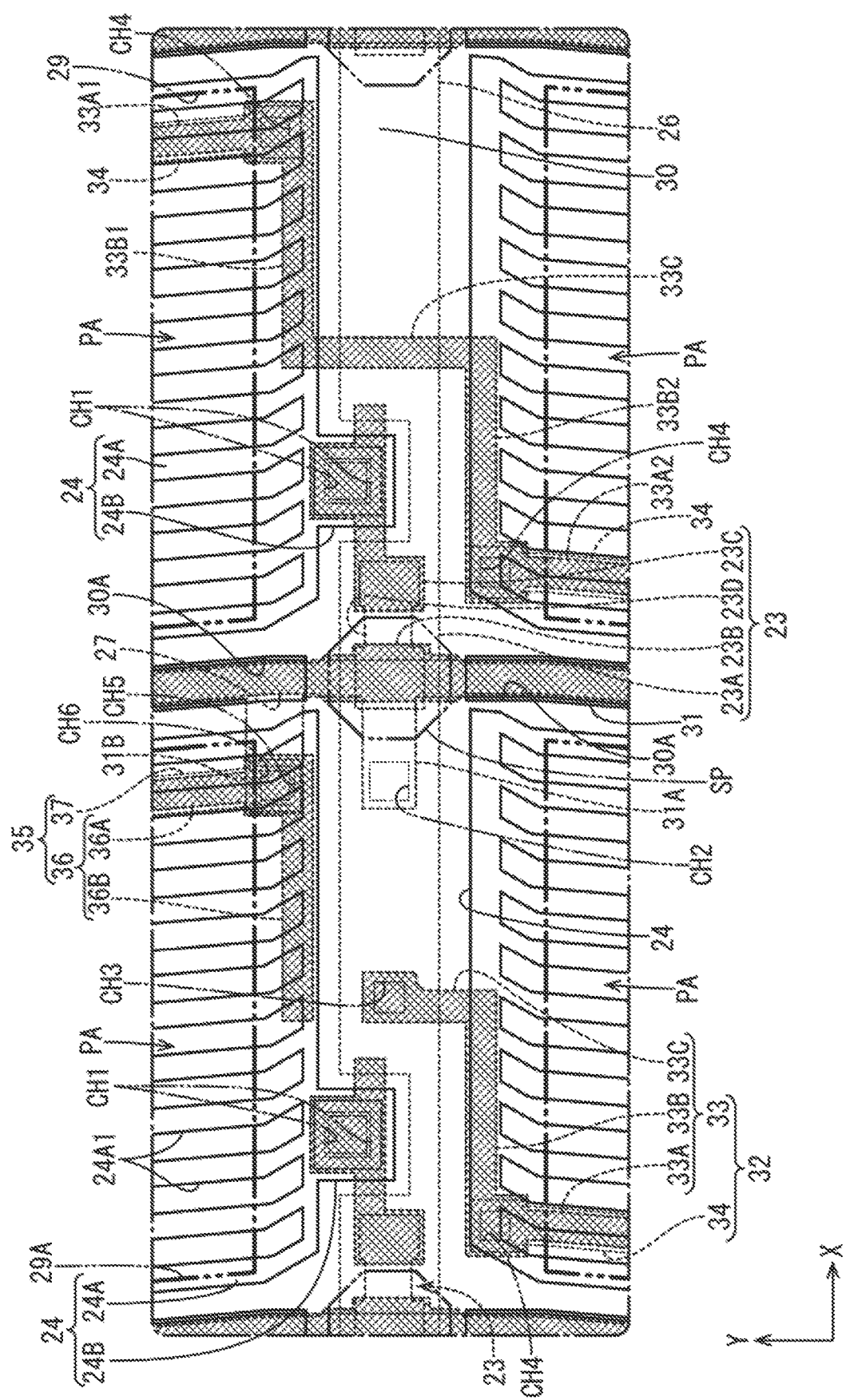
FIG. 12 is a plan view mainly illustrating a pattern of the second metal film of the array substrate within a range that is the same as that in FIG. 5.
Figure 13:
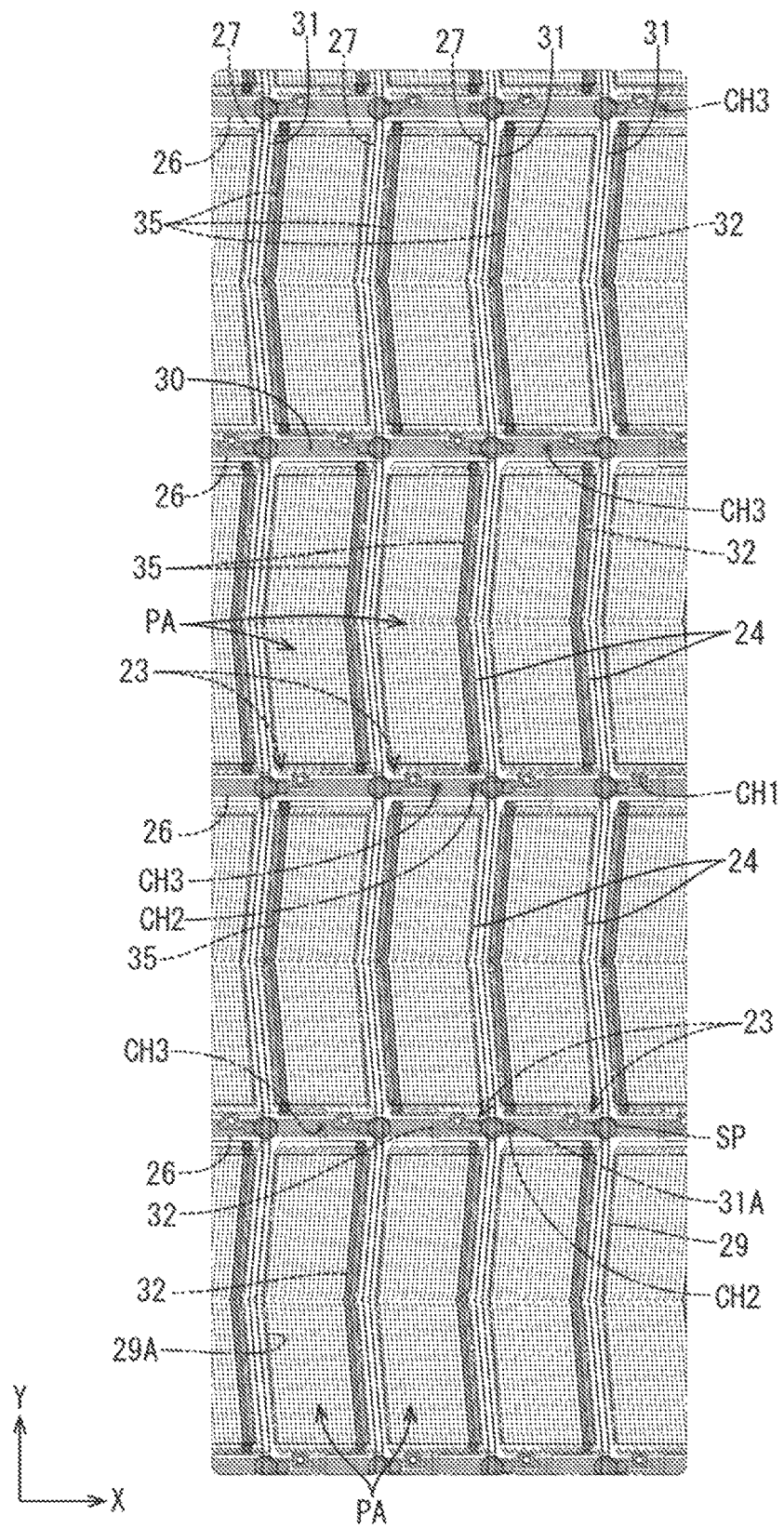
FIG. 13 is a plan view illustrating a pattern of a first metal film of the array substrate within a range that is the same as that in FIG. 2.
Figure 14:
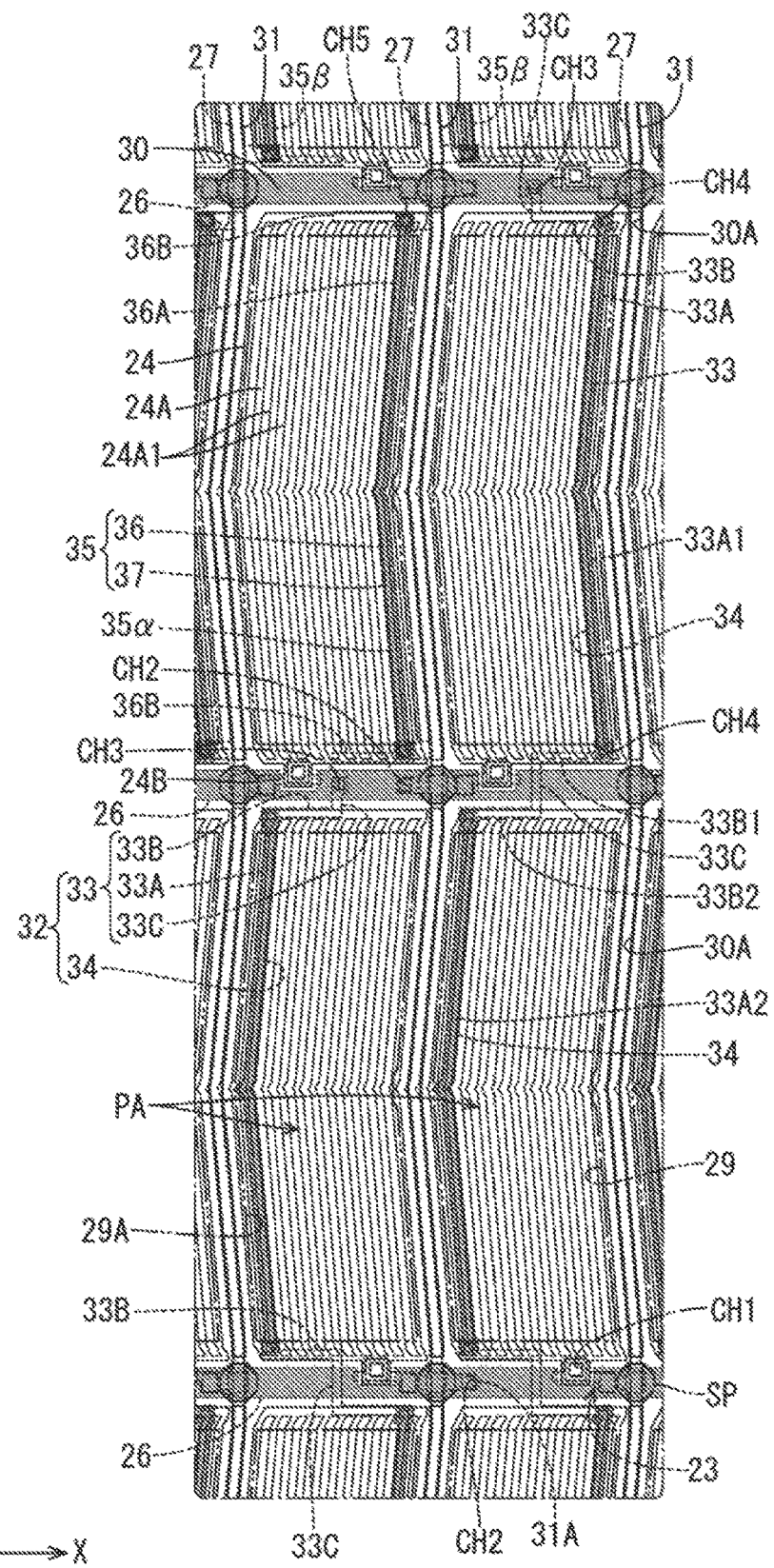
FIG. 14 is a plan view illustrating a pattern of the first metal film of the array substrate within a range that is the same as that in FIG. 3.
Figure 15:
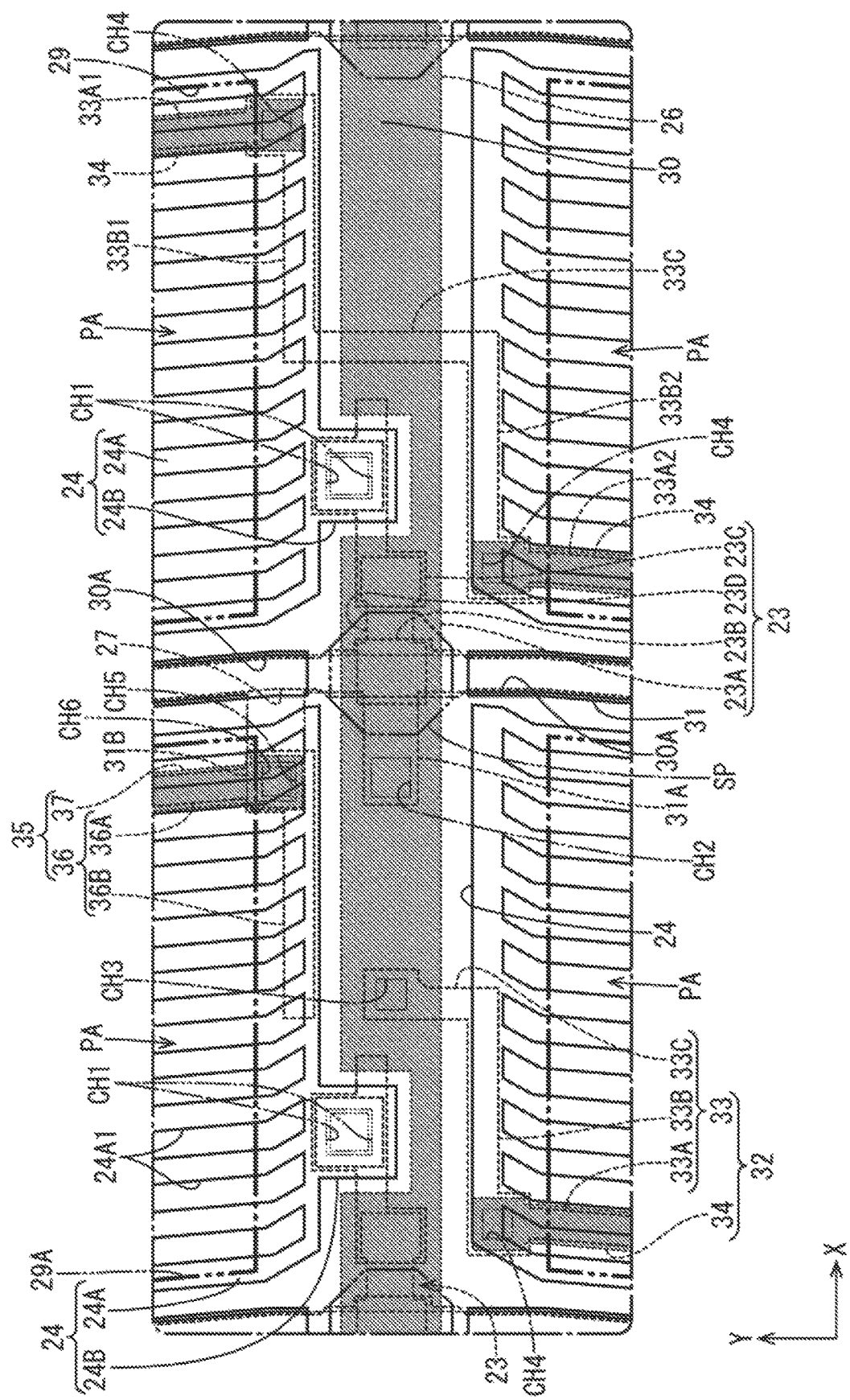
FIG. 15 is a plan view illustrating a pattern of the first metal film of the array substrate within a range that is the same as that in FIG. 5.
Figure 16:
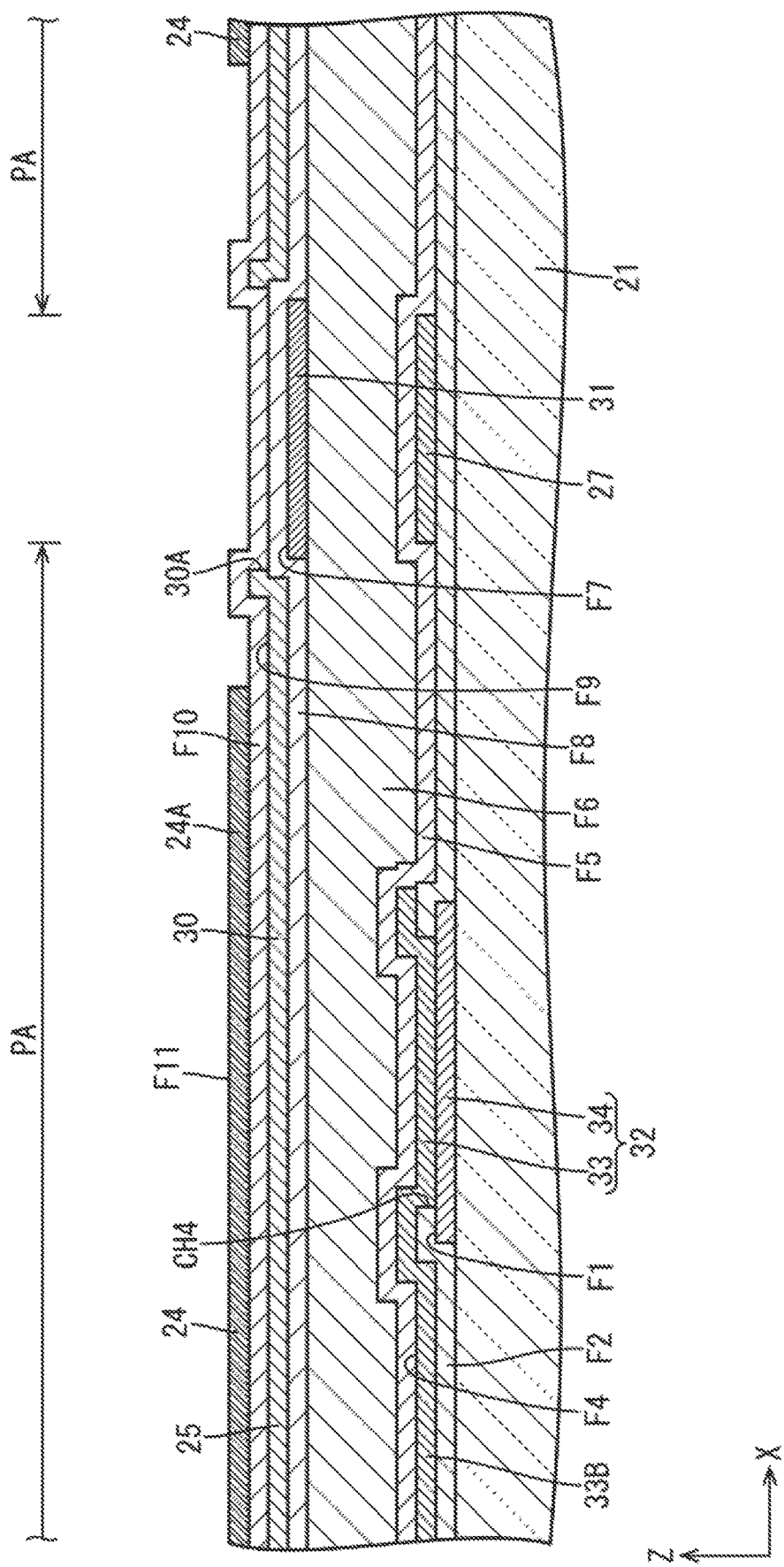
FIG. 16 is a cross-sectional view of the array substrate taken along line C-C of FIG. 3.

The gate connection wiring line 32 will be described below by mainly referring to FIGS. 4, 6, 10, and 16. FIGS. 10 to 12 are plan views illustrating a pattern of the second metal film F4 (such as the source wiring line 27) provided on the array substrate 21, in different scales. In FIGS. 10 to 12 the range in which the second metal film F4 is formed is hatched. FIGS. 13 to 15 are plan views illustrating a pattern of the first metal film F1 (such as the gate wiring lines 26) provided on the array substrate 21, in different scales. In FIGS. 13 to 15 the range in which the first metal film F1 is formed is hatched. FIG. 16 is a cross-sectional view of the array substrate 21 taken along line C-C of FIG. 3.

As illustrated in FIGS. 10 and 11, the gate connection wiring line 32 is disposed passing through the pixel regions PA (some of the pixel regions PA) in a section from the driver 11 to the gate wiring line 26 as the connection target. Accordingly, the gate connection wiring line 32 is disposed in the pixel region PA that is more on the driver 11 side (the lower side in FIGS. 10 and 11) in the Y-axis direction (the extending direction of the touch wiring line 31) than the gate wiring line 26 as the connection target, but is not disposed in the pixel region PA more on the side (the upper side in FIGS. 10 and 11) opposite to the driver 11 in the Y-axis direction than the gate wiring lines 26 as the connection target. The gate connection wiring line 32 is arranged so as to repeatedly meander while extending across the plurality of pixel regions PA arranged along the Y-axis direction in the display region AA. Specifically, the gate connection wiring line 32 has the wiring route reversed left and right in FIGS. 10 and 11 between two pixel regions PA adjacent to each other in the Y-axis direction while sandwiching the gate wiring line 26. The gate connection wiring line 32 is disposed passing through a part of the outer peripheral edge, circumventing the center portion in each pixel region PA.

As illustrated in FIG. 6, the gate connection wiring line 32 includes a main gate connection wiring line component (main scanning connection wiring line component) 33 formed by the same material as the source wiring line 27 and the like which is the second metal film F4. The main gate connection wiring line component 33 is connected to the gate wiring lines 26 as the connection target, through a gate wiring line contact hole (scanning wiring contact hole) CH3 opened and formed in the gate insulating film F2 interposed therebetween. As illustrated in FIGS. 11 and 12, the main gate connection wiring line component 33 formed by the second metal film F4 is disposed in the pixel region PA so as to pass through a position spaced apart from at least the source wiring line 27 and the source electrode 23B and the drain electrode 23C of the TFT 23. Specifically, the main gate connection wiring line component 33 includes: a source wiring line parallel portion (image wiring line parallel portion) 33A extending substantially along the Y-axis direction to be parallel to the source wiring line 27; a gate wiring line parallel portion (scanning wiring line parallel portion) 33B that extends along the X-axis direction to be parallel to the gate wiring line 26; and a gate wiring line crossing portion (scanning wiring line crossing portion, scanning wiring line bridging portion) 33C extending in the Y-axis direction to cross the gate wiring line 26.

As illustrated in FIGS. 11 and 12, the source wiring line parallel portion 33A is disposed at a position spaced apart from the source wiring line 27 in the pixel region PA in the X-axis direction. The spacing between the source wiring line parallel portion 33A and the source wiring line 27 is slightly greater than the line width of the source wiring line parallel portion 33A and the line width of the source wiring line 27. As a result, a short circuit between the source wiring line parallel portion 33A and the source wiring line 27 that are both made of the same material which is the second metal film F4 is avoided. The source wiring line parallel portion 33A that extends substantially along the Y-axis direction has a shape that is bent partway along the source wiring line 27. One source wiring line parallel portion 33A is disposed near an end position in one of the short side directions (X-axis direction) in the pixel region PA.

As illustrated in FIGS. 11 and 12, two gate wiring line parallel portions 33B are disposed near both end positions in the long side direction (Y-axis direction) in the pixel region PA. The two gate wiring line parallel portions 33B are respectively connected to both end portions of the source wiring line parallel portion 33A near the corner position of the pixel region PA. The gate wiring line parallel portions 33B are arranged at positions spaced apart from the gate wiring line 26 in the Y-axis direction in the pixel region PA, and has the length dimension that is about a half of the short side of the pixel region PA.

As illustrated in FIGS. 11 and 12, the gate wiring line crossing portion 33C is disposed near a center position in the short side direction (X-axis direction) of the pixel region PA, and is connected to an end portion of the gate wiring line parallel portion 33B on the side opposite to the source wiring line parallel portion 33A. The gate wiring line crossing portion 33C in two pixel regions PA adjacent to each other in the Y-axis direction with the gate wiring line 26 interposed therebetween, and has a length dimension that is greater than a width dimension of the gate wiring line 26. The gate wiring line crossing portion 33C is disposed at a position spaced apart from the drain electrode 23C of the TFT 23 in the X-axis direction. The number of gate wiring line crossing portions 33C in the main gate connection wiring line component 33 is the same as the number of gate wiring lines 26 to be crossed until reaching the gate wiring line 26 that is the connection target. Of these gate wiring line crossing portions 33C, one overlapping the gate wiring line 26 as the connection target is connected to the gate wiring line 26 through the gate wiring line contact hole CH3 described above.

As described above, the main gate connection wiring line component 33 is arranged with the source wiring line parallel portion 33A and the gate wiring line parallel portion 33B disposed without overlapping with any of the wiring lines 26 and 27, and with only a part of the gate wiring line crossing portion 33C disposed so as to overlap the gate wiring line 26 as illustrated in FIGS. 11 and 12. Thus, the parasitic capacitance that may be generated between the wiring lines 26 and 27 is sufficiently reduced. Furthermore, the main gate connection wiring line component 33 is formed by the same material as the source wiring line 27 which is the second metal film F4, and in view of this, as illustrated in FIG. 6, to prevent short circuiting, the gate insulating film F2 is interposed between the main gate connection wiring line component 33 and the gate wiring line 26 that is not the connection target and that is crossed by the main gate connection wiring line component 33 before reaching the connection target.

As illustrated in FIGS. 10 and 11, the main gate connection wiring line component 33 is disposed with one source wiring line parallel portion 33A provided in each of the plurality of pixel regions PA arranged along the Y-axis direction, and with the arrangement of the source wiring line parallel portions 33A in the pixel regions PA alternating in an inverse relationship established in the X-axis direction. Specifically, the plurality of source wiring line parallel portions 33A that constitute the main gate connection wiring line component 33 include a first source wiring line parallel portion (first image wiring line parallel portion) 33A1 that is offset toward one of the two source wiring lines 27 (on the right side in FIGS. 10 and 11) that sandwich the pixel region PA, and a second source wiring line parallel portion (second image wiring line parallel portion) 33A2 offset toward the other one of the two source wiring lines 27 (on the left side in FIGS. 10 and 11) that sandwich the pixel region PA. One and the other one of the pixel regions PA adjacent to each other in the Y-axis direction with the gate wiring line 26 provided in between are respectively provided with the first source wiring line parallel portion 33A1 and the second source wiring line parallel portion 33A2. Thus, the pixel regions PA provided with the first source wiring line parallel portion 33A1 and the pixel regions PA provided with the second source wiring line parallel portion 33A2 are repeatedly and alternately arranged in the Y-axis direction. In other words, the first source wiring line parallel portion 33A1 is arranged in the odd-numbered or even-numbered pixel region PA, among the plurality of pixel regions PA arranged along the Y-axis direction, counted from the end, whereas the second source wiring line parallel portion 33A2 is arranged in the even-numbered or odd-numbered pixel region PA, among the plurality of pixel regions PA arranged along the Y-axis direction, counted from the end. With this configuration, with respect to the source wiring line 27 that crosses the display region AA substantially along the Y-axis direction, the source wiring line parallel portions 33A1 and 33A2 each extend in parallel to the source wiring line 27 at a position spaced apart therefrom in a range of the respective pixel regions PA, while being arranged in an inverse relationship established in the X-axis direction. Therefore, compared with a hypothetical case where all of the source wiring line parallel portions are offset toward one or the other of the two source wiring lines 27 that sandwich the pixel region PA, dark lines that can be generated when the source wiring line 27 and the source wiring line parallel portion 33A are aligned are less likely to be visually recognizable.

With the source wiring line parallel portions 33A arranged as described above, the gate wiring line parallel portions 33B are arranged as follows. Specifically, as illustrated in FIGS. 10 and 11, the main gate connection wiring line component 33 is disposed with two gate wiring line parallel portions 33B provided in each of the plurality of pixel regions PA arranged along the Y-axis direction, and with the arrangement of the gate wiring line parallel portions 33B in the pixel regions PA alternating in an inverse relationship established in the X-axis direction. Specifically, the plurality of gate wiring line parallel portions 33B that constitute the main gate connection wiring line component 33 include a first gate wiring line parallel portion (first scanning wiring line parallel portion) 33B1 that is offset toward one of the two source wiring lines 27 (on the right side in FIGS. 10 and 11) that sandwich the pixel region PA, and a second gate wiring line parallel portion (second scanning wiring line parallel portion) 33B2 offset toward the other one of the two source wiring lines 27 (on the left side in FIGS. 10 and 11) that sandwich the pixel region PA. One and the other one of the pixel regions PA adjacent to each other with the gate wiring line 26 provided in between are respectively provided with the two first gate wiring line parallel portions 33B1 and the two second gate wiring line parallel portions 33B2. Thus, the pixel regions PA provided with the two first gate wiring line parallel portions 33B1 and the pixel regions PA provided with the two second gate wiring line parallel portions 33B2 are repeatedly and alternately arranged in the Y-axis direction. In other words, the two first gate wiring line parallel portions 33B1 are arranged in the odd-numbered or even-numbered pixel region PA, among the plurality of pixel regions PA arranged along the Y-axis direction, counted from the end, whereas the two second gate wiring line parallel portions 33B2 are arranged in the even-numbered or odd-numbered pixel region PA, among the plurality of pixel regions PA arranged along the Y-axis direction, counted from the end. With this configuration, with respect to the gate wiring line 26 that crosses the display region AA substantially along the X-axis direction, the gate wiring line parallel portions 33B1 and 33B2 each extend in parallel to the gate wiring line 26 at a position spaced apart therefrom in a range of the respective pixel regions PA, while being arranged in an inverse relationship established in the X-axis direction. Thus, compared with a hypothetical case where all of the gate wiring line parallel portions extend substantially over the entire length of the pixel region PA in the short side direction without being offset, the dark lines that can be generated when the gate wiring lines 26 and the gate wiring line parallel portions 33B are aligned are less likely to be visually recognizable.

As illustrated in FIGS. 4, 13, and 14, the gate connection wiring line 32 includes a sub gate connection wiring line component (sub scanning connection wiring line component) 34 formed by the first metal film F1 as in the case of the gate wiring lines 26 and the like. The sub gate connection wiring line component 34 is arranged to overlap with the source wiring line parallel portion 33A that extends substantially along the Y-axis direction in the pixel region PA and is a part of the main gate connection wiring line component 33. The sub gate connection wiring line component 34 has a shape bent partway along the source wiring line 27. The gate insulating film F2 is interposed between the sub gate connection wiring line components 34 and the source wiring line parallel portion 33A that overlap each other. The sub gate connection wiring line component 34 has a line width that is substantially the same as the line width of the source wiring line parallel portion 33A, and overlaps with the source wiring line parallel portion 33A over the entire length thereof. As in the case of the source wiring line parallel portion 33A, the sub gate connection wiring line component 34 is provided in each of the plurality of pixel regions PA arranged along the Y-axis direction, and has an arrangement in the pixel regions PA that alternates in an inverse relationship established in the X-axis direction. As illustrated in FIGS. 15 and 16, the gate insulating film F2 interposed between the sub gate connection wiring line component 34 formed by the first metal film F1 and the main gate connection wiring line component 33 formed by the second metal film F4 is perforated to have a gate connection wiring line component contact hole (contact hole) CH4 to connect these components. Two gate connection wiring line component contact holes CH4 are disposed at positions overlapping both end portions of the sub gate connection wiring line component 34 and the source wiring line parallel portion 33A. With the two gate connection wiring line component contact holes CH4, both end portions of the sub gate connection wiring line component 34 and the source wiring line parallel portion 33A are connected to each other. As a result, the wiring resistance of the gate connection wiring line 32 can be reduced. Furthermore, redundancy can be achieved, that is, even when disconnection of one of the sub gate connection wiring line component 34 and the source wiring line parallel portion 33A occurs, the scanning signal can be continued to be transmitted through the remaining one.

Figure 17:
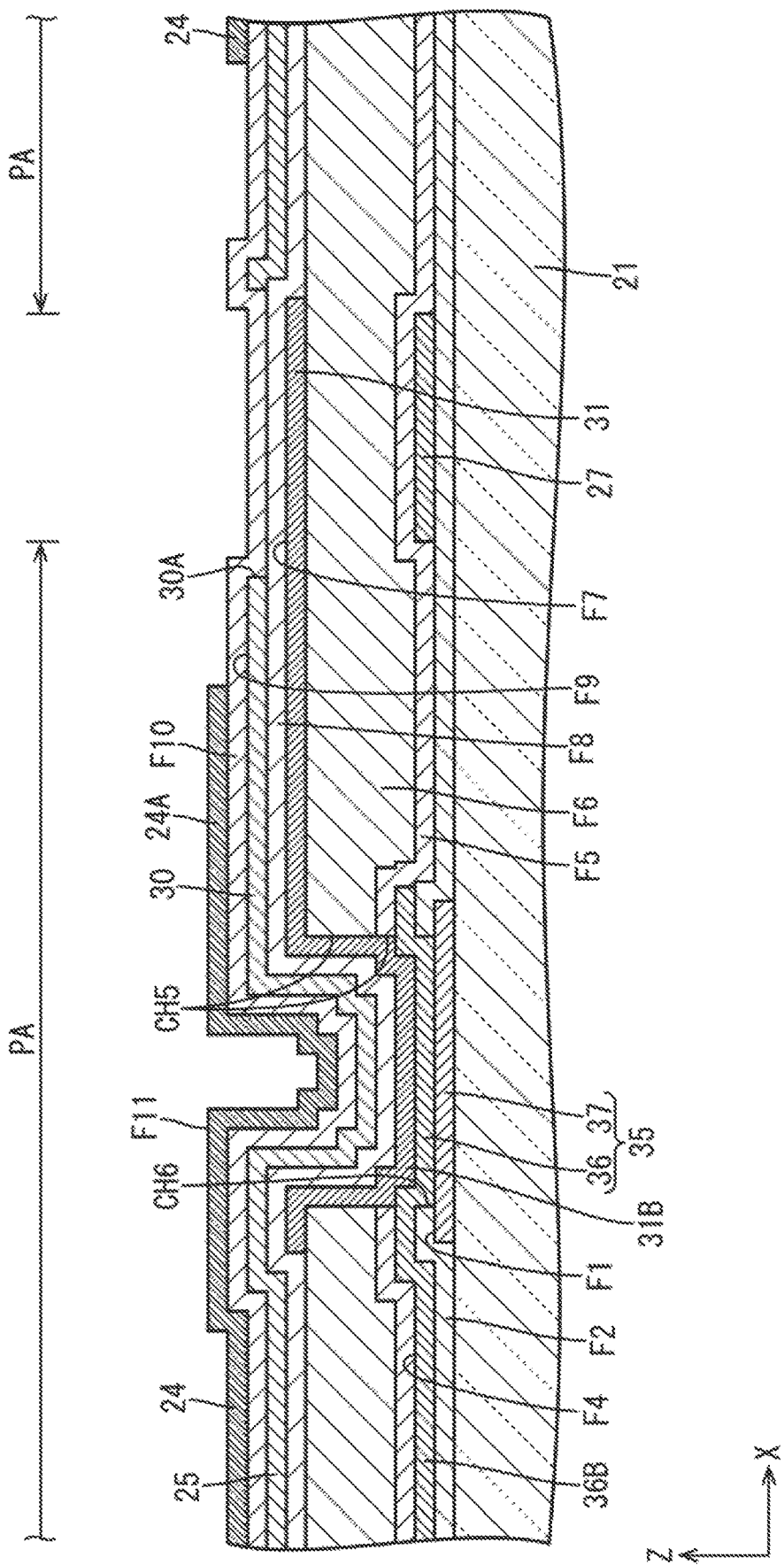
FIG. 17 is a cross-sectional view of the array substrate taken along line D-D of FIG. 5.

The gate connection wiring line 32 with the configuration described above is, as illustrated in FIGS. 10 and 11, not disposed in all of the plurality of pixel regions PA along the Y-axis direction, and is not disposed in the pixel region PA positioned more on the opposite side of the driver 11 than the gate wiring line 26 that is the connection target thereof, in the Y-axis direction. When the plurality of pixel regions PA include one provided with the gate connection wiring line 32 and one not provided with the gate connection wiring line 32, the former has a lower aperture ratio than the latter. This might result in compromised display quality. In view of this, the array substrate 21 according to the present embodiment is provided with an auxiliary touch wiring line (auxiliary position detection wiring line) 35 disposed in the pixel region PA not provided with the gate connection wiring line 32 among the plurality of pixel regions PA. The auxiliary touch wiring line 35 will be described below by mainly referring to FIG. 4, FIGS. 10 to 15, and FIG. 17. FIG. 17 is a cross-sectional view of the array substrate 21 taken along line D-D of FIG. 5.

As illustrated in FIGS. 10 and 11, the auxiliary touch wiring line 35 extends substantially along the Y-axis direction in the pixel region PA not provided with the gate connection wiring line 32, and has both end portions connected to the touch wiring line 31. As a result, the wiring resistance of the touch wiring line 31 can be reduced. Furthermore, redundancy can be achieved, that is, even when disconnection of one of the touch wiring line 31 and the auxiliary touch wiring line 35 occurs, the touch signal can be continued to be transmitted through the remaining one. Due to the auxiliary touch wiring line 35 being selectively provided in the pixel region PA not provided with the gate connection wiring line 32 among the plurality of pixel regions PA, the plurality of pixel regions PA include the pixel regions PA provided with the gate connection wiring line 32 and the pixel region PA not provided with the gate connection wiring line 32 but provided with the auxiliary touch wiring line 35. As a result, a difference in aperture ratio between the plurality of pixel regions PA due to the presence/absence of the gate connection wiring line 32 is less likely to occur, whereby the excellent display quality is achieved. As described above, with the auxiliary touch wiring line 35 provided in the pixel region PA not provided with the gate connection wiring line 32, the display quality can be improved, and reduction of resistance and redundancy of the touch wiring line 31 can be achieved.

As illustrated in FIGS. 4, 10, and 11, the auxiliary touch wiring line 35 includes a first auxiliary touch wiring line component (first auxiliary position detection wiring line component) 36 formed by the same material as the source wiring line 27, the main gate connection wiring line component 33, and the like which is the second metal film F4. The first auxiliary touch wiring line component 36 is disposed passing through a part of the outer peripheral edge, circumventing the center portion in each pixel region PA. Specifically, the auxiliary touch wiring line 35 is disposed passing through a position spaced apart from at least the source wiring line 27 and the drain electrode 23C of the TFT 23 in the pixel region PA. The first auxiliary touch wiring line component 36 includes: an auxiliary touch wiring line side source wiring line parallel portion (auxiliary position detection wiring line side image wiring line parallel portion) 36A extending substantially along the Y-axis direction to be parallel to the source wiring line 27; and an auxiliary touch wiring line side gate wiring line parallel portion (auxiliary position detection wiring line side scanning wiring line parallel portion) 36B that extends along the X-axis direction to be parallel to the gate wiring line 26.

As illustrated in FIGS. 11 and 12, the auxiliary touch wiring line side source wiring line parallel portion 36A is disposed at a position spaced apart from the source wiring line 27 in the pixel region PA in the X-axis direction. The spacing between the auxiliary touch wiring line side source wiring line parallel portion 36A and the source wiring line 27 is slightly greater than the line width of the auxiliary touch wiring line side source wiring line parallel portion 36A and the line width of the source wiring line 27. As a result, a short circuit between the auxiliary touch wiring line side source wiring line parallel portion 36A and the source wiring line 27 that are both made of the same material which is the second metal film F4 is avoided. The spacing between the auxiliary touch wiring line side source wiring line parallel portion 36A and the source wiring line 27 is the same as the spacing between the source wiring line parallel portion 33A of the main gate connection wiring line component 33 constituting the gate connection wiring line 32 and the source wiring line 27. As a result, the parasitic capacitance that may be generated between the auxiliary touch wiring line side source wiring line parallel portion 36A and the source wiring line 27 and the parasitic capacitance that may be generated between the source wiring line parallel portion 33A and the source wiring line 27 are equalized. Furthermore, a display state of the pixels PX is likely to differ between the pixel region PA provided with the gate connection wiring line 32 and the pixel region PA provided with the auxiliary touch wiring line 35. The auxiliary touch wiring line side source wiring line parallel portion 36A that extends substantially along the Y-axis direction has a shape that is bent partway along the source wiring line 27. One auxiliary touch wiring line side source wiring line parallel portion 36A is disposed near an end position in one of the short side directions (X-axis direction) in the pixel region PA.

As illustrated in FIGS. 11 and 12, two auxiliary touch wiring line side gate wiring line parallel portions 36B are disposed near both end positions in the long side direction (Y-axis direction) in the pixel region PA. These two auxiliary touch wiring line side gate wiring line parallel portions 36B are respectively connected to both end portions of the auxiliary touch wiring line side source wiring line parallel portion 36A. The auxiliary touch wiring line side gate wiring line parallel portion 36B is connected to an end portion of the auxiliary touch wiring line side source wiring line parallel portion 36A in a portion near a corner position of the pixel region PA. The auxiliary touch wiring line side gate wiring line parallel portions 36B are arranged at positions spaced apart from the gate wiring line 26 in the pixel region PA in the Y-axis direction, and has the length dimension that is about a half of the short side of the pixel region PA. The spacing between the auxiliary touch wiring line side gate wiring line parallel portion 36B and the gate wiring line 26 is the same as the spacing between the gate wiring line parallel portions 33B of the main gate connection wiring line component 33 constituting the gate connection wiring line 32 and the gate wiring line 26. As a result, the parasitic capacitance that may be generated between the auxiliary touch wiring line side gate wiring line parallel portion 36B and the gate wiring line 26 and the parasitic capacitance that may be generated between the gate wiring line parallel portion 33B and the gate wiring line 26 are equalized. Furthermore, a display state of the pixels PX is likely to differ between the pixel region PA provided with the gate connection wiring line 32 and the pixel region PA provided with the auxiliary touch wiring line 35.

Next, a connection structure between the auxiliary touch wiring line 35 and the touch wiring line 31 will be described. As illustrated in FIGS. 9 and 17, the touch wiring line 31 is provided with an auxiliary touch wiring line contact portion 31B that is connected to the first auxiliary touch wiring line component 36 that constitutes the auxiliary touch wiring line 35. The auxiliary touch wiring line contact portion 31B is selectively provided in a portion of the touch wiring line 31 that crosses the display region AA in the Y-axis direction, adjacent to the auxiliary touch wiring line 35 in the X-axis direction. The auxiliary touch wiring line contact portion 31B is formed branching and extending along the X-axis direction from the touch wiring line 31 extending substantially in the Y-axis direction. Two auxiliary touch wiring line contact portions 31B are provided for one auxiliary touch wiring line 35, to be arranged, in the Y-axis direction, to substantially match both end positions of the pixel region PA provided with the auxiliary touch wiring line 35, in the Y-axis direction. The two auxiliary touch wiring line contact portions 31B are arranged so as to overlap with both end portions of the auxiliary touch wiring line side source wiring line parallel portion 36A constituting the first auxiliary touch wiring line component 36. Specifically, the auxiliary touch wiring line contact portion 31B is disposed to overlap with a portion (corner portion), of the first auxiliary touch wiring line component 36, where the auxiliary touch wiring line side source wiring line parallel portion 36A and the auxiliary touch wiring line side gate wiring line parallel portion 36B are connected to each other. The extending direction of the auxiliary touch wiring line contact portion 31B from the touch wiring line 31 is opposite to the direction toward the side where TFT 23 is disposed with respect to the source wiring line 27. The first interlayer insulating film F5 and the flattening film F6, interposed between the auxiliary touch wiring line contact portion 31B formed by the third metal film F7 and the first auxiliary touch wiring line component 36 formed by the second metal film F4 are perforated to have a touch wiring line contact hole (position detection wiring line contact hole) CH5 for connecting the portions, as illustrated in FIG. 17. As a result, the auxiliary touch wiring line 35 has both end portions in the extending direction connected to the touch wiring line 31.

As illustrated in FIGS. 10 and 11, the auxiliary touch wiring line 35 with the configuration described above is provided in each of the plurality of pixel regions PA arranged along the Y-axis direction, and has an arrangement in the pixel regions PA that alternates in an inverse relationship established in the X-axis direction. Specifically, the auxiliary touch wiring line 35 includes a first auxiliary touch wiring line (first auxiliary position detection wiring line) 35α at a position where the auxiliary touch wiring line side source wiring line parallel portion 36A is offset toward one of the two source wiring lines 27 (on the right side in FIGS. 10 and 11) that sandwich the pixel region PA; and a second auxiliary touch wiring line (second auxiliary position detection wiring line) 35β at a position where the auxiliary touch wiring line side source wiring line parallel portion 36A is offset toward the other one of the two source wiring lines 27 (on the left side in FIGS. 10 and 11) that sandwich the pixel region PA. One and the other one of the pixel regions PA adjacent to each other in the Y-axis direction with the gate wiring line 26 provided in between are respectively provided with the first auxiliary touch wiring line 35α and the second auxiliary touch wiring line 35P. Thus, the pixel regions PA provided with the first auxiliary touch wiring line 35α and the pixel regions PA provided with the second auxiliary touch wiring line 35β are repeatedly and alternately arranged in the Y-axis direction. In other words, the first auxiliary touch wiring line 35α is arranged in the odd-numbered or even-numbered pixel region PA, among the plurality of pixel regions PA arranged along the Y-axis direction, counted from the end, whereas the second auxiliary touch wiring line 35β is arranged in the even-numbered or odd-numbered pixel region PA, among the plurality of pixel regions PA arranged along the Y-axis direction, counted from the end. With this configuration, with respect to the source wiring line 27 that crosses the display region AA substantially along the Y-axis direction, the auxiliary touch wiring lines 35α and 35β each extend in parallel to the source wiring line 27 at a position spaced apart therefrom in a range of the respective pixel regions PA, while being arranged in an inverse relationship established in the X-axis direction. Therefore, compared to a hypothetical case where all of the auxiliary touch wiring lines are offset toward one or the other of the two source wiring lines 27 that sandwich the pixel region PA, dark lines that can be generated when the source wiring line 27 and the source wiring line parallel portion 33A are aligned are less likely to be visually recognizable.

In addition, as illustrated in FIGS. 10 and 11, the first auxiliary touch wiring line 35α is disposed in the pixel region PA with the same position, in the Y-axis direction, as the pixel region PA provided with the first source wiring line parallel portion 33A1, whereas the second auxiliary touch wiring line 35β is disposed in the pixel region PA with the same position, in the Y-axis direction, as the pixel region PA provided with the second source wiring line parallel portion 33A2. Thus, a plurality of pixel regions PA arranged along the X-axis direction to form a single row which is an odd-numbered row or an even-numbered row from the end in the Y-axis direction are provided with the first auxiliary touch wiring line 35α and the first source wiring line parallel portion 33A1, whereas a plurality of pixel regions PA arranged along the X-axis direction to form a single row which is an even-numbered row or an odd-numbered row from the end in the Y-axis direction are provided with the second auxiliary touch wiring line 35β and the second source wiring line parallel portion 33A2. Thus, the array of a plurality of auxiliary touch wiring lines 35 disposed in the plurality of pixel regions PA arranged along the Y-axis direction can be regarded as being synchronized with the array of a plurality of source wiring line parallel portions 33A disposed in the plurality of pixel regions PA arranged along the Y-axis direction. Thus, the rows of the plurality of pixel regions PA with the same arrangement in the Y-axis direction have the same arrangement of the source wiring line parallel portion 33A and the auxiliary touch wiring line side source wiring line parallel portion 36A in the pixel regions PA, and thus the display state of the pixels PX is less likely to differ between the pixel regions PA.

The auxiliary touch wiring line side gate wiring line parallel portions 36B provided in the auxiliary touch wiring line 35 are arranged as follows. Specifically, as illustrated in FIGS. 10 and 11, a plurality of auxiliary touch wiring lines 35 disposed in the plurality of respective pixel regions PA arranged along the Y-axis direction are arranged with sets of two auxiliary touch wiring line side gate wiring line parallel portions 36B having an arrangement alternating in an inverse relationship established in the X-axis direction. Specifically, two auxiliary touch wiring line side gate wiring line parallel portions 36B constituting the first auxiliary touch wiring line 35α are offset toward one of the two source wiring lines 27 (on the right side in FIGS. 10 and 11) sandwiching the pixel region PA, and two auxiliary touch wiring line side gate wiring line parallel portions 36B constituting the second auxiliary touch wiring line 35β are offset toward the other one of the two source wiring lines 27 (on the left side in FIGS. 10 and 11) sandwiching the pixel region PA With this configuration, with respect to the gate wiring line 26 that crosses the display region AA substantially along the X-axis direction, the auxiliary touch wiring line side gate wiring line parallel portions 36B of the auxiliary touch wiring line 35α and 35β each extend in parallel to the gate wiring line 26 at a position spaced apart therefrom in a range of the respective pixel regions PA, while being arranged in an inverse relationship established in the X-axis direction. Thus, compared with a hypothetical case where all of the auxiliary touch wiring line side gate wiring line parallel portions extend substantially over the entire length of the pixel region PA in the short side direction without being offset, the dark lines that can be generated when the gate wiring lines 26 and the auxiliary touch wiring line side gate wiring line parallel portion 36B are aligned are less likely to be visually recognizable.

As illustrated in FIGS. 4, 13, and 14, the auxiliary touch wiring line 35 includes a second auxiliary touch wiring line component (second auxiliary position detection wiring line component) 37 formed by the same material as the gate wiring line 26, the sub gate connection wiring line component 34, and the like which is the first metal film F1. The second auxiliary touch wiring line component 37 is arranged to overlap with the auxiliary touch wiring line side source wiring line parallel portion 36A that extends substantially along the Y-axis direction in the pixel region PA and is a part of the first auxiliary touch wiring line component 36. The second auxiliary touch wiring line component 37 has a shape bent partway along the source wiring line 27. The gate insulating film F2 is interposed between the second auxiliary touch wiring line component 37 and the auxiliary touch wiring line side source wiring line parallel portion 36A that overlap each other. The second auxiliary touch wiring line component 37 has a line width that is substantially the same as the line width of the auxiliary touch wiring line side source wiring line parallel portion 36A, and overlaps with the auxiliary touch wiring line side source wiring line parallel portion 36A over the entire length thereof. As in the case of the auxiliary touch wiring line side source wiring line parallel portion 36A, the second auxiliary touch wiring line component 37 is provided in each of the plurality of pixel regions PA provided with a plurality of auxiliary touch wiring lines 35 and arranged along the Y-axis direction, and has an arrangement in the pixel regions PA that alternates in an inverse relationship established in the X-axis direction.

As illustrated in FIGS. 15 and 17, the gate insulating film F2 interposed between the second auxiliary touch wiring line component 37 formed by the first metal film F1 and the first auxiliary touch wiring line component 36 formed by the second metal film F4 is perforated to have an auxiliary touch wiring line component contact hole (contact hole) CH6 to connect these components. Two auxiliary touch wiring line component contact holes CH6 are disposed at positions overlapping both end portions of the second auxiliary touch wiring line component 37 and the auxiliary touch wiring line side source wiring line parallel portion 36A. With these two auxiliary touch wiring line component contact holes CH6, both end portions of the second auxiliary touch wiring line component 37 and the auxiliary touch wiring line side source wiring line parallel portion 36A are connected to each other. As a result, the wiring resistance of the auxiliary touch wiring line 35 and the touch wiring line 31 can be reduced. Furthermore, redundancy can be achieved, that is, even when disconnection of one of the second auxiliary touch wiring line component 37 and the auxiliary touch wiring line side source wiring line parallel portion 36A occurs, the touch signal can be continued to be transmitted through the remaining one. Furthermore, with the second auxiliary touch wiring line component 37 overlapping a part of the first auxiliary touch wiring line component 36, the aperture ratio of the pixel region PA can be maintained high, and the aperture ratio is less likely to differ between the pixel region PA provided with the gate connection wiring line 32 and the pixel region PA provided with the auxiliary touch wiring line 35.

Now, the positional relationship of the pixel electrode 24 with respect to the gate connection wiring line 32 and the auxiliary touch wiring line 35 will be described in detail. As illustrated in FIGS. 4 and 12, the formation range of the pixel electrodes 24 in the pixel region PA in the X-axis direction (extending direction of the gate wiring line 26) is larger than the formation range of the gate connection wiring line 32 and the auxiliary touch wiring line 35 in the X-axis direction in each pixel region PA. Specifically, the pixel electrode 24 disposed in the pixel region PA provided with the gate connection wiring line 32 has an end portion, in the X-axis direction, positioned between the source wiring line 27 and the source wiring line parallel portion 33A constituting the gate connection wiring line 32. Thus, the pixel electrode 24 disposed in the pixel region PA provided with the gate connection wiring line 32 has at least a portion that overlaps with the source wiring line parallel portion 33A (wiring line overlapping portion), and a portion (wiring line not overlapping portion) located in a region between the source wiring line 27 and the source wiring line parallel portion 33A and not overlapping with the source wiring line parallel portion 33A. The latter of these (wiring line not overlapping portion) is optically transparent, and thus can be used for displaying. This configuration can improve the aperture ratio of the pixel region PA, and thus is particularly suitable for the liquid crystal panel 10 according to the present embodiment of extremely high definition corresponding to 8K resolution. Further, dark lines that can be generated by alignment of the source wiring line 27 and the source wiring line parallel portion 33A are less likely to be visually recognizable.

As illustrated in FIGS. 4 and 12, the pixel electrode 24 disposed in the pixel region PA provided with the auxiliary touch wiring line 35 is arranged to have an end portion in the X-axis direction positioned between the source wiring line 27 and the auxiliary touch wiring line side source wiring line parallel portion 36A constituting the auxiliary touch wiring line 35. Thus, the pixel electrode 24 disposed in the pixel region PA provided with the auxiliary touch wiring line 35 at least includes a portion (wiring line overlapping portion) overlapping with the auxiliary touch wiring line side source wiring line parallel portion 36A and a portion (wiring line not overlapping portion) that is in a region between the source wiring line 27 and the auxiliary touch wiring line side source wiring line parallel portion 36A and does not overlap with the auxiliary touch wiring line side source wiring line parallel portion 36A. The latter of these (wiring line not overlapping portion) is optically transparent, and thus can be used for displaying. This configuration can improve the aperture ratio of the pixel region PA, and thus is particularly suitable for the liquid crystal panel 10 according to the present embodiment of extremely high definition corresponding to 8K resolution. Further, dark lines that can be generated by alignment of the source wiring line 27 and the auxiliary touch wiring line side source wiring line parallel portion 36A are less likely to be visually recognizable.

On the other hand, as illustrated in FIGS. 4 and 12, the pixel electrode 24 disposed in the pixel region PA provided with the gate connection wiring line 32 has a portion (wiring line overlapping portion) that overlaps with the source wiring line parallel portion 33A. Thus, the electric field generated by the source wiring line parallel portion 33A is likely to affect the pixel electrode 24. Thus, the pixel electrode 24 involves a risk of variation of potential. Similarly, the pixel electrode 24 disposed in the pixel region PA provided with the auxiliary touch wiring line 35 has a portion (wiring line overlapping portion) that overlaps with the auxiliary touch wiring line side source wiring line parallel portion 36A. Thus, the electric field generated by the auxiliary touch wiring line side source wiring line parallel portion 36A is likely to affect the pixel electrode 24. Thus, the pixel electrode 24 involves a risk of variation of potential. In view of this, the touch electrode 30 formed by the first transparent electrode film F9 is disposed to overlap, from the lower layer side, with the pixel electrode 24 formed by the second transparent electrode film F11, with the third interlayer insulating film F10 interposed in between, and to overlap, from the upper layer side, with the source wiring line parallel portion 33A and the auxiliary touch wiring line side source wiring line parallel portion 36A formed by the second metal film F4, with the first interlayer insulating film F5, the flattening film F6, and the second interlayer insulating film F8 interposed in between. Thus, the electric field produced from the source wiring line parallel portion 33A can be blocked during the display period, that is, at a timing when the common potential signal is input to the touch electrode 30. Also in the sensing period, the common potential signal is input to the touch electrodes 30, excluding the touch electrode 30 connected to the touch wiring line 31 supplied with the touch signal, whereby the electric field produced from the auxiliary touch wiring line side source wiring line parallel portion 36A can be blocked. As a result, potential of each pixel electrode 24 is less likely to vary, whereby excellent display quality is maintained.

Figure 18:
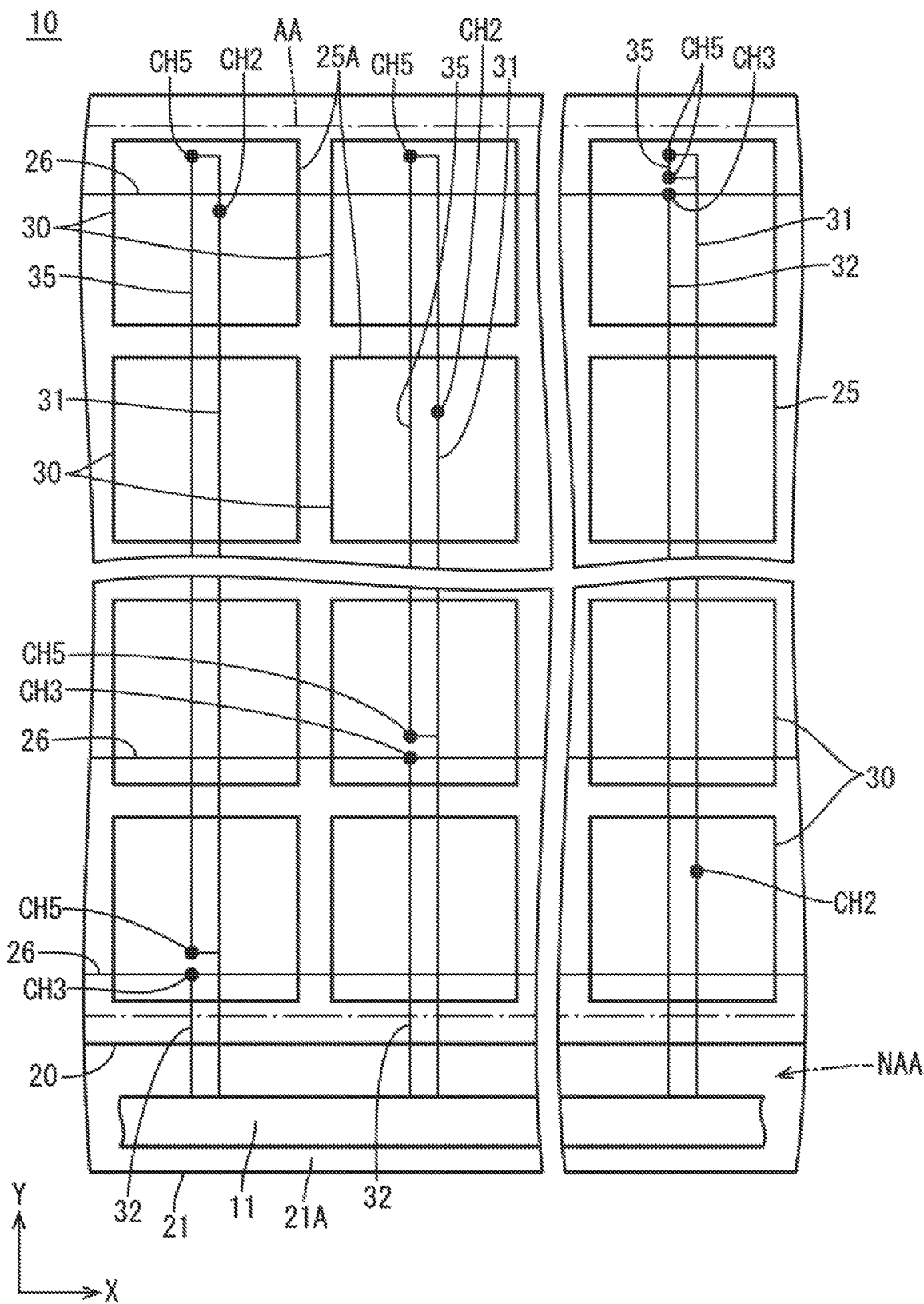
FIG. 18 is a plan view schematically illustrating an arrangement of a touch electrode, a touch wiring line, a gate connection wiring line, an auxiliary touch wiring line, and the like in the liquid crystal panel.

Next, a combination of the touch wiring line 31 and the gate connection wiring line 32 disposed in the pixel region PA adjacent to the touch wiring line 31 will be described with reference to FIGS. 2 and 18. FIG. 18 is a plan view schematically illustrating an arrangement of the touch electrode 30, the touch wiring line 31, the gate connection wiring line 32, the auxiliary touch wiring line 35, and the like in the liquid crystal panel 10. In FIG. 18, one auxiliary touch wiring line contact portion 31B of the touch wiring line 31 and one auxiliary touch wiring line 35 are representatively illustrated. In FIG. 18, two touch electrodes 30 on the driver 11 side and two touch electrodes 30 on the opposite side in the Y-axis direction are representatively illustrated. Furthermore, in FIG. 18, not all of the gate wiring lines 26, the touch wiring lines 31, and the gate connection wiring lines 32 are illustrated, and representative ones of these components are illustrated.

First of all, as illustrated in FIG. 2, a plurality of pixel regions PA arranged along the Y-axis direction to form a single row include ones provided with the gate connection wiring line 32 and ones not provided with the gate connection wiring line 32, with a tendency of there being more of the former and less of the latter as the gate wiring line 26 that is the connection target of the gate connection wiring line 32 gets farther from the driver 11 and less of the former and more of the latter as the gate wiring line 26 that is the connection target of the gate connection wiring line 32 gets closer to the driver 11. On the other hand, the touch wiring line 31 tends to have a longer wiring line length leading to a higher wiring resistance with a higher risk of disconnection as the touch electrode 30 that is the connection target gets farther from the driver 11, and tends to have a shorter wiring line length leading to a lower wiring resistance with a lower risk of disconnection as the touch electrode 30 that is the connection target gets closer to the driver 11. In view of this, in the present embodiment, as illustrated in FIG. 18, the wiring line length of the gate connection wiring line 32 from the driver 11 to the gate wiring line 26 that is the connection target is set to be shorter as the wiring line length of the touch wiring line 31 from the driver 11 to the touch electrode 30 that is the connection target increases. Specifically, a plurality of pixel regions PA arranged side-by-side along the Y-axis direction while being adjacent to the touch wiring line 31 (the touch wiring line 31 at the left end in FIG. 18) with the longest wiring line length from the driver 11 to the touch electrode 30 that is the connection target are provided with the gate connection wiring line 32 that is the connection target of the gate wiring line 26 positioned closest to the driver 11 in the Y-axis direction. With this configuration, all of the pixel regions PA other than the pixel region PA positioned closest to the driver 11 in the Y-axis direction, among the plurality of pixel regions PA arranged side-by-side along the Y-axis direction, are provided with the auxiliary touch wiring line 35. Thus, the touch wiring line 31 with the longest wiring line length is connected to the largest number of auxiliary touch wiring lines 35, whereby the wiring resistance is favorably reduced and the redundancy is favorably guaranteed. On the other hand, a plurality of pixel regions PA arranged side-by-side along the Y-axis direction while being adjacent to the touch wiring line 31 (the touch wiring line 31 at the right end in FIG. 18) with the shortest wiring line length from the driver 11 to the touch electrode 30 that is the connection target are provided with the gate connection wiring line 32 that is the connection target of the gate wiring line 26 positioned farthest from the driver 11 in the Y-axis direction. With this configuration, only the pixel region PA positioned farthest from the driver 11 in the Y-axis direction, among the plurality of pixel regions PA arranged side-by-side along the Y-axis direction, is provided with the auxiliary touch wiring line 35. Thus, the touch wiring line 31 with the shortest wiring line length and thus inherently has a low wiring resistance to have a low risk of disconnection is connected with the smallest number of (one) auxiliary touch wiring lines 35. As described above, the touch wiring line 31 with a shorter wiring line length is connected with less auxiliary touch wiring lines 35, and the touch wiring line 31 with a longer wiring line length is connected with more auxiliary touch wiring lines 35. As a result, reduction of resistance and redundancy of the touch wiring line 31 can be more effectively achieved regardless of whether the wiring line length is long or short.

As described above, the array substrate 21 of the present embodiment includes: the driver (signal supply unit) 11 configured to supply a signal; the plurality of touch electrodes (position detection electrodes) 30 configured to generate electrostatic capacitance with a position input member used for inputting a position and detect an input position by the position input member; the plurality of touch wiring lines (position detection wiring lines) 31 having one end side connected to the driver 11 and another end side connected to the touch electrodes 30; the plurality of gate wiring lines (scanning wiring lines) 26 extending to cross the touch wiring lines 31 with the gate insulating film F2, the first interlayer insulating film F5, and the flattening film F6, serving as insulating films, interposed in between; the plurality of pixel regions PA in which a pixel PX as a unit of display is positioned, the pixel regions PA being regions surrounded by a plurality of the touch wiring line 31 and a plurality of the gate wiring lines 26; the gate connection wiring line (scanning connection wiring line) 32 having one end side connected to the driver 11 and another end side connected to the gate wiring lines 26, the gate connection wiring line being arranged passing through some pixel regions PA included in the plurality of pixel regions PA; and the auxiliary touch wiring line (auxiliary position detection wiring line) 35 having at least one end side and another end side each connected to the touch wiring lines 31, the auxiliary touch wiring line 35 being disposed in pixel regions PA, of the plurality of pixel regions PA, not provided with the gate connection wiring line 32.

With this configuration, the pixels PX positioned in the pixel region PA are sequentially scanned and switching of the display state thereof and the like are implemented, with a signal supplied from the driver 11 to the gate wiring line 26 via the gate connection wiring line 32. The touch electrode 30 generates the electrostatic capacitance with the position input member used for inputting a position, and the input position by the position input member is detected by using the signal supplied from the driver 11 via the touch wiring line 31. The auxiliary touch wiring line 35 at least has the one end side and the other end side each connected to the touch wiring line 31, whereby reduction of resistance and redundancy of the touch wiring line 31 can be achieved.

The gate connection wiring line 32 is arranged passing through some of pixel regions PA included in the plurality of pixel regions PA from the driver 11 to the gate wiring line 26 that is the connection target. Thus, this configuration is more preferable in terms of narrowing the frame of the array substrate 21, compared with a hypothetical case where the gate connection wiring line 32 passes through a frame portion of the array substrate 21 without passing through the pixel regions PA. Meanwhile, the auxiliary touch wiring line 35 connected to the touch wiring line 31 is provided in the pixel region PA, among the plurality of pixel regions PA, not provided with the gate connection wiring line 32. Thus, the plurality of pixel regions PA include the pixel regions PA provided with the gate connection wiring line 32 and the pixel regions PA not provided with the gate connection wiring line 32 but provided with the auxiliary touch wiring line 35. As a result, a difference in aperture ratio between the plurality of pixel regions PA due to the presence/absence of the gate connection wiring line 32 is less likely to occur, whereby the excellent display quality is achieved. As described above, with the auxiliary touch wiring line 35 provided in the pixel region PA not provided with the gate connection wiring line 32, the display quality can be improved, and reduction of resistance and redundancy of the touch wiring line 31 can be achieved.

Furthermore, the plurality of source wiring lines (image wiring lines) 27 are provided that extend to cross the gate wiring lines 26, with the gate insulating film F2 serving as an insulating film interposed in between, and are arranged overlapping with at least a portion of each of the plurality of touch wiring lines 31, with the first interlayer insulating film F5 and the flattening film F6 serving as insulating films interposed in between. The gate connection wiring line 32 includes the main gate connection wiring line component (main scanning connection wiring line component) 33 formed by a same conductive film as the source wiring lines 27 which is the second metal film F4. The main gate connection wiring line component 33 extends from the driver 11 to the connection target among the gate wiring lines 26, while crossing non-connection targets among the gate wiring lines 26 before reaching the connection target. With this configuration, the touch wiring line 31 and the source wiring line 27 are arranged to overlap with each other. This is favorable in terms of maintaining a higher opening ratio of the pixel region PA. The main gate connection wiring line component 33 is formed by the same conductive film as the source wiring line 27 which is the second metal film F4. Thus, the gate insulating film F2 serving as an insulating film is interposed between the main gate connection wiring line component 33 and the non-connection targets among the gate wiring lines 26 crossed by the main gate connection wiring line component 33 before reaching the connection target among the gate wiring lines 26 from the driver 11. With this configuration, short circuiting between the gate connection wiring line 32 and the non-connection targets among the gate wiring lines 26 is prevented.

The auxiliary touch wiring line 35 includes the first auxiliary touch wiring line component (first auxiliary position detection wiring line component) 36 formed by the same conductive film as the source wiring line 27 which is the second metal film F4. The main gate connection wiring line component 33 includes the source wiring line parallel portion (image wiring line parallel portion) 33A extending parallel to the source wiring line 27 at a position spaced apart from the source wiring line 27 in the pixel region PA, whereas the first auxiliary touch wiring line component 36 includes the auxiliary touch wiring line side source wiring line parallel portion (auxiliary position detection wiring line side image wiring line parallel portion) 36A extending parallel to the source wiring line 27 at a position spaced apart from the source wiring line 27 in the pixel region PA by the same amount as the source wiring line parallel portion 33A. With this configuration, the source wiring line parallel portion 33A of the main gate connection wiring line component 33 formed by the same conductive film as the source wiring line 27 which is the second metal film F4 extends parallel to the source wiring line 27 at a position spaced apart from the source wiring line 27 in the pixel region PA, whereby short circuiting with the source wiring line 27 can be prevented. Similarly, the auxiliary touch wiring line side source wiring line parallel portion 36A of the first auxiliary touch wiring line component 36 formed by the same conductive film as the source wiring line 27 which is the second metal film F4 extends parallel to the source wiring line 27 at a position spaced apart from the source wiring line 27 in the pixel region PA, whereby short circuiting with the source wiring line 27 can be prevented. The source wiring line parallel portion 33A and the auxiliary touch wiring line side source wiring line parallel portion 36A are spaced apart from the source wiring line 27 by the same amount, whereby the parasitic capacitances that may be generated between these and the source wiring line 27 are equalized. Furthermore, a display state of pixels PX is less likely to differ between the pixel region PA provided with the gate connection wiring line 32 and the pixel region PA provided with the auxiliary touch wiring line 35.

The auxiliary touch wiring line 35 includes the second auxiliary touch wiring line component (second auxiliary position detection wiring line component) 37 that is formed by the same conductive film as the gate wiring line 26 which is the first metal film F1 and is arranged to overlap with at least a portion of the first auxiliary touch wiring line component 36. The second auxiliary touch wiring line component 37 has at least one end side and another end side each connected to the first auxiliary touch wiring line component 36 through the auxiliary touch wiring line component contact hole (contact hole) CH6 opened and formed in the gate insulating film F2 serving as an insulating film provided in between. With this configuration, the second auxiliary touch wiring line component 37 that is formed by the same conductive film as the gate wiring line 26 which is the first metal film F1 at least one end side and the other end side each connected to the first auxiliary touch wiring line component 36 through the auxiliary touch wiring line component contact hole CH6 opened and formed in the gate insulating film F2 serving as an insulating film, whereby reduction of resistance and redundancy of the auxiliary touch wiring line 35 can be achieved. Thus, further reduction of resistance and redundancy of the touch wiring line 31 can be achieved. Furthermore, with the second auxiliary touch wiring line component 37 overlapping at least a portion of the first auxiliary touch wiring line component 36, the aperture ratio of the pixel region PA can be maintained high, and the aperture ratio is less likely to differ between the pixel region PA provided with the gate connection wiring line 32 and the pixel region PA provided with the auxiliary touch wiring line 35.

The plurality of pixel electrodes 24 positioned in the plurality of pixel regions PA and constituting the pixels PX are provided. The pixel electrodes 24 provided in the pixel regions PA provided with the gate connection wiring line 32 have an end portion in the extending direction of the gate wiring line 26 positioned between the source wiring line 27 and the source wiring line parallel portion 33A, whereas the pixel electrodes 24 provided in the pixel regions PA provided with the auxiliary touch wiring line 35 have an end portion in the extending direction of the gate wiring line 26 positioned between the source wiring line 27 and the auxiliary touch wiring line side source wiring line parallel portion 36A. With this configuration, the plurality of pixel electrodes 24 are sequentially scanned by the signal supplied from the driver 11 to the gate wiring line 26 via the gate connection wiring line 32 to be charged to a predetermined potential, whereby switching of the display state or the like of the pixel electrodes 24 is achieved. The plurality of pixel electrodes 24 each have the end portion in the extending direction of the gate wiring line 26 positioned between the source wiring line 27 and any of the source wiring line parallel portion 33A and the auxiliary touch wiring line side source wiring line parallel portion 36A. Thus, displaying can be performed using a region between the source wiring line 27 and any of the source wiring line parallel portion 33A and the auxiliary touch wiring line side source wiring line parallel portion 36A. With this configuration, aperture ratio of the pixel region PA can be improved. Furthermore, dark lines that may be generated when the source wiring line 27 and any of the source wiring line parallel portion 33A and the auxiliary touch wiring line side source wiring line parallel portion 36A are aligned are less likely to be visually recognized.

The driver 11 supplies the position detection signal and the common potential signal to the touch wiring line 31 in a time division manner. The touch electrode 30 is arranged to overlap, from the lower layer side, with the pixel electrodes 24, with the third interlayer insulating film F10 serving as an insulating film interposed in between, and to overlap, from the upper layer side, with the source wiring line parallel portion 33A and the auxiliary touch wiring line side source wiring line parallel portion 36A, with the first interlayer insulating film F5, the flattening film F6, and the second interlayer insulating film F8 serving as insulating films interposed in between. With this configuration, the position detection signal and the common potential signal are supplied from the driver 11 to the touch wiring line 31 in a time division manner. Thus, the touch electrode 30 provides the position detection function at a timing when the position detection signal is supplied and provides the image display function by using the electric field generated between the touch electrode 30 and the pixel electrode 24 overlapping with the third interlayer insulating film F10 serving as an insulating film interposed in between at a timing when the common potential signal is supplied. The plurality of pixel electrodes 24 each have the end portion in the extending direction of the gate wiring line 26 positioned between the source wiring line 27 and any of the source wiring line parallel portion 33A and the auxiliary touch wiring line side source wiring line parallel portion 36A. Thus, the source wiring line parallel portion 33A overlaps with some of the pixel electrodes 24 and the auxiliary touch wiring line side source wiring line parallel portion 36A overlaps with some of the pixel electrodes 24. With this arrangement, the pixel electrodes 24 are likely to be affected by the electric field generated from the source wiring line parallel portion 33A and the auxiliary touch wiring line side source wiring line parallel portion 36A, and thus there is a risk that the potential of each pixel electrodes 24 may vary. In view of this, the touch electrode 30 is disposed to overlap, from the lower layer side, with the pixel electrode 24, with the third interlayer insulating film F10 serving as an insulating film interposed in between, and to overlap, from the upper layer side, with the source wiring line parallel portion 33A and the auxiliary touch wiring line side source wiring line parallel portion 36A, with the first interlayer insulating film F5, the flattening film F6, and the second interlayer insulating film F8 serving as insulating films interposed in between. Thus, the electric field produced from the source wiring line parallel portion 33A and the auxiliary touch wiring line side source wiring line parallel portion 36A can be blocked at a timing when the common potential signal is input to the touch electrode 30. As a result, potential of each pixel electrode 24 is less likely to vary, whereby excellent display quality is maintained.

The gate connection wiring line 32 includes the sub gate connection wiring line component (sub scanning connection wiring line component) 34 that is formed by the same conductive film as the gate wiring lines 26 which is the first metal film F1 and is arranged to overlap with the main gate connection wiring line component 33 in the pixel region PA. The sub gate connection wiring line component 34 has at least one end side and another end side each connected to the main gate connection wiring line component 33 through the gate connection wiring line component contact hole (contact hole) CH4 opened and formed in the gate insulating film F2 serving as an insulating film provided in between. With this configuration, the sub gate connection wiring line component 34 that is formed by the same conductive film as the gate wiring line 26 which is the first metal film F1 is arranged to overlap with the main gate connection wiring line component 33 in the pixel region PA to be prevented from short circuiting with the gate wiring line 26. With at least one end side and the other end side of the sub gate connection wiring line component 34 each connected to the overlapping main gate connection wiring line component 33 through the gate connection wiring line component contact hole CH4 opened and formed in the gate insulating film F2 serving as an insulating film, whereby reduction of resistance and the redundancy of the gate connection wiring line 32 can be achieved.

The main gate connection wiring line component 33 includes the plurality of source wiring line parallel portions 33A extending parallel to the source wiring line 27 at the position spaced apart from the source wiring line 27 in the pixel region PA, the plurality of source wiring line parallel portions 33A including: the first source wiring line parallel portion (first image wiring line parallel portion) 33A1 offset toward one of two of the source wiring lines 27 sandwiching the pixel region PA and the second source wiring line parallel portion (second image wiring line parallel portion) 33A2 offset toward another one of the two source wiring lines 27 sandwiching the pixel region PA. One of two of the pixel regions PA adjacent to each other with the gate wiring line 26 provided in between is provided with the first source wiring line parallel portion 33A1 and another one of the two pixel regions PA is provided with the second source wiring line parallel portion 33A2. With this configuration, the source wiring line parallel portion 33A of the main gate connection wiring line component 33 formed by the same conductive film as the source wiring line 27 which is the second metal film F4 extends parallel to the source wiring line 27 at a position spaced apart from the source wiring line 27 in the pixel region PA, whereby short circuiting with the source wiring line 27 can be prevented. The two pixel regions PA adjacent to each other with the gate wiring line 26 provided in between are respectively provided with the first source wiring line parallel portion 33A1 offset toward one of the two source wiring lines 27 sandwiching the pixel region PA and the second source wiring line parallel portion 33A2 offset toward the other one of the two source wiring lines 27 sandwiching the pixel region PA. Thus, the dark lines that may be generated when the source wiring line 27 and the source wiring line parallel portion 33A are aligned are less likely to be visually recognized compared with the hypothetical case where all the source wiring line parallel portions 33A are offset toward one or the other one of the two source wiring lines 27 sandwiching the pixel region PA.

The auxiliary touch wiring line 35 includes the first auxiliary touch wiring line component 36 formed by the same conductive film as the source wiring line 27 which is the second metal film F4. The first auxiliary touch wiring line component 36 includes the auxiliary touch wiring line side source wiring line parallel portion 36A extending parallel to the source wiring line 27 at a position spaced apart from the source wiring line 27 in the pixel region PA. The auxiliary touch wiring line 35 includes the first auxiliary touch wiring line (first auxiliary position detection wiring line) 35α at a position where the auxiliary touch wiring line side source wiring line parallel portion 36A is spaced apart from one of the two source wiring lines 27 sandwiching the pixel region PA by the same amount as the first source wiring line parallel portion 33A1 and the second auxiliary touch wiring line (second auxiliary position detection wiring line) 35β at a position where the auxiliary touch wiring line side source wiring line parallel portion 36A is spaced apart from the other one of the two source wiring lines 27 sandwiching the pixel region PA by the same amount as the second source wiring line parallel portion 33A2. The pixel region PA with the same arrangement, in the extending direction of the touch wiring line 31, as the pixel region PA provided with the first source wiring line parallel portion 33A1 is provided with the first auxiliary touch wiring line 35α, whereas the pixel region PA with the same arrangement, in the extending direction of the touch wiring line 31, as the pixel region PA provided with the second source wiring line parallel portion 33A2 is provided with the second auxiliary touch wiring line 35β. With this configuration, the auxiliary touch wiring line side source wiring line parallel portion 36A of the first auxiliary touch wiring line component 36 formed by the same conductive film as the source wiring line 27 which is the second metal film F4 extends parallel to the source wiring line 27 at a position spaced apart from the source wiring line 27 in the pixel region PA, whereby short circuiting with the source wiring line 27 can be prevented. The pixel region PA with the same arrangement as the pixel region PA provided with the first source wiring line parallel portion 33A1, in the extending direction of the touch wiring line 31, is provided with the first auxiliary touch wiring line 35α at a position where the auxiliary touch wiring line side source wiring line parallel portion 36A is spaced apart from one of the two source wiring lines 27 sandwiching the pixel region PA by the same amount as the first source wiring line parallel portion 33A1, whereas the pixel region PA with the same arrangement as the pixel region PA provided with the second source wiring line parallel portion 33A2, in the extending direction of the touch wiring line 31, is provided with the second auxiliary touch wiring line 35β arranged at a position where the auxiliary touch wiring line side source wiring line parallel portion 36A is spaced apart from the other one of the two source wiring lines 27 sandwiching the pixel region PA by the same amount as the second source wiring line parallel portion 33A2. Thus, the rows of the plurality of pixel regions PA with the same arrangement in the extending direction of the touch wiring line 31 have the same arrangement of the source wiring line parallel portion 33A and the auxiliary touch wiring line side source wiring line parallel portion 36A in the pixel regions PA, and thus the display state is less likely to differ between the pixels PX in the pixel regions PA.

The main gate connection wiring line component 33 includes the gate wiring line parallel portion (scanning wiring line parallel portion) 33B that extends parallel to the gate wiring line 26 at a position spaced apart from the gate wiring line 26 in the pixel region PA and is connected to the source wiring line parallel portion 33A. The first auxiliary touch wiring line component 36 includes the auxiliary touch wiring line side gate wiring line parallel portion (auxiliary position detection wiring line side scanning wiring line parallel portion) 36B that extends parallel to the gate wiring line 26 at a position spaced apart from the gate wiring line 26 by the same amount as the gate wiring line parallel portion 33B in the pixel region PA. With this configuration, the gate wiring line parallel portion 33B and the auxiliary touch wiring line side gate wiring line parallel portion 36B are spaced apart from the gate wiring line 26 by the same amount, whereby the parasitic capacitances that may be generated between these and the gate wiring line 26 are equalized. Furthermore, a display state of the pixels PX is likely to differ between the pixel region PA provided with the gate connection wiring line 32 and the pixel region PA provided with the auxiliary touch wiring line 35.

The main gate connection wiring line component 33 includes the plurality of gate wiring line parallel portions 33B extending parallel to the gate wiring line 26 at the position spaced apart from the gate wiring line 26 in the pixel region PA, the plurality of gate wiring line parallel portions 33B including: the first gate wiring line parallel portion (first scanning wiring line parallel portion) 33B1 offset toward one of two of the source wiring lines 27 sandwiching the pixel region PA and the second gate wiring line parallel portion (second scanning wiring line parallel portion) 33B2 offset toward another one of the two source wiring lines 27 sandwiching the pixel region PA. One of two of the pixel regions PA adjacent to each other with the gate wiring line 26 provided in between is provided with the first gate wiring line parallel portion 33B1 and another one of the two pixel regions PA is provided with the second gate wiring line parallel portion 33B2. With this configuration, the two pixel regions PA adjacent to each other with the gate wiring line 26 provided in between are respectively provided with the first gate wiring line parallel portion 33B1 offset toward one of the two source wiring lines 27 sandwiching the pixel region PA and the second gate wiring line parallel portion 33B2 offset toward the other one of the two source wiring lines 27 sandwiching the pixel region PA. Thus, the dark lines that may be generated when the gate wiring line 26 and the gate wiring line parallel portion 33B are aligned are less likely to be visually recognized compared with the hypothetical case where all the gate wiring line parallel portions 33B are not offset.

The plurality of pixel regions PA arranged along the extending direction of the touch wiring line 31 include one provided with the gate connection wiring line 32 and one provided with the auxiliary touch wiring line 35. The length of the gate connection wiring line 32 from the driver 11 to the gate wiring line 26 that is the connection target decreases as the length of the touch wiring line 31 from the driver 11 to the touch electrode 30 that is the connection target increases. With this configuration, among the plurality of pixel regions PA arranged along the extending direction of the touch wiring line 31, one provided more on the driver 11 side than the gate wiring line 26 that is the connection target of the gate connection wiring line 32 is the pixel region PA provided with the gate connection wiring line 32, and one disposed more on the side opposite to the driver 11 side than the gate wiring line 26 that is the connection target of the gate connection wiring line 32 is the pixel region PA provided with the auxiliary touch wiring line 35. Thus, a larger number of pixel regions PA provided with the auxiliary touch wiring line 35 are secured, for a shorter length of the gate connection wiring line 32 from the driver 11 to the gate wiring line 26 as the connection target. The length of the gate connection wiring line 32 from the driver 11 to the gate wiring line 26 that is the connection target decreases as the length of the touch wiring line 31 from the driver 11 to the touch electrode 30 that is the connection target increases, whereby a larger number of auxiliary touch wiring lines 35 can be connected to the touch wiring line 31 with a longer length. Thus, reduction of resistance and redundancy of the touch wiring line 31 can be more favorably achieved.

The liquid crystal panel (display device) 10 according to the present embodiment includes the array substrate 21 described above and the CF substrate (counter substrate) 20 arranged to face the array substrate 21. With such a liquid crystal panel 10, excellent display quality can be achieved, and also features high position detection sensitivity and highly reliable position detection.

Second Embodiment

A second embodiment will be described with reference to FIG. 19 or FIG. 20. This second embodiment is obtained with an auxiliary touch wiring line 135 with a modified configuration. Note that redundant descriptions of structures, actions, and effects similar to those of the first embodiment described above will be omitted.

Figure 19:
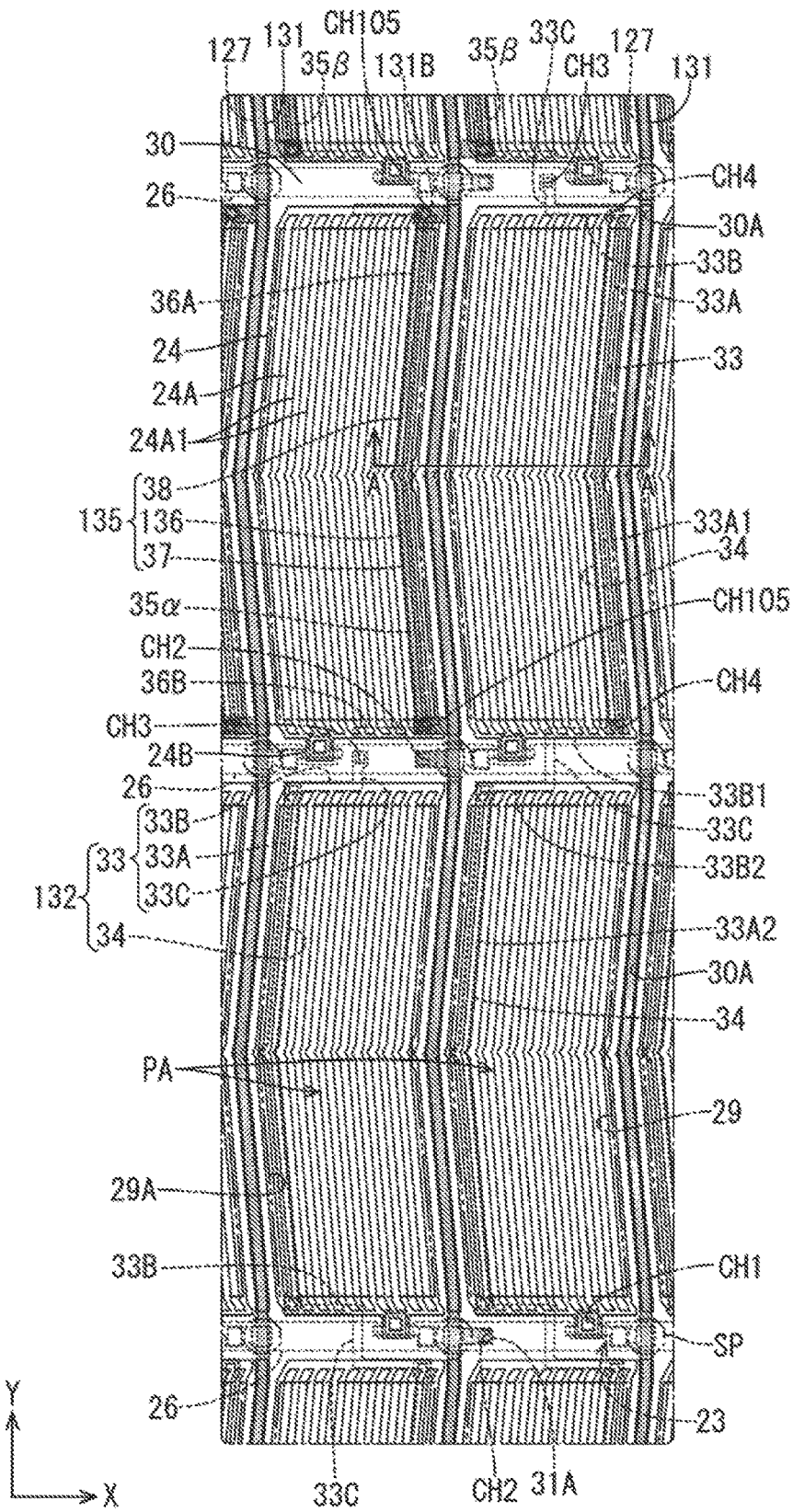
FIG. 19 is a plan view illustrating a pattern of a third metal film of an array substrate according to a second embodiment within a range that is the same as that in FIG. 3.
Figure 20:
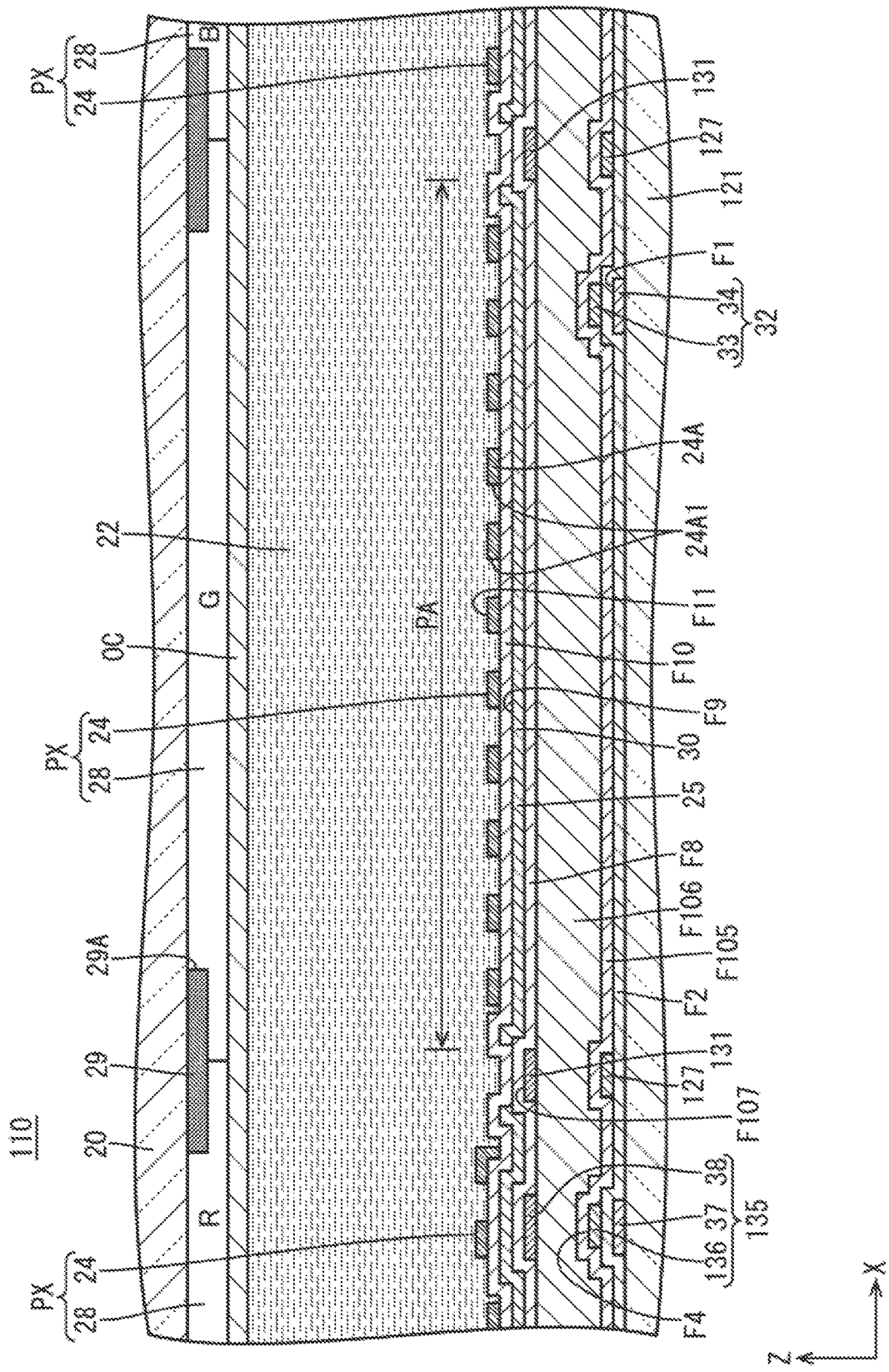
FIG. 20 is a cross-sectional view of the liquid crystal panel taken along line A-A of FIG. 19.

The auxiliary touch wiring line 135 formed on an array substrate 121 forming a liquid crystal panel 110 according to the present embodiment includes a third auxiliary touch wiring line component (third auxiliary position detection wiring line component) 38 formed by the same material as a touch wiring line 131 and the like which is a third metal film F107 as illustrated in FIGS. 19 and 20. FIG. 19 is a plan view illustrating a pattern of the third metal film F107 provided to the array substrate 121. In FIG. 19, the range in which the third metal film F107 is formed is hatched. FIG. 20 is a cross-sectional view of the array substrate 121 taken along line A-A of FIG. 19.

The third auxiliary touch wiring line component 38 extends along the Y-axis direction so as to be connected to two auxiliary touch wiring line contact portions 131B branched from the touch wiring line 131, and bridge between the two auxiliary touch wiring line contact portions 131B. Accordingly, the third auxiliary touch wiring line component 38 is directly connected to the touch wiring line 131. The third auxiliary touch wiring line component 38 is arranged to be overlapped with a first auxiliary touch wiring line component 136. The third auxiliary touch wiring line component 38 has a shape bent partway along a source wiring line 127 and the first auxiliary touch wiring line component 136. The third auxiliary touch wiring line component 38 has both end portions formed by the auxiliary touch wiring line contact portions 131B, and is connected to the overlapping first auxiliary touch wiring line component 136 through a touch wiring line contact hole CH105 opened and formed in a first interlayer insulating film F105 and a flattening film F106. As a result, the third auxiliary touch wiring line component 38 is connected to the first auxiliary touch wiring line component 136 on the lower layer side, whereby further reduction of resistance and redundancy of the auxiliary touch wiring line 135 are achieved. Furthermore, with the third auxiliary touch wiring line component 38 overlapping the first auxiliary touch wiring line component 136, the aperture ratio of the pixel region PA can be maintained high, and the aperture ratio is less likely to differ between the pixel region PA provided with a gate connection wiring line 132 and the pixel region PA provided with the auxiliary touch wiring line 135. Note that the touch wiring line contact hole CH105 is as described in the first embodiment described above.

In the present embodiment as described above, the auxiliary touch wiring line 135 includes the third auxiliary touch wiring line component (third auxiliary position detection wiring line component) 38 that is formed by the same conductive film as the touch wiring line 131 which is the third metal film F107 and is arranged to overlap with at least a portion of the first auxiliary touch wiring line component 136. The third auxiliary touch wiring line component 38 has at least one end side and another end side each connected to the first auxiliary touch wiring line component 136 through the touch wiring line contact hole (contact hole) CH105 opened and formed in the first interlayer insulating film F105 and the flattening film F106 as insulating films interposed in between. With this configuration, the third auxiliary touch wiring line component 38 that is formed by the same conductive film as the touch wiring line 131 which is the third metal film F107 at least has one end side and the other end side each connected to the first auxiliary touch wiring line component 136 through the touch wiring line contact hole CH105 opened and formed in the first interlayer insulating film F105 and the flattening film F106 each serving as insulating films, whereby reduction of resistance and redundancy of the auxiliary touch wiring line 135 can be achieved. Thus, further reduction of resistance and redundancy of the touch wiring line 131 can be achieved. Furthermore, with the third auxiliary touch wiring line component 38 overlapping at least a portion of the first auxiliary touch wiring line component 136, the aperture ratio of the pixel region PA can be maintained high, and the aperture ratio is less likely to differ between the pixel region PA provided with the gate connection wiring line 132 and the pixel region PA provided with the auxiliary touch wiring line 135.

Third Embodiment

A third embodiment will be described with reference to FIG. 21 or FIG. 22. In this third embodiment, a configuration obtained by addition of a gate circuit portion 39 to the configuration described in the first embodiment described above and the like. Note that redundant descriptions of structures, actions, and effects similar to those of the first embodiment described above will be omitted.

Figure 21:
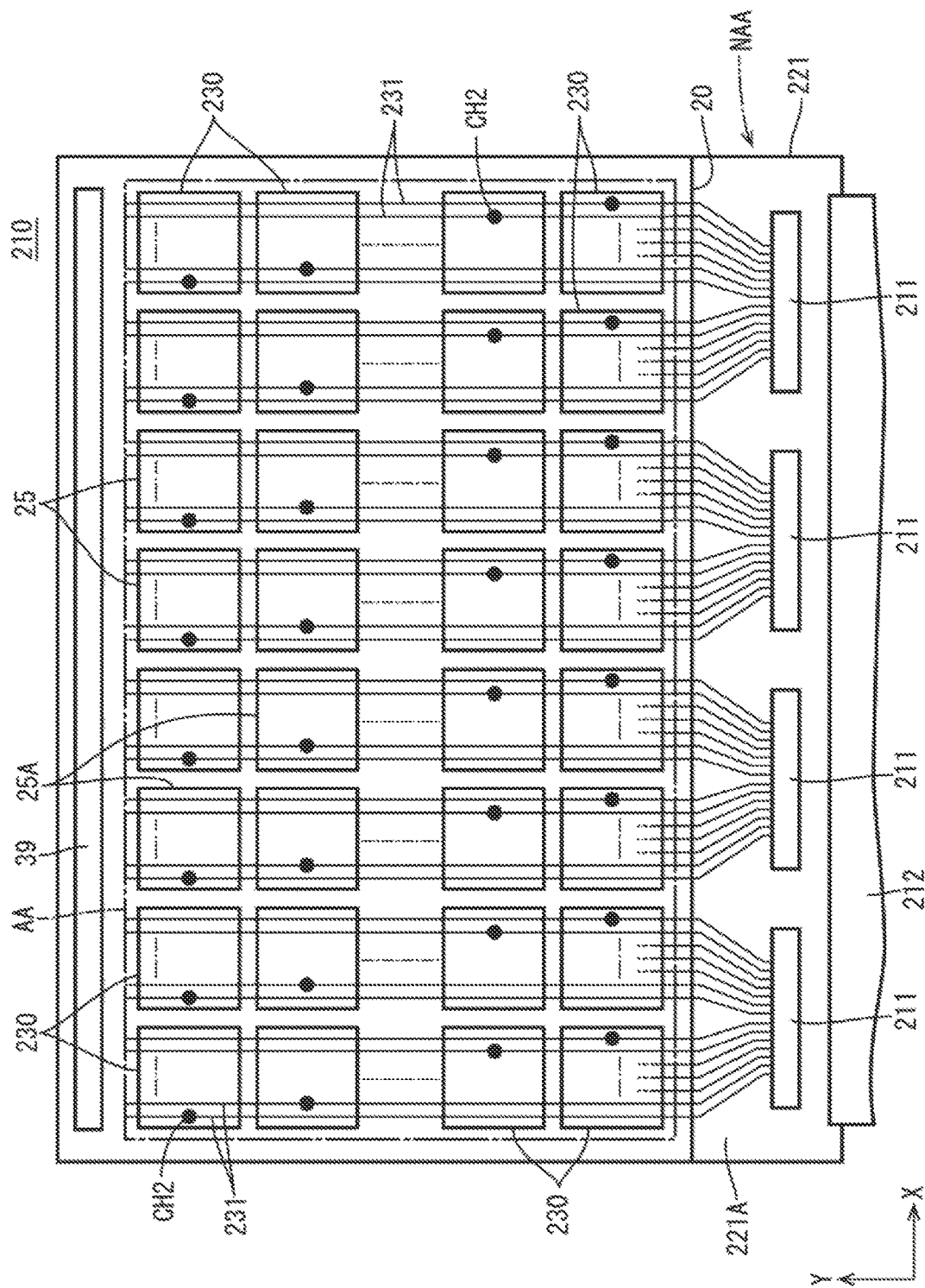
FIG. 21 is a plan view illustrating touch electrodes, touch wiring lines and the like of a liquid crystal panel according to a third embodiment.

As illustrated in FIG. 21, the gate circuit portion 39 is provided in an array substrate 221 constituting a liquid crystal panel 210 according to the present embodiment. FIG. 21 is a schematic plan view of a liquid crystal panel 210. The gate circuit portion 39 is provided on a side of the non-display region NAA of the array substrate 221 on the side portion opposite to the side where a driver 211 is disposed in the Y-axis direction (on the side of a CF substrate non-overlapping portion 221A). The gate circuit portion 39 has a horizontally elongated shape extending substantially over the entire length of the display region AA along the X-axis direction, and is provided in a monolithic manner using each film provided in the array substrate 221. The gate circuit portion 39 has a function of supplying a scanning signal to a gate wiring line 226 provided on an approximately half region on the gate circuit portion 39 side (upper side in FIG. 21) in the display region AA in the Y-axis direction. Due to this configuration, the driver 211 has a function such as that of supplying a scanning signal to the gate wiring line 226 provided on an approximately half region on the driver 211 side (lower side in FIG. 21) in the display region AA in the Y-axis direction. A connection wiring line provided on at least one of two side portions sandwiching the display region AA from both sides in the X-axis direction, in the non-display region NAA of the array substrate 221 is connected to the gate circuit portion 39. This connection wiring line is used for transmitting various signals, supplied from by a flexible substrate 212, to the gate circuit portion 39.

Figure 22:
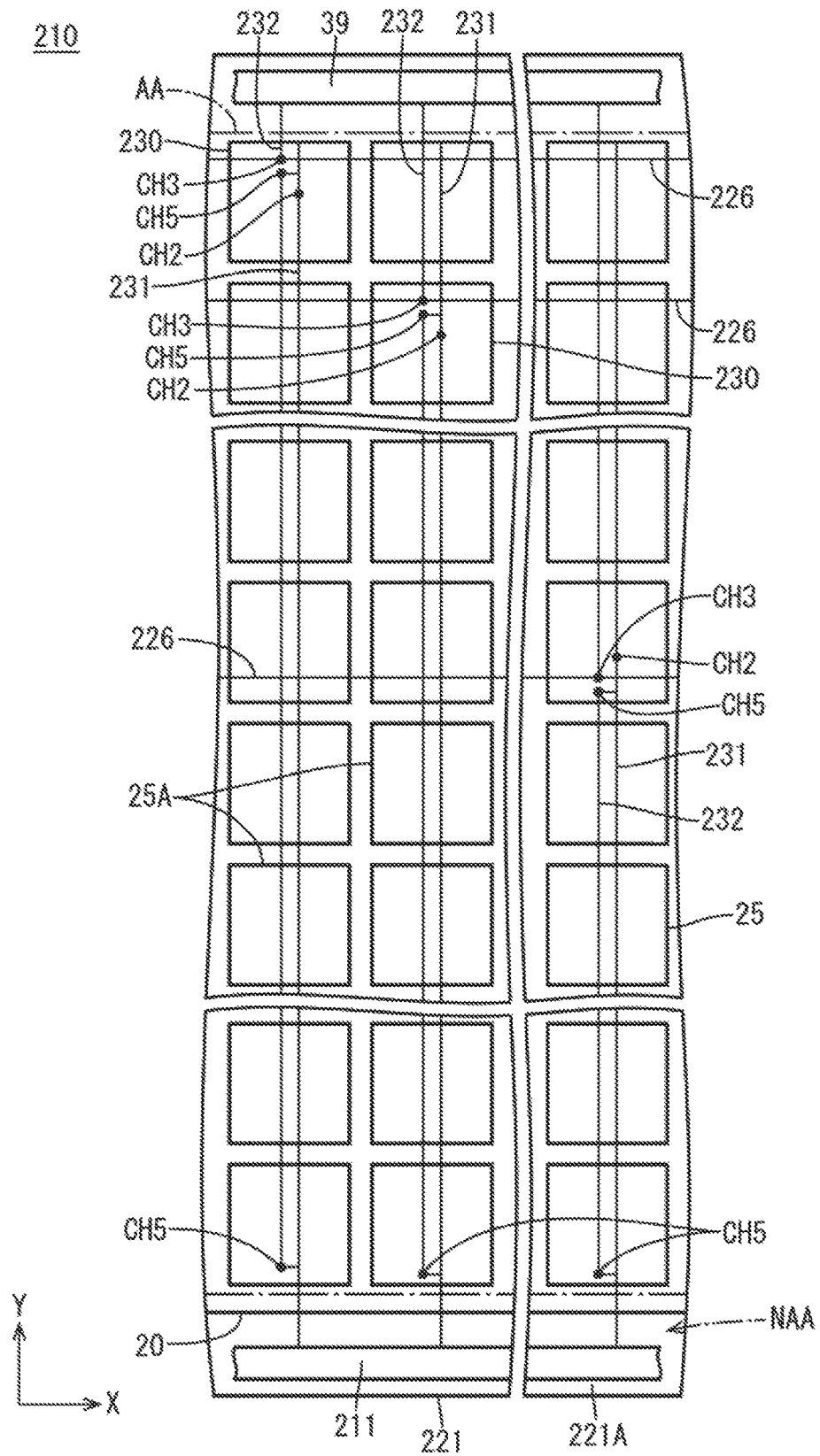
FIG. 22 is a plan view schematically illustrating an arrangement of a touch electrode, a touch wiring line, a gate connection wiring line, an auxiliary touch wiring line, and the like in the liquid crystal panel.

FIG. 22 is a plan view schematically illustrating an arrangement of a touch electrode 230, a touch wiring line 231, a gate connection wiring line 232, an auxiliary touch wiring line 235, and the like in the liquid crystal panel 210, as in FIG. 18. As illustrated in FIG. 22, the gate connection wiring line 232 that is the connection target of the gate wiring line 226 disposed in an approximately half region on the gate circuit portion 39 side in the display region AA in the Y-axis direction is connected to the gate circuit portion 39. The remaining approximately half of the gate connection wiring line 232 is connected to the driver 211. The approximately half region on the gate circuit portion 39 side in the display region AA in the Y-axis direction is configured in such a manner that a longer wiring line length of the touch wiring line 231 from the driver 211 to the touch electrode 230 that is the connection target results in a shorter wiring line length of the gate connection wiring line 232 from the gate circuit portion 39 to the gate wiring line 226 that is the connection target. With this configuration, the touch wiring line 231 with a shorter wiring line length is connected with less auxiliary touch wiring lines 235, and the touch wiring line 231 with a longer wiring line length is connected with more auxiliary touch wiring lines 235. As a result, reduction of resistance and redundancy of the touch wiring line 231 can be more effectively achieved regardless of whether the wiring line length is long or short.

The approximately half region on the driver 211 side in the display region AA in the Y-axis direction is configured in such a manner that a longer wiring line length of the touch wiring line 231 from the driver 211 to the touch electrode 230 that is the connection target results in a shorter wiring line length of the gate connection wiring line 232 from the driver 211 to the gate wiring line 226 that is the connection target, as in the first embodiment described above (see FIG. 18).

Fourth Embodiment

A fourth embodiment will be described with reference to FIG. 23. In this fourth embodiment, a touch wiring line 331 arrangement of which is changed from that in the first embodiment and the like will be described. Note that redundant descriptions of structures, actions, and effects similar to those of the first embodiment described above will be omitted.

Figure 23:
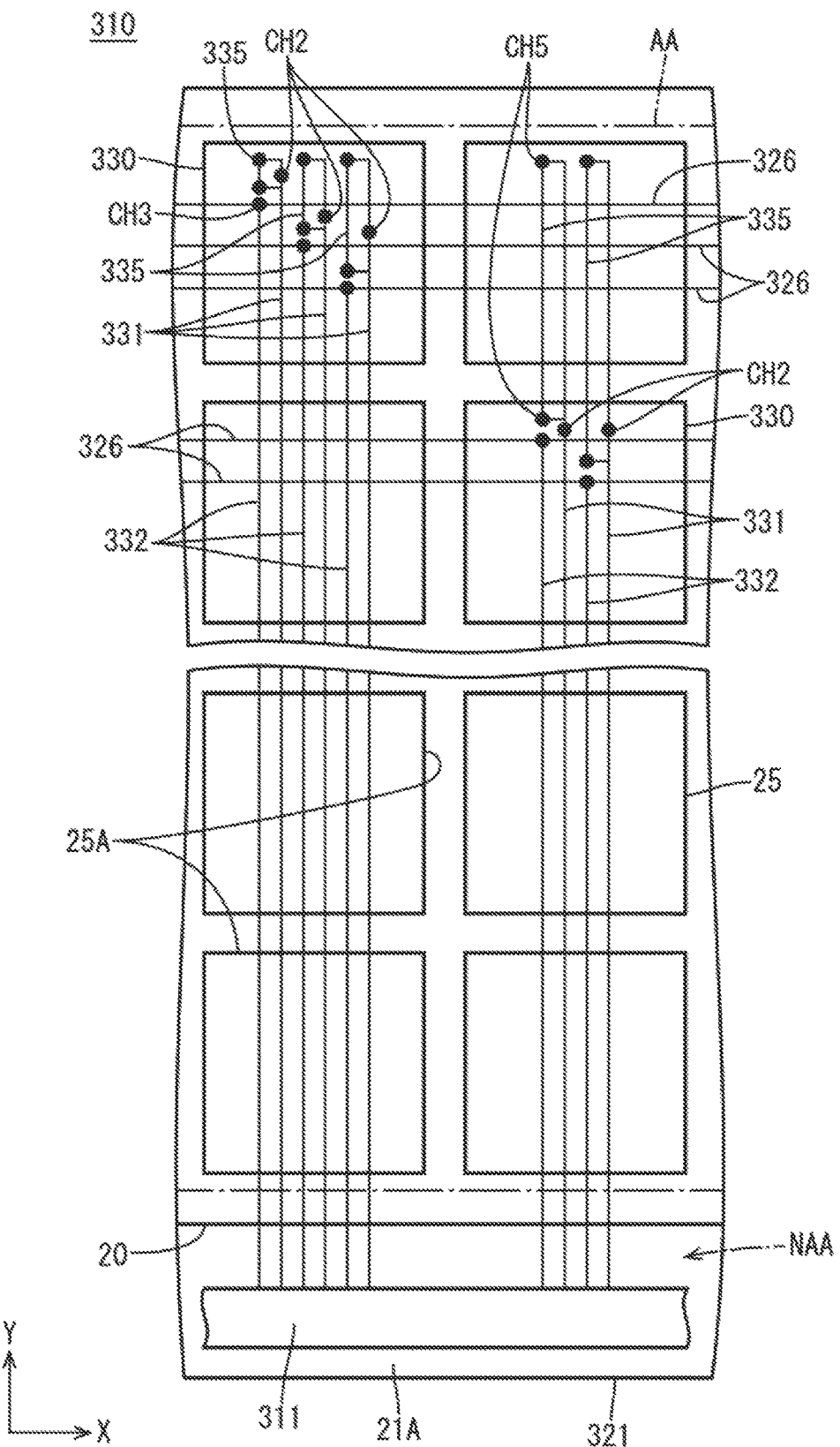
FIG. 23 is a plan view schematically illustrating an arrangement of a touch electrode, a touch wiring line, a gate connection wiring line, an auxiliary touch wiring line, and the like in a liquid crystal panel according to a fourth embodiment.

In an array substrate 321 according to the present embodiment, as illustrated in FIG. 23, a touch electrode 330 farther from driver 311 is connected to a larger number of touch wiring lines 331. FIG. 23 is a plan view schematically illustrating an arrangement of the touch electrode 330, the touch wiring line 331, a gate connection wiring line 332, an auxiliary touch wiring line 335, and the like in a liquid crystal panel 310, as in FIG. 18 and the like.

Specifically, three touch wiring lines 331 are connected to the touch electrode 330 arranged farthest from the driver 311. Meanwhile, two touch wiring lines 331 are connected to the touch electrode 330 arranged second farthest from the driver 311. With this configuration, even when the wiring resistance of the touch wiring line 331 arranged far from the driver 311 is high due to its long wiring line length, the touch signal and the common potential signal supplied to this touch electrode 330 are less likely to have a rounded waveform. With the auxiliary touch wiring line 335 connected to the touch wiring line 331, reduction of resistance and redundancy are achieved as in the first embodiment described above. Furthermore as in the first embodiment described above, the wiring line length of the gate connection wiring line 332 from the driver 311 to the gate wiring line 326 that is the connection target is set to be shorted as the wiring line length of the touch wiring line 331 from the driver 311 to the touch electrode 330 that is the connection target increases.

Fifth Embodiment

A fifth embodiment will be described with reference to FIG. 24. In this fifth embodiment, an auxiliary touch wiring line 435 arrangement of which is changed from that in the first embodiment and the like will be described. Note that redundant descriptions of structures, actions, and effects similar to those of the first embodiment described above will be omitted.

Figure 24:
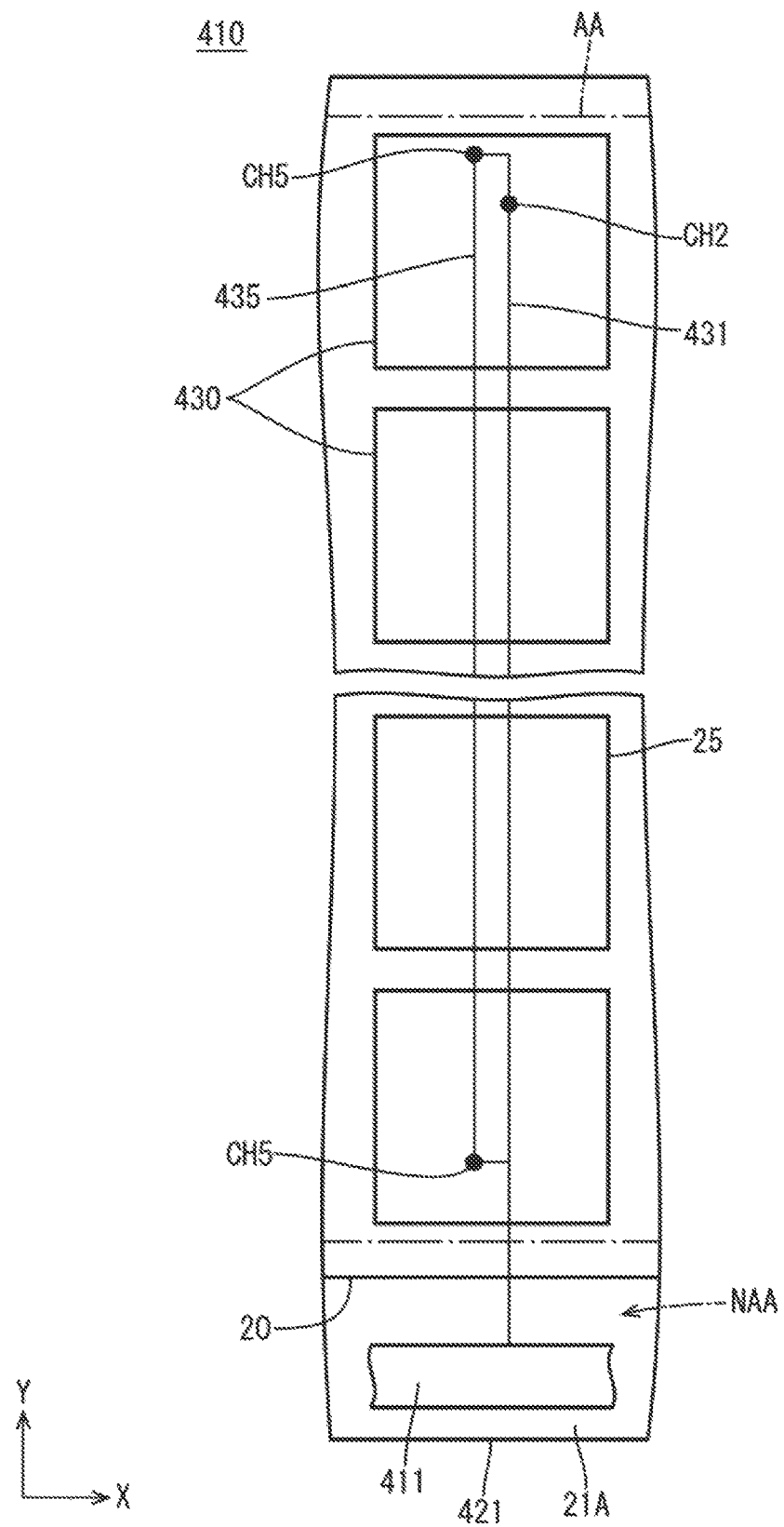
FIG. 24 is a plan view schematically illustrating an arrangement of a touch electrode, a touch wiring line, an auxiliary touch wiring line, and the like in the liquid crystal panel according to a fifth embodiment.

In an array substrate 421 according to the present embodiment, as illustrated in FIG. 24, a touch wiring line 431 connected to a touch electrode 430 arranged farthest from a driver 411 is connected with the largest number of auxiliary touch wiring lines 435. FIG. 24 is a plan view schematically illustrating an arrangement of the touch electrode 430, the touch wiring line 431, the auxiliary touch wiring line 435, and the like in a liquid crystal panel 410, as in FIG. 18 and the like.

Specifically, a plurality of pixel regions that are disposed adjacent to the touch wiring line 431 connected with the touch electrode 430 farthest from the driver 411 among the plurality of touch electrodes 430 and are arranged side-by-side along the Y-axis direction are each not provided with the gate connection wiring line and are each provided with the auxiliary touch wiring line 435. With this configuration, reduction of resistance and redundancy can be more favorably achieved for the touch wiring line 431 that is likely to have the highest wiring resistance and involve the highest risk of disconnection. Note that any of the pixel regions in a column different from the pixel regions that are adjacent to the touch wiring line 431 connected to the touch electrode 430 farthest from the driver 411 are provided with the gate connection wiring line.

According to the present embodiment described above, the plurality of pixel regions PA that are adjacent to the touch wiring line 431 connected to the touch electrode 430 farthest from the driver 411, among the plurality of touch electrodes 430, and are aligned along the extending direction of the touch wiring line 431 are each provided with the auxiliary touch wiring line 435. The touch wiring line 431 connected to the touch electrode 430 farthest from the driver 411 among the plurality of touch electrodes 430 has the longest length, and has the highest wiring resistance and involves the highest risk of disconnection. In view of this, all of the plurality of pixel regions PA that are adjacent to such touch wiring line 431 and are arranged side-by-side along the extending direction of the touch wiring line 431 are provided with the auxiliary touch wiring line 435, whereby reduction of resistance and redundancy can be more favorably achieved for the touch wiring line 431.

Other Embodiments

The techniques disclosed in the specification are not limited to the embodiments described above and illustrated by the drawings, and embodiments such as those described below are also included within the technical scope.

(1) The gate connection wiring line 32, 132, 232, 332 may be constituted by the main gate connection wiring line component 33 with the sub gate connection wiring line component 34 omitted.

(2) The auxiliary touch wiring line 35, 135, 235, 335, and 435 may be constituted by the first auxiliary touch wiring line component 36, 136, or may be constituted by the first auxiliary touch wiring line component 36, 136 and the third auxiliary touch wiring line component 38, with the second auxiliary touch wiring line component 37 omitted.

(3) The auxiliary touch wiring line 35, 135, 235, 335, and 435 may be constituted by the second auxiliary touch wiring line component 37, or may be constituted by the second auxiliary touch wiring line component 37 and the third auxiliary touch wiring line component 38, with the first auxiliary touch wiring line component 36, 136 omitted.

(4) The specific range in which the sub gate connection wiring line component 34 constituting the gate connection wiring line 32, 132, 232, 332 is formed may be changed as appropriate.

(5) The specific range in which the second auxiliary touch wiring line component 37 and the third auxiliary touch wiring line component 38 constituting the auxiliary touch wiring line 35, 135, 235, 335, 435 are formed can be changed as appropriate.

(6) The specific wiring route of the gate connection wiring line 32, 132, 232, 332 can be changed as appropriate. For example, the main gate connection wiring line component 331 of the gate connection wiring line 32, 132, 232, 332 may be parallel to the source wiring line 27, 127 over the entire length and constituted only by the source wiring line parallel portion 33A. In addition, the length of the gate wiring line parallel portion 33B of the main gate connection wiring line component 33 may be approximately the same as the short side of the pixel region PA, and the gate wiring line crossing portion 33C may be disposed near the end portion of the pixel region PA in the short side direction.

(7) When the wiring route of the gate connection wiring line 32, 132, 232, 332 is changed as in (6) described above, the arrangement of the auxiliary touch wiring line 35, 135, 235, 335, 435 may be changed as appropriate. For example, in a case where the main gate connection wiring line component 33 is constituted only by the source wiring line parallel portion 33A, the auxiliary touch wiring line 35, 135, 235, 335, 435 may be constituted only by the auxiliary touch wiring line side source wiring line parallel portion 36A. In addition, the length of the auxiliary touch wiring line side gate wiring line parallel portion 36B of the first auxiliary touch wiring line component 36, 136 may be approximately the same as the short side of the pixel region PA.

(8) In addition to (6) described above, the gate connection wiring line 32, 132, 232, 332 may be disposed passing through a part of the center portion of the pixel region PA. Similarly, the auxiliary touch wiring line 35, 135, 235, 335, 435 may be disposed passing through a part of the center portion of the pixel region PA. These configurations are preferably applied when a dark portion is locally generated in the center portion of the pixel region PA. When the gate connection wiring line 32, 132, 232, 332 and the auxiliary touch wiring line 35, 135, 235, 335, 435 are disposed so as to overlap with the dark portion, a reduction in the aperture ratio can be suppressed.

(9) The gate connection wiring line 32, 132, 232, 332 and the auxiliary touch wiring line 35, 135, 235, 335, 435 may be arranged without being aligned in the pixel region PA in plan view.

(10) A specific example of the above (9) includes a configuration in which, for example, the distance between the source wiring line parallel portion 33A of the gate connection wiring line 32, 132, 232, 332 and the source wiring line 27, 127 and the distance between the auxiliary touch wiring line side source wiring line parallel portion 36A of the auxiliary touch wiring line 35, 135, 235, 335, 435 and the source wiring line 27, 127 may not match and may be somewhat different.

(11) A specific example of the above (9) includes a configuration in which, for example, the distance between the gate wiring line parallel portion 33B of the gate connection wiring line 32, 132, 232, 332 and the gate wiring line 26, 226, 326 and the distance between the auxiliary touch wiring line side gate wiring line parallel portion 36B of the auxiliary touch wiring line 35, 135, 235, 335, 435 and the gate wiring line 26, 226, 326 may not match and may be somewhat different.

(12) The touch wiring line 31, 131, 231, 331, 431 may be arranged without overlapping with the source wiring line 27, 127. In this case, the touch wiring line 31, 131, 231, 331, 431 may be formed by the same material as the source wiring line 27, 127 which is the second metal film F4.

(13) The touch wiring line 31, 131, 231, 331, 431 may have a portion, connected to the driver 11, 211, 311, 411 in the non-display region NAA, formed by a conductive film (such as the first metal film F1 or the second metal film F4) other than the third metal film F7, F107.

(14) The main gate connection wiring line component 33 of the gate connection wiring line 32, 132, 232, 332 may have a portion, connected to the driver 11, 211, 311, 411 in the non-display region NAA, formed by a conductive film (such as the first metal film F1 or the third metal film F7, F107) other than the second metal film F4.

(15) The first auxiliary touch wiring line component 36, 136 of the auxiliary touch wiring line 35, 135, 235, 335, 435 may have a portion, connected to the driver 11, 211, 311, 411 in the non-display region NAA, formed by a conductive film (such as the first metal film F1 or the third metal film F7, F107) other than the second metal film F4.

(16) Three or more portions of one auxiliary touch wiring line 35, 135, 235, 335, 435 may be connected to the touch wiring line 31, 131, 231, 331, 431. Two or more portions of the first auxiliary touch wiring line of the auxiliary touch wiring line 35, 135, 235, 335, 435 more on the center portion side than the end portion in the extending direction may be connected to the touch wiring line 31, 131, 231, 331, 431.

(17) When the plurality of touch wiring lines 331 are connected to the touch electrode 330 as in the fourth embodiment, the specific number of the touch wiring lines 331 connected to one touch electrode 330 can be changed as appropriate.

(18) A plurality of the gate connection wiring lines 32, 132, 232, 332 may be connected to one gate wiring line 26, 226, 326.

(19) The touch wiring line 31, 131, 231, 331, 431 may be formed by a conductive film other than the third metal film F7, F107, such as a conductive film with a low resistance region obtained by reducing the resistance of a part of a transparent electrode film or a semiconductor film.

(20) The planer size of the touch electrode 30, 230, 330, 430, the number of the same provided in the display region AA, and the like may be changed as appropriate.

(21) The planar shape of the pixel electrode 24 may be a shape other than the vertically elongated substantially rectangular shape, such as a horizontally elongated substantially rectangular shape or substantially square shape.

(22) The driver 11, 211, 311, 411 may not supply any of the touch signal, scanning signal, and the image signal. For example, driver 11, 211, 311, 411 may supply the scanning signal and the image signal, and flexible substrate 12 may supply the touch signal.

(23) The specific screen size, resolution, and the like of the liquid crystal panel 10, 110, 210, 310 can be changed as appropriate.

(24) The specific dimensions and arrangement pitches of the pixels PX in the liquid crystal panel 10, 110, 210, 310 may be changes as appropriate. Furthermore, the specific dimensions, arrangement pitches, and the mounted number (the number of the electrodes arranged in the X-axis direction, Y-axis direction, and the like) of touch electrodes 30, 230, 330, 430 can be changed as appropriate.

(25) The number of drivers 11, 211, 311, 411 installed can be changed as appropriate to be a number other than four.

(26) The driver 11, 211, 311, 411 may be installed on the flexible substrate 12 by Chip On Film (COF) installation.

(27) Instead of the gate circuit portion 39 described in the third embodiment, a gate driver having a function similar to that of the gate circuit portion 39 may be mounted on the array substrate 21, 121, 221, 321, 421. Furthermore, the gate wiring line 226 that is the target of the scanning signal supply from the gate circuit portion 39 is not limited to the gate wiring line 226 provided in an approximately half region on the gate circuit portion 39 side in the Y-axis direction in the display region AA. For example, the gate circuit portion 39 may have a function of supplying the scanning signal to the gate wiring line 226 disposed entirely over the display region AA.

(28) The specific planar shape of the slit 24A1 provided in the pixel electrode 24 can be changed as appropriate, and may be, for example, a W shape, a linear shape, or the like. Further, the specific number of installations, arrangement pitch, and the like of the slits 24A1 can be changed as appropriate.

(29) It is also possible to make the common electrode 25 be made of the second transparent electrode film F11 and the pixel electrode 24 be made of the first transparent electrode film F9. In this case, the slits 24A1 provided in the pixel electrode 24 may be omitted, and instead, slits may be provided in the common electrode 25.

(30) The TFTs 23 may be in an arrangement other than the zigzag arrangement, such as in a matrix arrangement in which the pixels PX adjacent to each other in the Y-axis direction are in a common arrangement in the X-axis direction.

(31) The semiconductor film F3 can be formed by amorphous silicon or polysilicon (LTPS).

(32) The display mode of the liquid crystal panel 10, 110, 210, 310 may be an IPS mode or the like.

(33) The touch panel pattern may be a mutual capacitance pattern in addition to a self-capacitance pattern.

(34) The planar shape of the liquid crystal panel 10, 110, 210, 310 may be rectangular with vertical elongation, square, circular, semi-circular, elliptical, elliptical, trapezoidal, or the like.

(35) The liquid crystal panel 10, 110, 210, 310 may be a reflective type or a semi-transmissive type, in addition to a transmissive type.

(36) The display panel of a type different from the liquid crystal panel 10, 110, 210, 310 (such as an organic luminescence display panel) or an EPD (microcapsule-type electrophoretic display panel) may be used.

What is claimed is:

1. An array substrate comprising:
   a signal supply unit configured to supply a signal;
   a plurality of position detection electrodes configured to generate electrostatic capacitance with a position input member used for inputting a position and detect an input position by the position input member;
   a plurality of position detection wiring lines having one end side connected to the signal supply unit and another end side connected to the position detection electrodes;
   a plurality of scanning wiring lines extending to cross the position detection wiring lines, with an insulating film interposed in between;

a plurality of pixel regions in which a pixel as a unit of display is positioned, the pixel regions being regions surrounded by a plurality of the position detection wiring lines and a plurality of the scanning wiring lines;

a scanning connection wiring line having one end side connected to the signal supply unit and another end side connected to the scanning wiring lines, the scanning connection wiring line being arranged passing through some of the pixel regions included in the plurality of pixel regions; and an auxiliary position detection wiring line having at least one end side and another end side each connected to the position detection wiring lines, the auxiliary position detection wiring line being disposed in the pixel regions, of the plurality of pixel regions, not provided with the scanning wiring lines.

2. The array substrate according to claim 1,
wherein the plurality of pixel regions arranged along an extending direction of the position detection wiring lines include one provided with the scanning connection wiring line and one provided with the auxiliary position detection wiring line, and
a length of the scanning connection wiring line from the signal supply unit to the scanning wiring line that is a connection target decreases as a length of the position detection wiring lines from the signal supply unit to the position detection electrode that is a connection target increases.

3. The array substrate according to claim 1,
wherein a plurality of the pixel regions that are adjacent to the position detection wiring line connected to the position detection electrode farthest from the signal supply unit, among the plurality of position detection electrodes, and are aligned along an extending direction of the position detection wiring line are each provided with the auxiliary position detection wiring line.

4. A display device comprising:
the array substrate according to claim 1; and
a counter substrate arranged to face the array substrate.

5. The array substrate according to claim 1 further comprising:
a plurality of image wiring lines that extend to cross the scanning wiring lines, with an insulating film interposed in between, and are arranged overlapping with at least a portion of each of the plurality of position detection wiring lines, with an insulating film interposed in between,
wherein the scanning connection wiring lines include a main scanning connection wiring line component formed by a same conductive film as the image wiring lines, and
the main scanning connection wiring line component extends from the signal supply unit to a connection target among the scanning wiring lines, while crossing non-connection targets among the scanning wiring lines before reaching the connection target.

6. The array substrate according to claim 5,
wherein the auxiliary position detection wiring line includes a first auxiliary position detection wiring line component formed by the same conductive film as the image wiring lines,
the main scanning connection wiring line component includes an image wiring line parallel portion extending parallel to the image wiring lines at a position spaced apart from the image wiring lines in the pixel regions, whereas the first auxiliary position detection wiring line component includes an auxiliary position detection wiring line side image wiring line parallel portion extending parallel to the image wiring lines at a position spaced apart from the image wiring lines in the pixel regions by a same amount as the image wiring line parallel portion.

7. The array substrate according to claim 6,
wherein the auxiliary position detection wiring line includes a second auxiliary position detection wiring line component that is formed by a same conductive film as the scanning wiring lines and is arranged overlapping with at least a portion of the first auxiliary position detection wiring line component, and
the second auxiliary position detection wiring line component has at least one end side and another end side each connected to the first auxiliary position detection wiring line component through a contact hole opened and formed in an insulating film provided in between.

8. The array substrate according to claim 6,
wherein the auxiliary position detection wiring line includes a third auxiliary position detection wiring line component that is formed by a same conductive film as the position detection wiring lines and is arranged overlapping with at least a portion of the first auxiliary position detection wiring line component, and
the third auxiliary position detection wiring line component has at least one end side and another end side each connected to the first auxiliary position detection wiring line component through a contact hole opened and formed in an insulating film provided in between.

9. The array substrate according to claim 6 further comprising:
a plurality of pixel electrodes positioned in the plurality of pixel regions and constituting the pixels,
wherein the pixel electrodes provided in the pixel regions provided with the scanning connection wiring line have an end portion in an extending direction of the scanning wiring line positioned between the image wiring lines and the image wiring line parallel portion, whereas the pixel electrodes provided in the pixel regions provided with the auxiliary position detection wiring line have an end portion in the extending direction of the scanning wiring line positioned between the image wiring lines and the auxiliary position detection wiring line side image wiring line parallel portion.

10. The array substrate according to claim 9,
wherein the signal supply unit supplies a position detection signal and a common potential signal to the position detection wiring lines in a time division manner, and
the position detection electrodes are arranged to overlap, from a lower layer side, with the pixel electrodes, with an insulating film interposed in between, and to overlap, from an upper layer side, with the image wiring line parallel portion and the auxiliary position detection wiring line side image wiring line parallel portion, with an insulating film interposed in between.

11. The array substrate according to claim 5,
wherein the scanning connection wiring line includes a sub scanning connection wiring line component that is formed by a same conductive film as the scanning wiring lines and is arranged overlapping with the main scanning connection wiring line component in the pixel regions, and
the sub scanning connection wiring line component has at least one end side and another end side each connected to the main scanning connection wiring line component through a contact hole opened and formed in an insulating film provided in between.

12. The array substrate according to claim 5,
wherein the main scanning connection wiring line component includes a plurality of image wiring line parallel portions extending parallel to the image wiring lines at a position spaced apart from the image wiring lines in the pixel regions,
the plurality of image wiring line parallel portions include a first image wiring line parallel portion offset toward one of two of the image wiring lines sandwiching the pixel regions and a second image wiring line parallel portion offset toward the other one of the two image wiring lines sandwiching the pixel regions, and
one of two of the pixel regions adjacent to each other with the scanning wiring line provided in between is provided with the first image wiring line parallel portion and the other one of the two pixel regions is provided with the second image wiring line parallel portion.

13. The array substrate according to claim 12,
wherein the auxiliary position detection wiring line includes a first auxiliary position detection wiring line component formed by the same conductive film as the image wiring lines,
the first auxiliary position detection wiring line component includes an auxiliary position detection wiring line side image wiring line parallel portion extending parallel to the image wiring lines at a position spaced apart from the image wiring lines in the pixel regions,
the auxiliary position detection wiring line includes a first auxiliary position detection wiring line at a position where the auxiliary position detection wiring line side image wiring line parallel portion is spaced apart from one of the two image wiring lines sandwiching the pixel regions by a same amount as the first image wiring line parallel portion and a second auxiliary position detection wiring line at a position where the auxiliary position detection wiring line side image wiring line parallel portion is spaced apart from the other one of the two image wiring lines sandwiching the pixel regions by a same amount as the second image wiring line parallel portion, and
the pixel regions with a same arrangement, in an extending direction of the position detection wiring lines, as the pixel regions provided with the first image wiring line parallel portion are provided with the first auxiliary position detection wiring line, whereas the pixel regions with a same arrangement, in the extending direction of the position detection wiring lines, as the pixel regions provided with the second image wiring line parallel portion are provided with the second auxiliary position detection wiring line.

14. The array substrate according to claim 13,
wherein the main scanning connection wiring line component includes a scanning wiring line parallel portion that extends parallel to the scanning wiring lines at a position spaced apart from the scanning wiring lines in the pixel regions and is connected to the image wiring line parallel portion, and
the first auxiliary position detection wiring line component includes an auxiliary position detection wiring line side scanning wiring line parallel portion that extends parallel to the scanning wiring lines at a position spaced apart from the scanning wiring lines by a same amount as the scanning wiring line parallel portion in the pixel regions.

15. The array substrate according to claim 5,
wherein the main scanning connection wiring line component includes a plurality of scanning wiring line parallel portions extending parallel to the scanning wiring lines at a position spaced apart from the scanning wiring lines in the pixel regions,
the plurality of scanning wiring line parallel portions include a first scanning wiring line parallel portion offset toward one of two of the image wiring lines sandwiching the pixel regions and a second scanning wiring line parallel portion offset toward the other one of the two image wiring lines sandwiching the pixel regions, and
one of two of the pixel regions adjacent to each other with the scanning wiring line provided in between is provided with the first scanning wiring line parallel portion and the other one of the two pixel regions is provided with the second scanning wiring line parallel portion.

* * * * *